United States Patent [19]
Ono

[11] Patent Number: 5,715,079
[45] Date of Patent: Feb. 3, 1998

[54] SCANNING OPTICAL SYSTEM

[75] Inventor: Satoru Ono, Toyokawa, Japan

[73] Assignee: Minolta Co., Ltd., Osaka, Japan

[21] Appl. No.: 547,502

[22] Filed: Oct. 24, 1995

Related U.S. Application Data

[62] Division of Ser. No. 354,604, Dec. 13, 1994.

[30] Foreign Application Priority Data

Dec. 16, 1993 [JP] Japan ................................. 5-316757
Aug. 19, 1994 [JP] Japan ................................. 6-195257

[51] Int. Cl.$^6$ .................................................. G02B 26/08
[52] U.S. Cl. .......................... 359/205; 359/206; 359/207;
                                    359/711; 359/793; 359/216
[58] Field of Search ............................ 359/196–219,
              359/220, 662, 711, 717, 793, 795; 347/258–261

[56] References Cited

U.S. PATENT DOCUMENTS

| | | |
|---|---|---|
| 4,443,055 | 4/1984 | Matsuoka et al. ...................... 359/207 |
| 5,111,219 | 5/1992 | Makino . |
| 5,128,795 | 7/1992 | Endou et al. . |
| 5,179,277 | 1/1993 | Tomita ...................... 250/235 |
| 5,247,385 | 9/1993 | Takanashi ...................... 359/205 |
| 5,499,107 | 3/1996 | Kuroda ...................... 358/347 |

FOREIGN PATENT DOCUMENTS

| | | | |
|---|---|---|---|
| 2-42414 | 2/1990 | Japan | ...................... 359/207 |
| 4110817 | 4/1992 | Japan . | |
| 4153616 | 5/1992 | Japan . | |

*Primary Examiner*—James Phan
*Attorney, Agent, or Firm*—Price, Gess & Ubell

[57] ABSTRACT

A scanning optical system has a deflector and a scanning lens. A convergent beam is deflected at a uniform angular velocity by the deflector. The scanning lens forms the scanned beam into an image on a scanned surface to scan the surface substantially at a uniform velocity. The scanning lens includes from the side of the deflector a negative lens element and at least one more lens element. The convergent beam is incident on a surface of the deflector which faces the deflector. The scanning lens fulfills predetermined conditions.

20 Claims, 51 Drawing Sheets

Fig. 13A
Fig. 13B
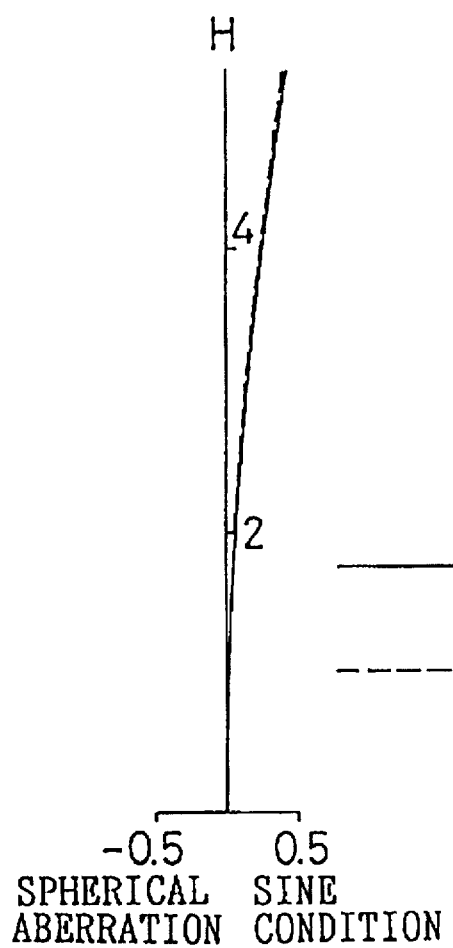
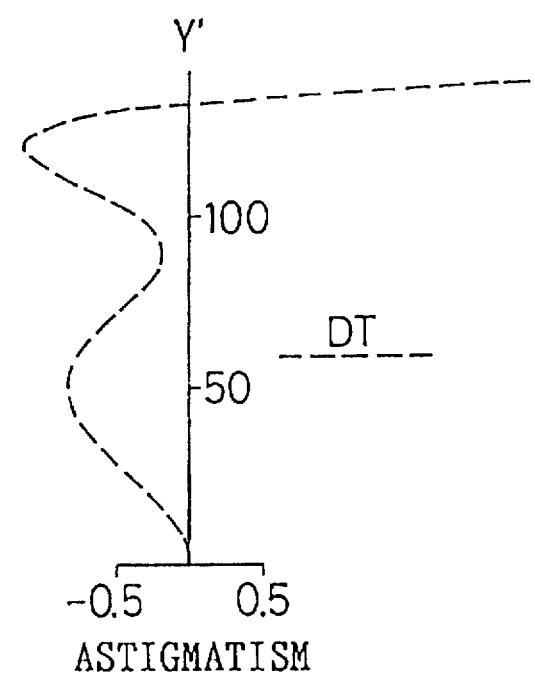
Fig. 13C
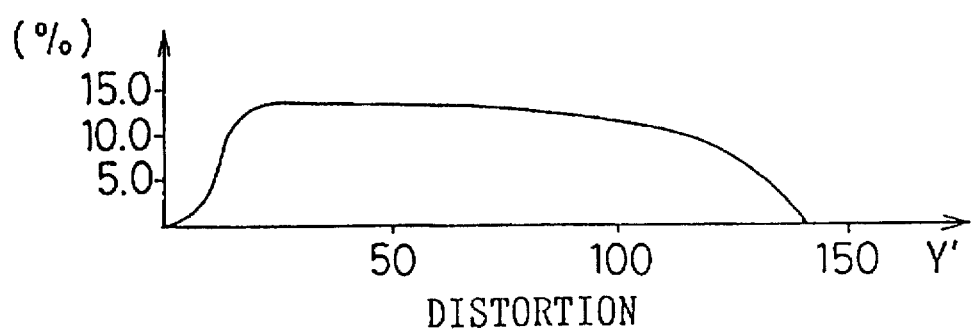

Fig. 19A
Fig. 19B
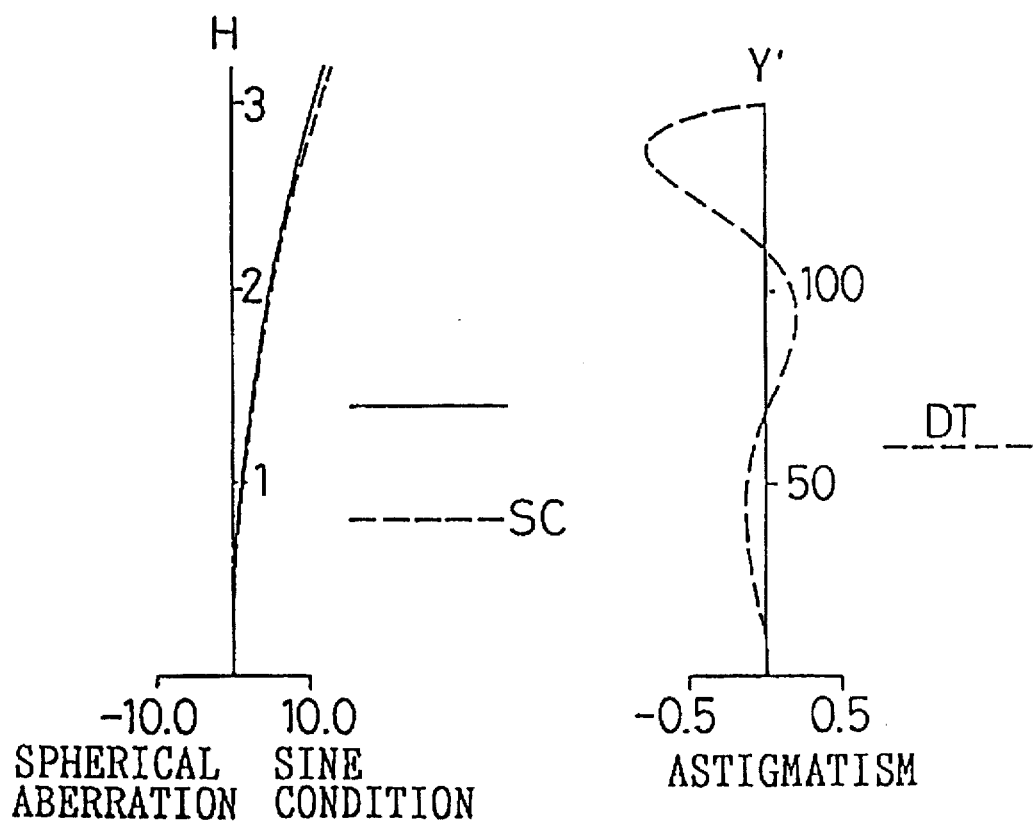
Fig. 19C
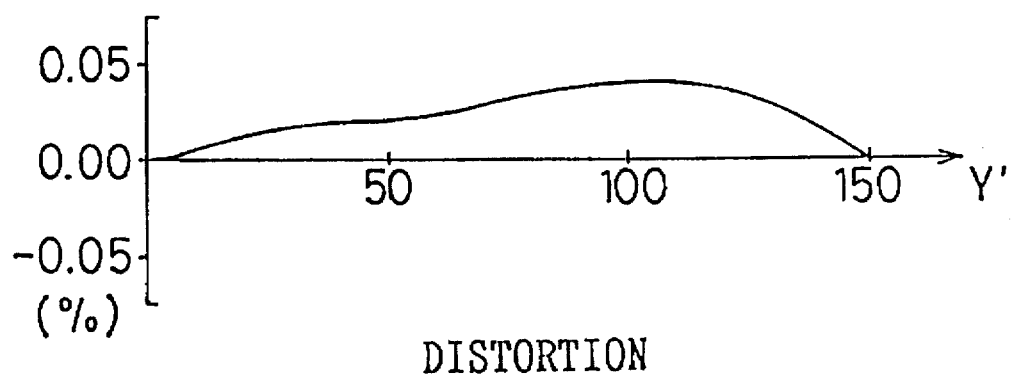

Fig. 20A
Fig. 20B
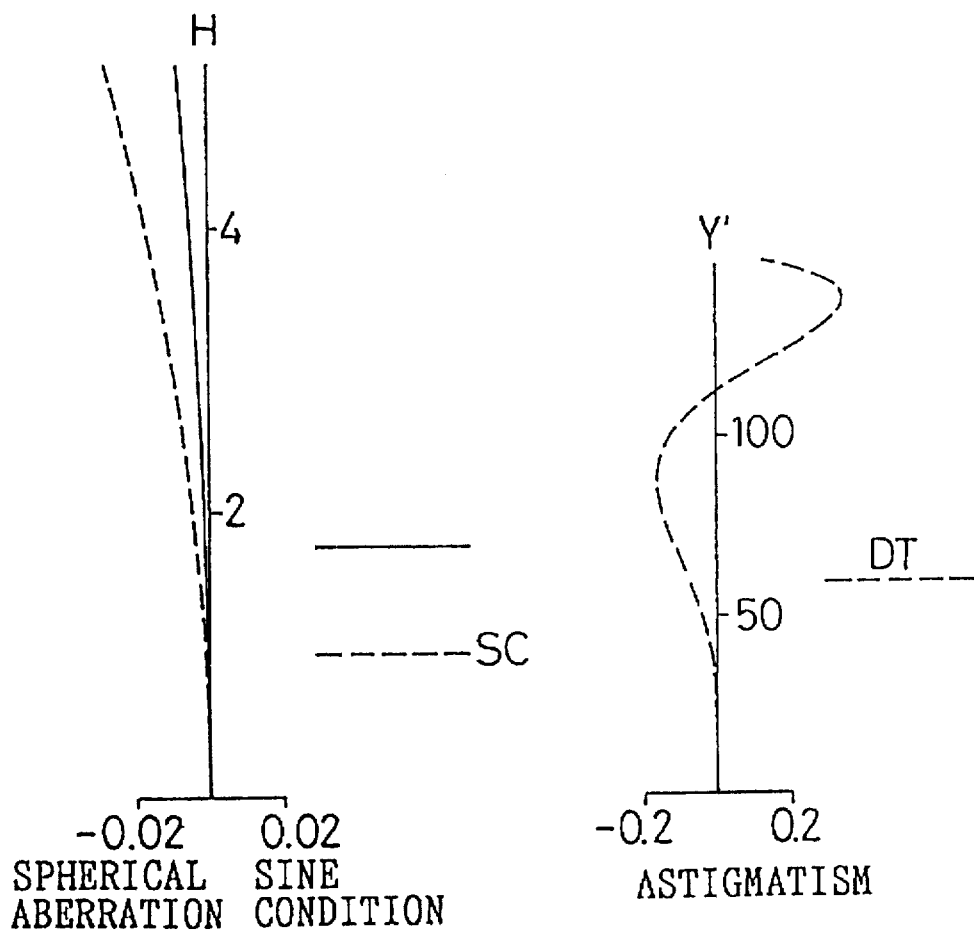
Fig. 20C
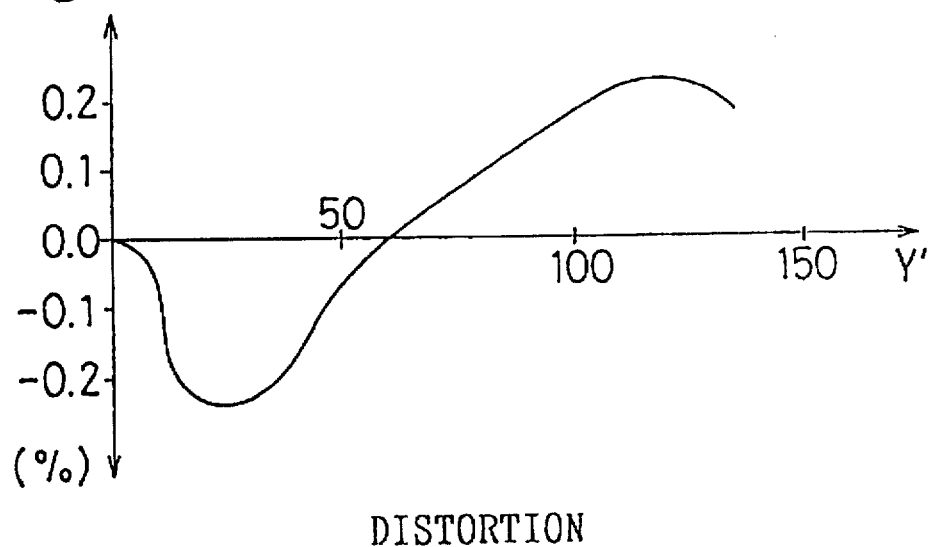

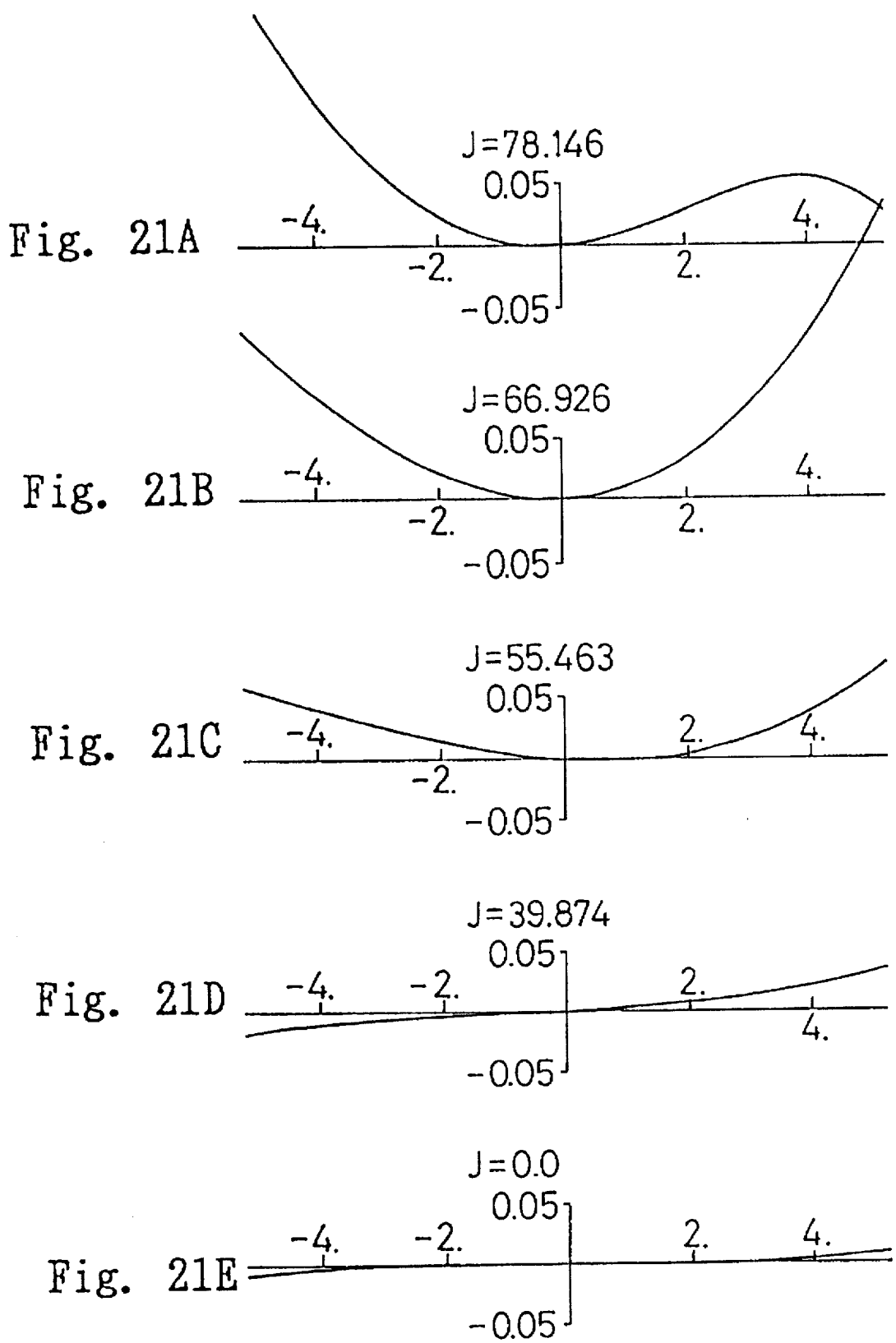

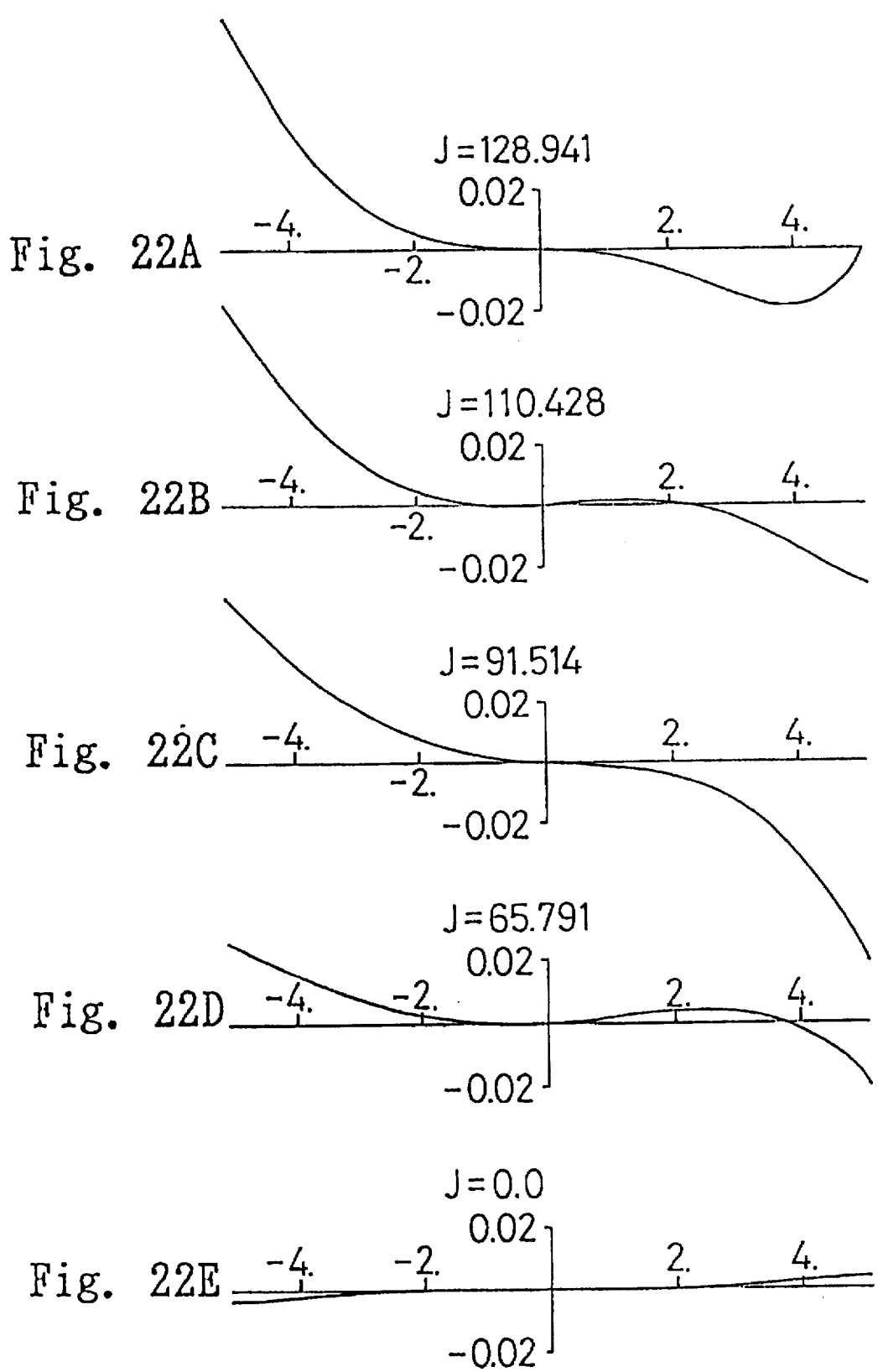

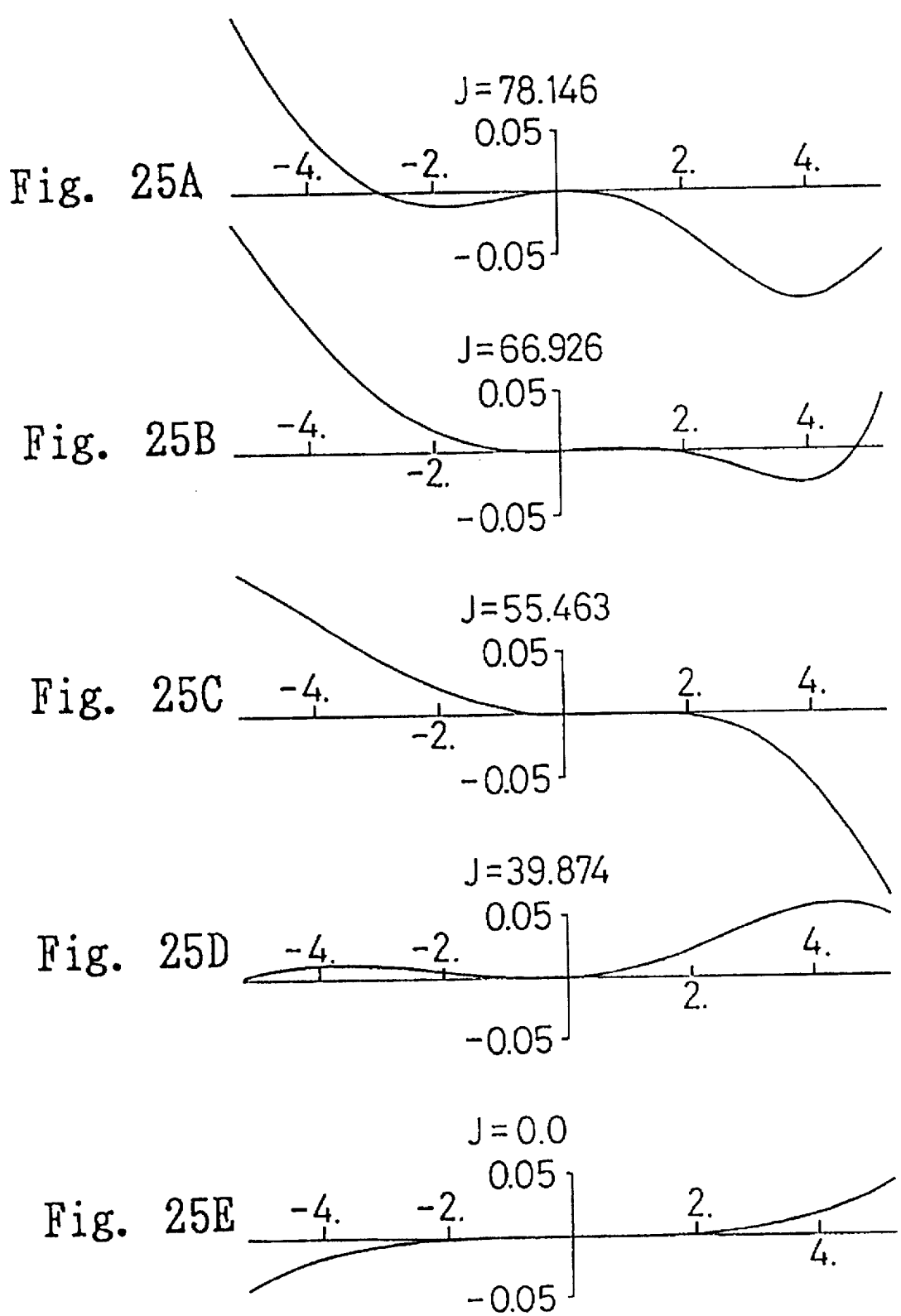

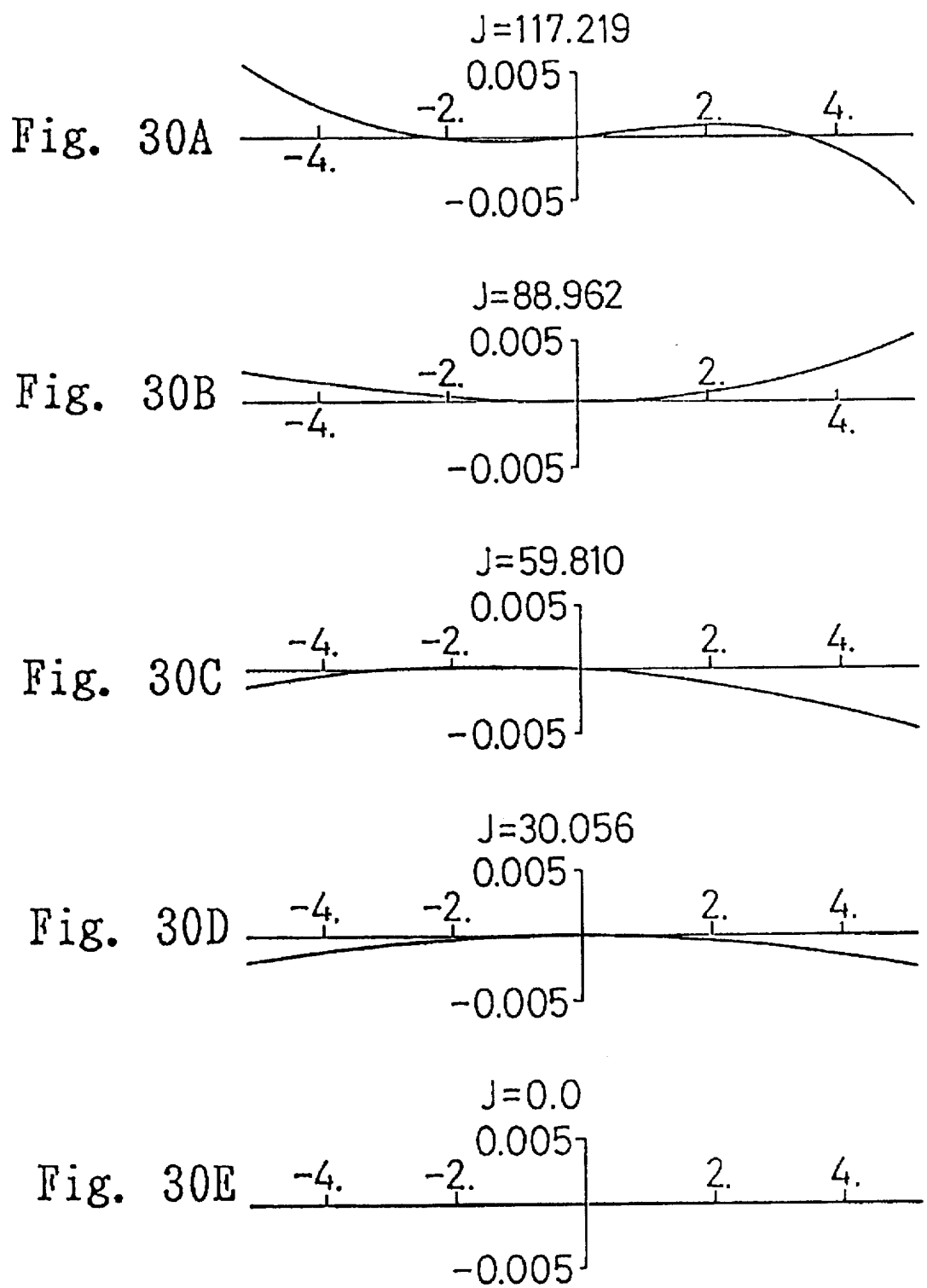

Fig. 33A
Sl=-∞
(PARALLEL BEAM)
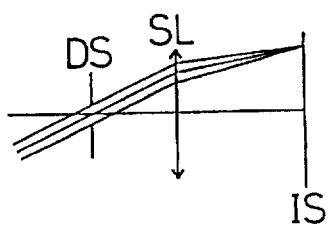
Fig. 33B
-∞<Sl<0
(DIVERGENT BEAM)
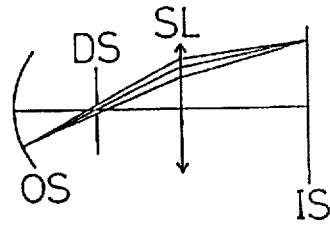
Fig. 33C
Sl=0
(DIVERGENT BEAM)
NO SCANNING
Fig. 33D
0<Sl<c
(DIVERGENT BEAM)
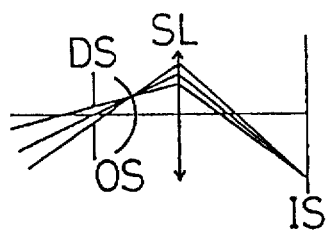
Fig. 33E
Sl=c
NO IMAGE
Fig. 33F
c<Sl<L
(CONVERGENT BEAM)
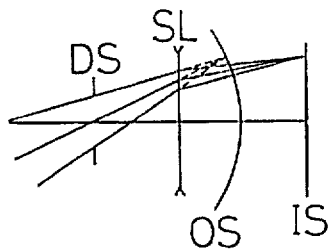
Fig. 33G
Sl=L
(CONVERGENT BEAM)
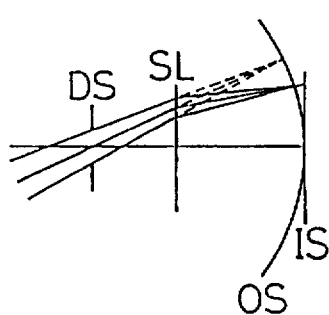
Fig. 33H
L<Sl<∞
(CONVERGENT BEAM)
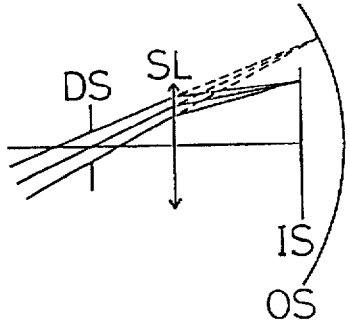
Fig. 33I
Sl=∞
(PARALLEL BEAM)
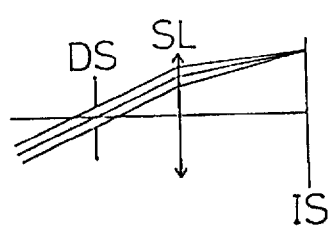

SCANNING OPTICAL SYSTEM

This is a division of prior application Ser. No. 08/354,604, filed on Dec. 13, 1994, for a SCANNING OPTICAL SYSTEM.

BACKGROUND OF THE INVENTION

1. Field of the Invention

The present invention relates to a scanning optical system, and more specifically, to a scanning optical system which forms a beam deflected at a uniform angular velocity by a deflector on a predetermined surface to scan the surface substantially at a uniform velocity.

2. Description of the Prior Art

In some conventional laser scanning optical systems used in an apparatus such as a laser printer, a divergent beam irradiated from a laser light source is transformed into a parallel beam by a collimator lens, etc., and is then deflected at a uniform angular velocity by a deflector such as a polygonal mirror. The laser beam spot is formed into an image on a scanned surface by a scanning lens system, and the scanned surface is scanned substantially at a uniform velocity.

The scanning lens used for this purpose is provided with an fθ characteristic. The fθ characteristic is a characteristic that Y'=fθ is satisfied when Y' is an image height on an image surface corresponding to a parallel beam incident on the scanning lens at an angle θ of view. Here, f is a focal length of the scanning lens. In this case, the angle θ of view is an angle of the light beam deflected by the deflector to the optical axis of the scanning lens. The angle θ of view will hereinafter be referred to as a deflection angle.

Normally, a scanning lens is designed so that the scanning width necessary for the scanning optical system is the maximum image height. The maximum image height is an image height at the scanning start position and at the scanning end position on the scanned surface. The maximum height will hereinafter be represented by $Y'_{max}$. For example when the scanning optical system is used in a laser printer, the scanning width is the maximum printable sheet width.

Therefore, when a scanning lens is provided with the fθ characteristic, the maximum image height $Y'_{max}$ is defined by the focal length f and the maximum deflection angle θ (this deflection angle will hereinafter be referred to as a maximum deflection angle $\theta_{max}$).

Conventionally, in designing a scanning lens provided with the fθ characteristic for scanning a predetermined scanning width, by designing it to have a large maximum deflection angle $\theta_{max}$ and a small focal length f, the total length (i.e. the distance from the deflection surface of the deflector to the image surface) is reduced to thereby reduce the size of the entire scanning optical system.

In the scanning lens having the fθ characteristic, however, the increase of the maximum deflection angle $\theta_{max}$ is limited because of aberration correction. On the other hand, it is necessary for the scanning optical system to form a beam into an image on the scanned surface so that the beam width on the deflection surface is converged into a spot size on the scanned surface in accordance with the image density. In the scanning lens having the fθ characteristic, as the total length decreases, the focal length f of the scanning lens decreases and the maximum deflection angle $\theta_{max}$ increases, so that a beam incident on the scanning lens having a high curvature is largely bent inward (so that the angle of the beam to the optical axis decreases) after it is incident on the scanning lens. This results in an increase in generation amount of aberrations according to the diameter of the beam incident on the scanning lens. In the scanning lens having the fθ characteristic, if the total length is reduced by increasing the maximum deflection angle $\theta_{max}$, it is difficult to restrain the generation of aberrations even if a number of aspherical surfaces are used.

When the scanning speed is increased in a scanning optical system having a large maximum deflection angle $\theta_{max}$, the size of the deflector is largely increased or the speed of rotation of the deflector is largely increased. When the maximum deflection angle $\theta_{max}$ is increased, the main scanning direction width of the reflection area per one deflection surface of the deflector increases, so that the size of the deflector increases. When a polygonal mirror is used as the deflector, the scanning speed is proportional to the number of surfaces of the polygonal mirror and the rotation speed of the polygonal mirror. If the number of surfaces of the polygonal mirror is increased to obtain a predetermined scanning speed, the size of the polygonal mirror is also largely increased. If a polygonal mirror having a small number of surfaces is used to reduce the size, a rotary motor having an extremely high rotation speed is required, which results in an increase in cost.

A scanning optical system has been proposed which scans the scanned surface by making incident on the scanning lens not a parallel beam but a convergent beams having its natural convergence point located on the rear side (plus side) of the scanned surface. For example, U.S. Pat. Nos. 5,111,216 and 5,128,795 enable the correction of distortion and field curvature by using only one lens with respect to a beam in the vicinity of the maximum deflection angle by providing the power arrangement in the main scanning direction not only to the refractive power of the scanning lens in the main scanning direction but also to the convergent beam.

However, even if the convergent beam is used for the scanning optical system, it is necessary to increase the maximum deflection angle $\theta_{max}$ to reduce the total length, so that a problem arises similar to that of the above-described scanning lens having the fθ characteristic and aberration correction is difficult.

If a resin-made scanning lens is used in such a scanning optical system, a performance variation due to a temperature variation is caused. This will hereinafter be described.

In scanning optical systems, an image surface shift amount (hereinafter referred to as "image surface shift") ΔBF in the main scanning direction due to a temperature variation at a focal length $f_M$ is given by the following expression (a):

$$\Delta BF = (1-\beta)^2 \cdot \left( -\frac{1}{n-1} \cdot \frac{\delta n}{\delta t} + \alpha \right) \cdot f_M \cdot \Delta t \qquad (a)$$

where β is a magnification of a scanning lens in the main scanning direction, n is a refractive index of the scanning lens, δn/δt is a refractive index variation due to a temperature variation of the scanning lens, α is a linear expansion coefficient of the scanning lens, $f_M$ is a focal length of the scanning lens in the main scanning direction, and Δt is a temperature variation amount of the scanning lens.

The value of $$-\frac{1}{n-1} \cdot \frac{\delta n}{\delta t} + \alpha$$

of the expression (a) depends on the material of the scanning lens. While this value is approximately ±0.5×10⁻⁵ when the material is glass, when the material is resin, the value is approximately ±30×10⁻⁵, which is approximately 50 times that of glass material.

Resin-made scanning lenses are easily processed to have aspherical surfaces since they can be made by injection molding. Thereby, the performance of the lenses can be improved and the manufacture of the lenses can be performed at a lower cost than conventional glass-made lenses. Thus, a scanning optical system using a resin-made scanning lens is advantageous in both performance and cost compared to a scanning lens using a glass-made scanning lens.

However, when a temperature variation occurs, a performance variation such as the image surface shift is large in the resin-made scanning lens since the refractive index variation ($\delta n/\delta t$) is large in the resin-made scanning lens compared to the glass-made scanning lens as mentioned above. The effect of this performance variation is large particularly in a small-diameter-beam scanning lens having a high performance.

In view of this problem, Japanese Laid-open Patent Applications Nos. H4-153616, H4-110817 and U.S. Pat. No. 5,111,219, etc. disclosed scanning optical systems where a resin material with a refractive index n of approximately 1.6 can be used as it is for the scanning lens.

However, the above prior arts have the following problems. In the scanning optical systems of Japanese Laid-open Patent Applications Nos. H4-153616 and H4-110817, since the beam incident on the scanning lens is a parallel beam, $\beta=0$ in the expression (a). The image surface shift amount $\Delta BF$ depends on the focal length $f_M$ of the scanning lens and the material of the scanning lens. For this reason, to decrease the image surface shift amount $\Delta BF$ in the resin-made scanning lens, it is necessary to decrease the focal length $f_M$. As examples of a method to do this by combining positive lens elements, there are a method to further increase the angle of view and a method to increase the axial thickness of the lens. However, these methods are difficult to employ in view of designing and processing.

In the scanning optical systems shown in U.S. Pat. No. 5,111,219, since the beam incident on the scanning lens is a convergent beam, $(1-\beta)<1$ in the expression (a). For this reason, the image surface shift amount $\Delta BF$ is smaller than those of the above-described prior arts (Japanese Laid-open Patent Applications Nos. H4-153616 and H4-110817). However, since it is inevitable to sacrifice the correction of coma to some extent to secure desired image surface quality and linearity, these scanning optical systems are disadvantageous in improving performance. Since the beam diameter on the image surface is comparatively large because of the effect of coma, the effect that the image surface shift due to a temperature variation is reduced is not very large although the fact that $(1-\beta)$ is small contributes to the reduction in size of a scanning optical system by using a scanning lens including one lens element. Since the scanning lens includes only one lens element, the surface of the lens is of a complicated configuration having an inflection point, etc. This makes the processing of the scanning lens difficult.

SUMMARY OF THE INVENTION

An object of the present invention is to provide a scanning optical system with its total length being reduced and with aberrations being excellently corrected irrespective of the size of the maximum deflection angle.

An another object of the present invention is to provide a high-performance scanning optical system where a performance variation such as the image surface shift due to a temperature variation is small even though a resin-made scanning lens is used.

BRIEF DESCRIPTION OF THE DRAWINGS

These and other objects and features of this invention will become clear from the following description, taken in conjunction with the preferred embodiments with reference to the accompanied drawings in which:

FIGS. 13A to 13C show aberration curves of the third embodiment of the present invention;

FIGS. 19A to 19C show aberration curves of the ninth embodiment of the present invention;

FIGS. 20A to 20C show aberration curves of the tenth embodiment of the present invention;

FIGS. 21A to 21E show lateral aberration curves of the first embodiment of the present invention;

FIGS. 22A to 22E show lateral aberration curves of the second embodiment of the present invention;

FIGS. 25A to 25E show lateral aberration curves of the fifth embodiment of the present invention;

FIGS. 30A to 30E show lateral aberration curves of the tenth embodiment of the present invention;

FIGS. 33A to 33I show optical paths when a distance S1 is varied in the present invention;

DESCRIPTION OF THE PREFERRED EMBODIMENTS

Figure 1:
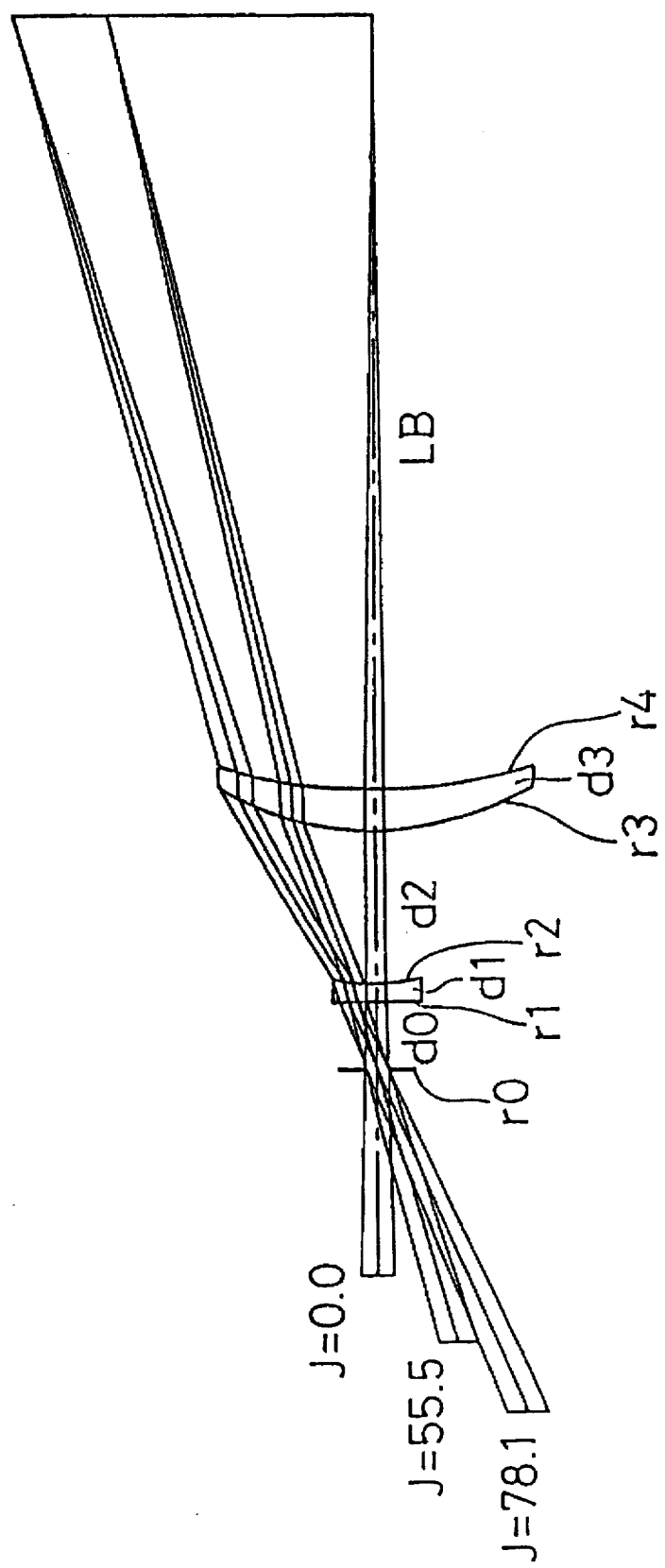
FIG. 1 shows the lens arrangement and optical paths of a first embodiment of the present invention.
Figure 2:
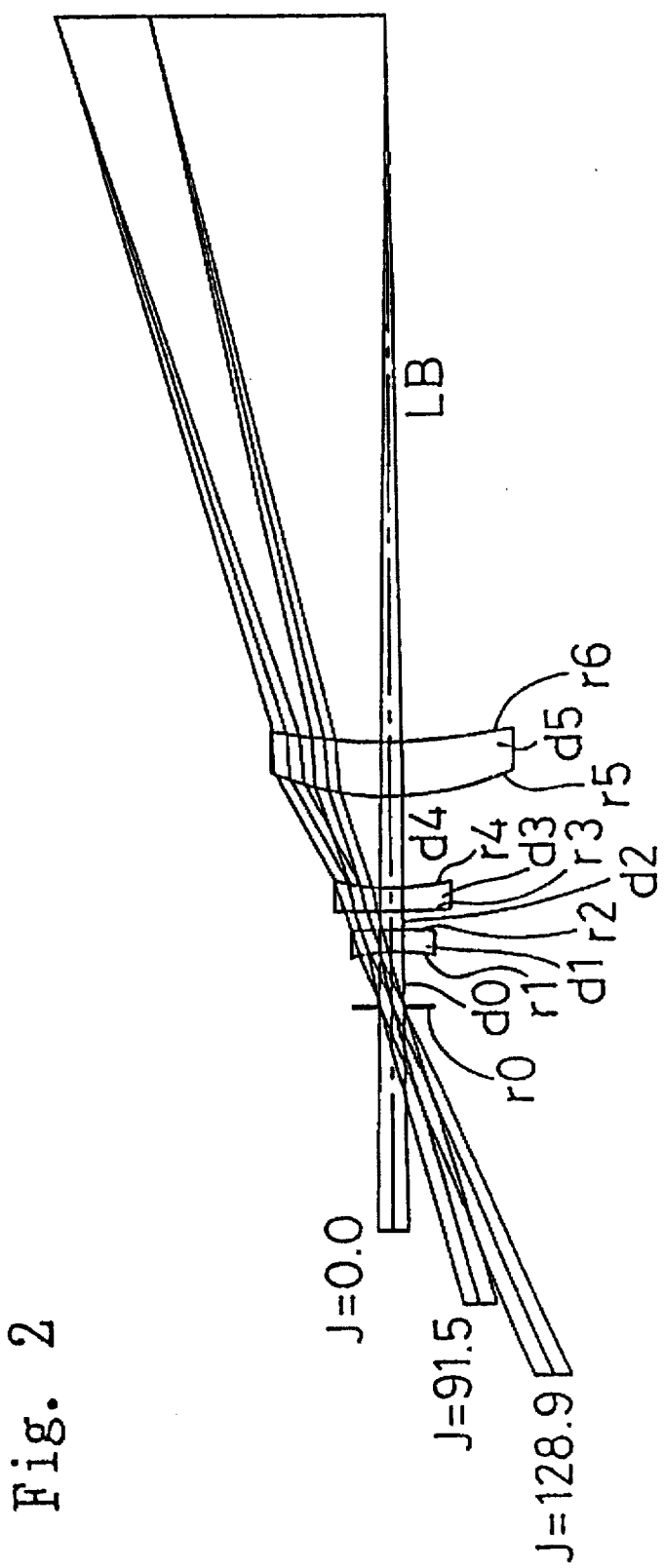
FIG. 2 shows the lens arrangement and optical paths of a second embodiment of the present invention.
Figure 3:
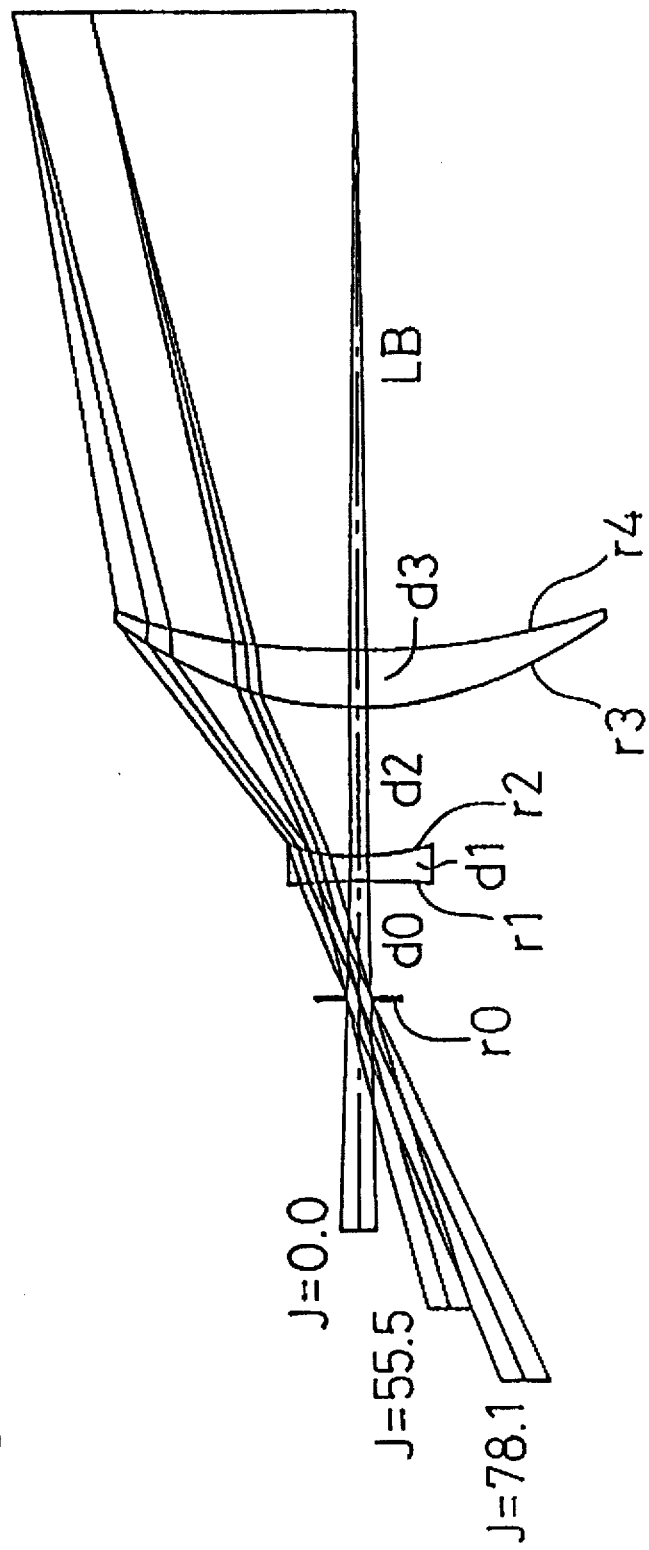
FIG. 3 shows the lens arrangement and optical paths of a third embodiment of the present invention.
Figure 4:
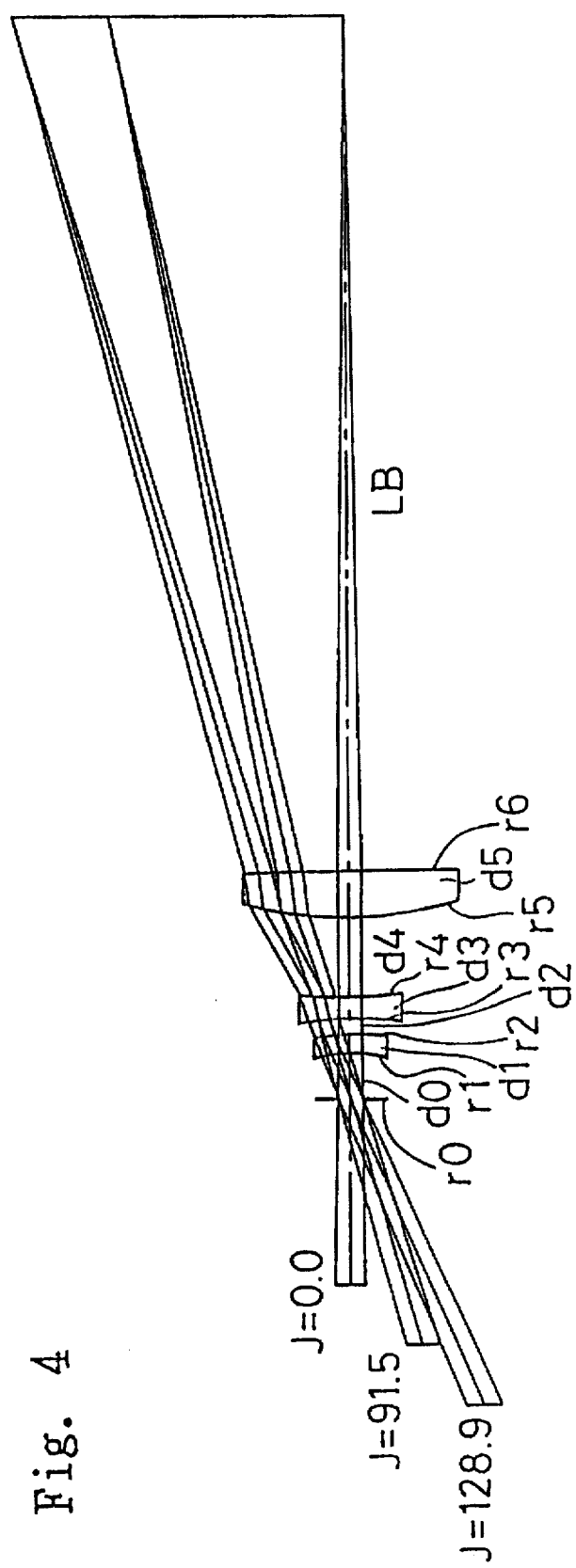
FIG. 4 shows the lens arrangement and optical paths of a fourth embodiment of the present invention.
Figure 5:
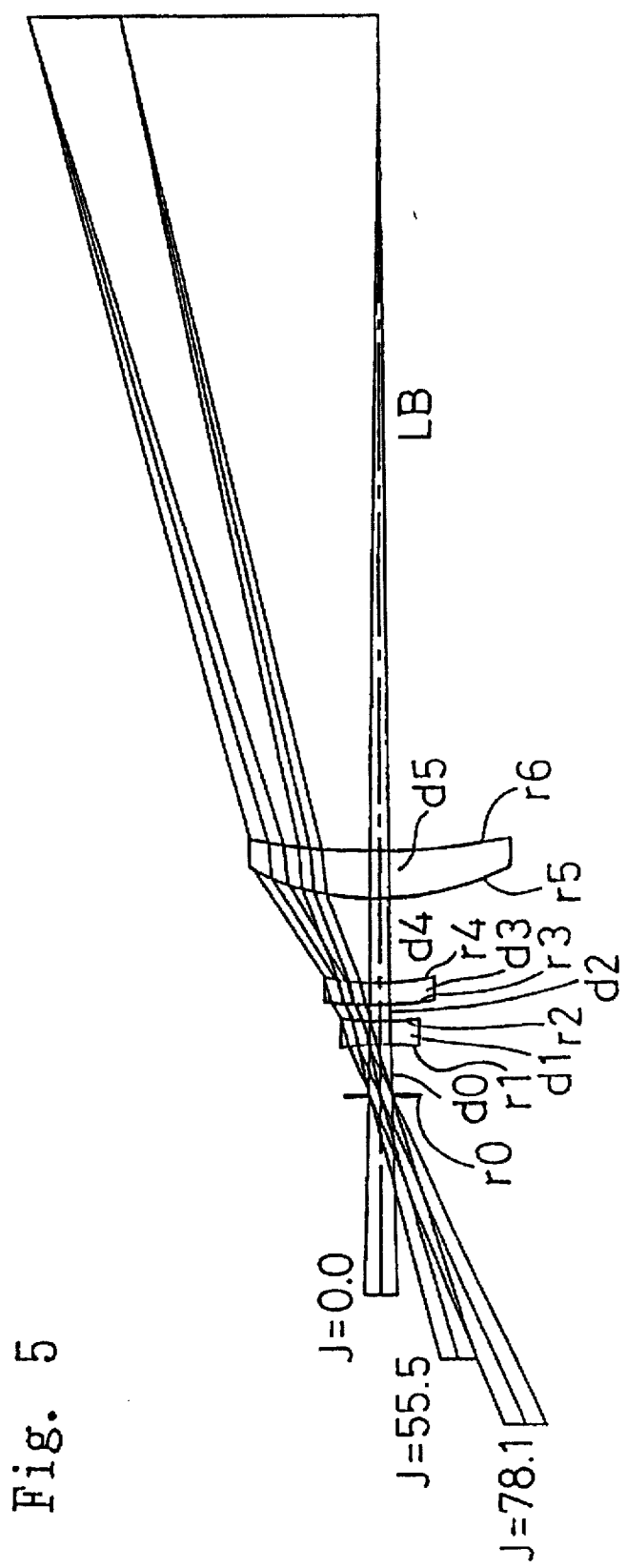
FIG. 5 shows the lens arrangement and optical paths of a fifth embodiment of the present invention.
Figure 6:
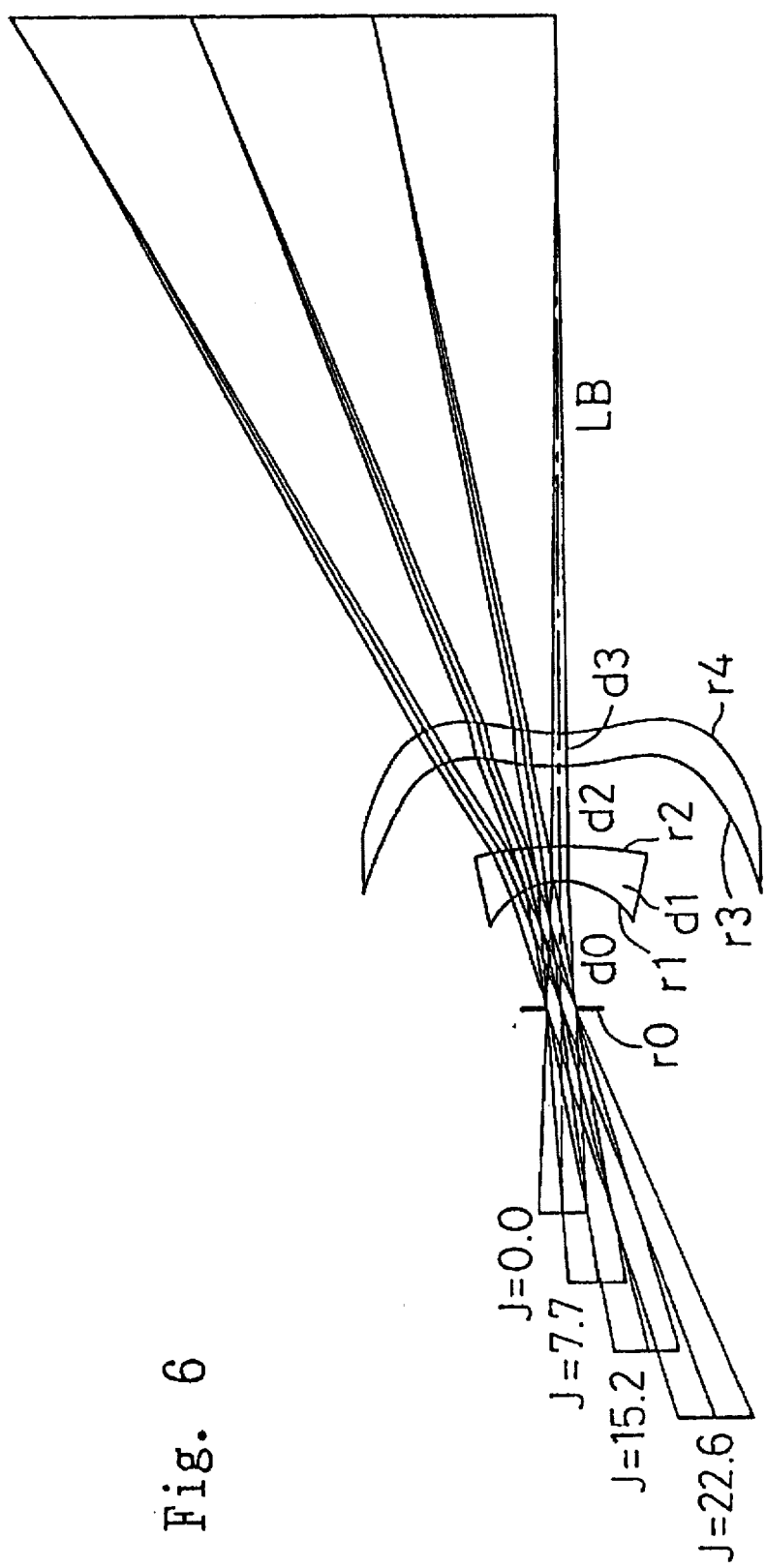
FIG. 6 shows the lens arrangement and optical paths of a sixth embodiment of the present invention.
Figure 7:
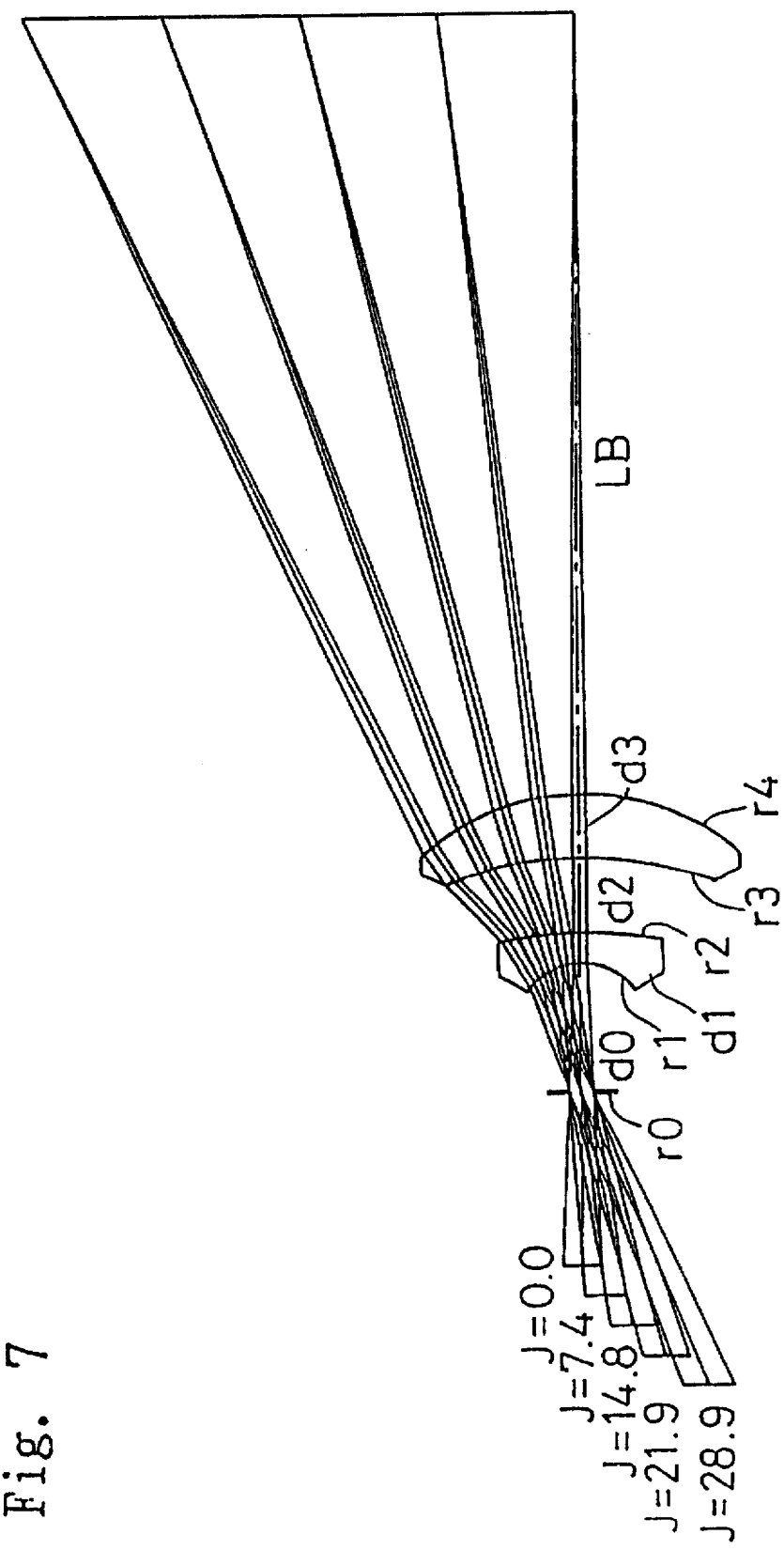
FIG. 7 shows the lens arrangement and optical paths of a seventh embodiment of the present invention.
Figure 8:
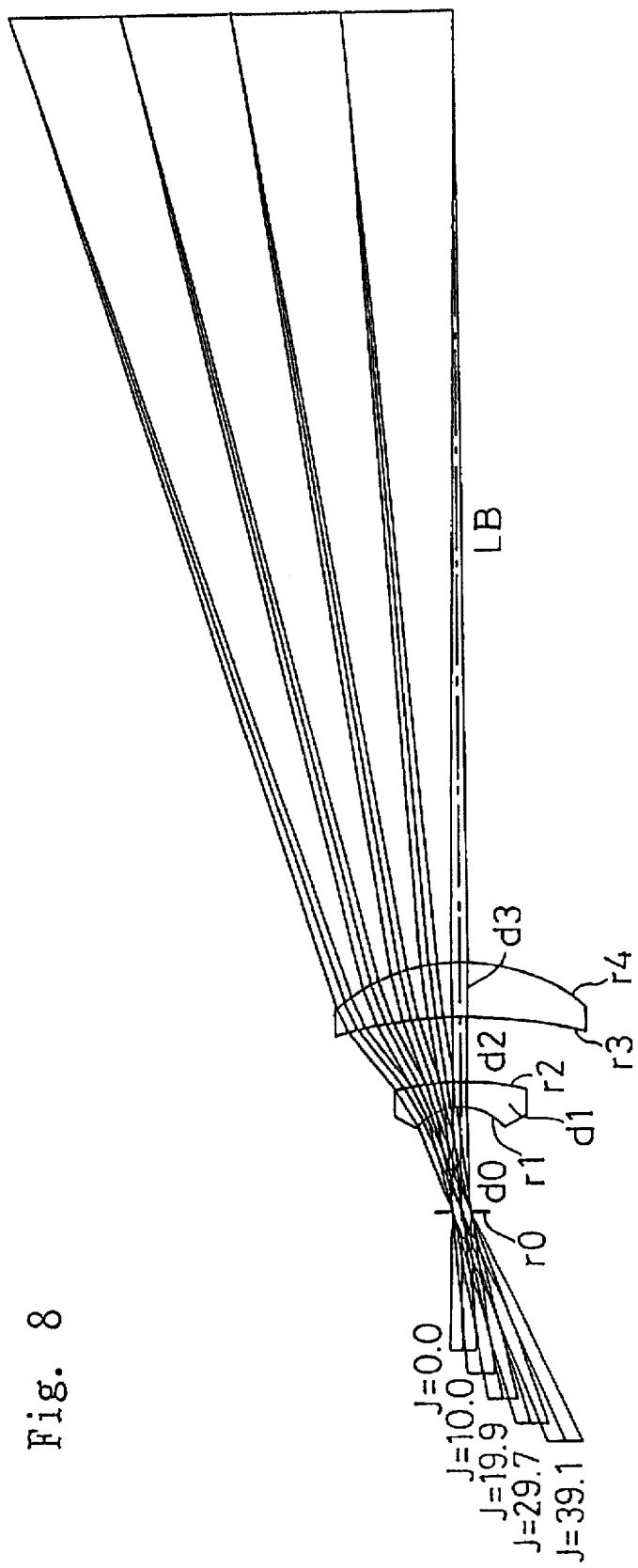
FIG. 8 shows the lens arrangement and optical paths of an eighth embodiment of the present invention.
Figure 9:
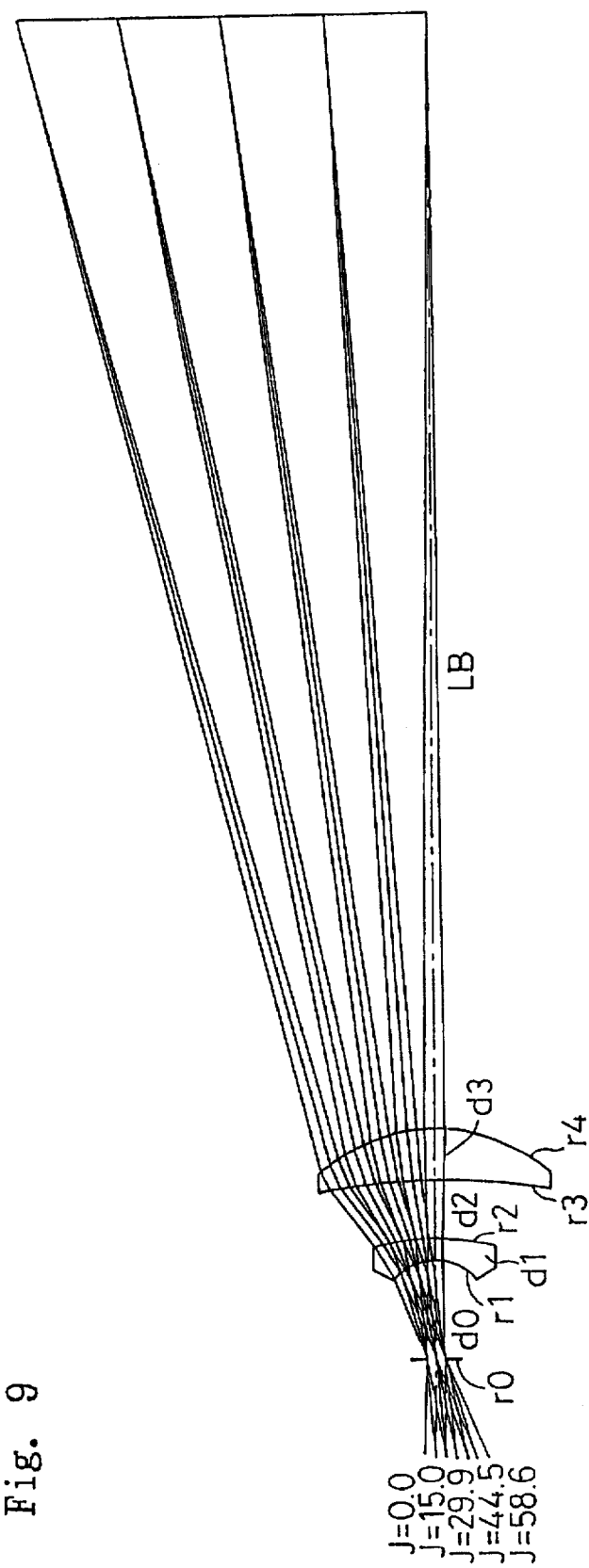
FIG. 9 shows the lens arrangement and optical paths of a ninth embodiment of the present Invention.
Figure 10:
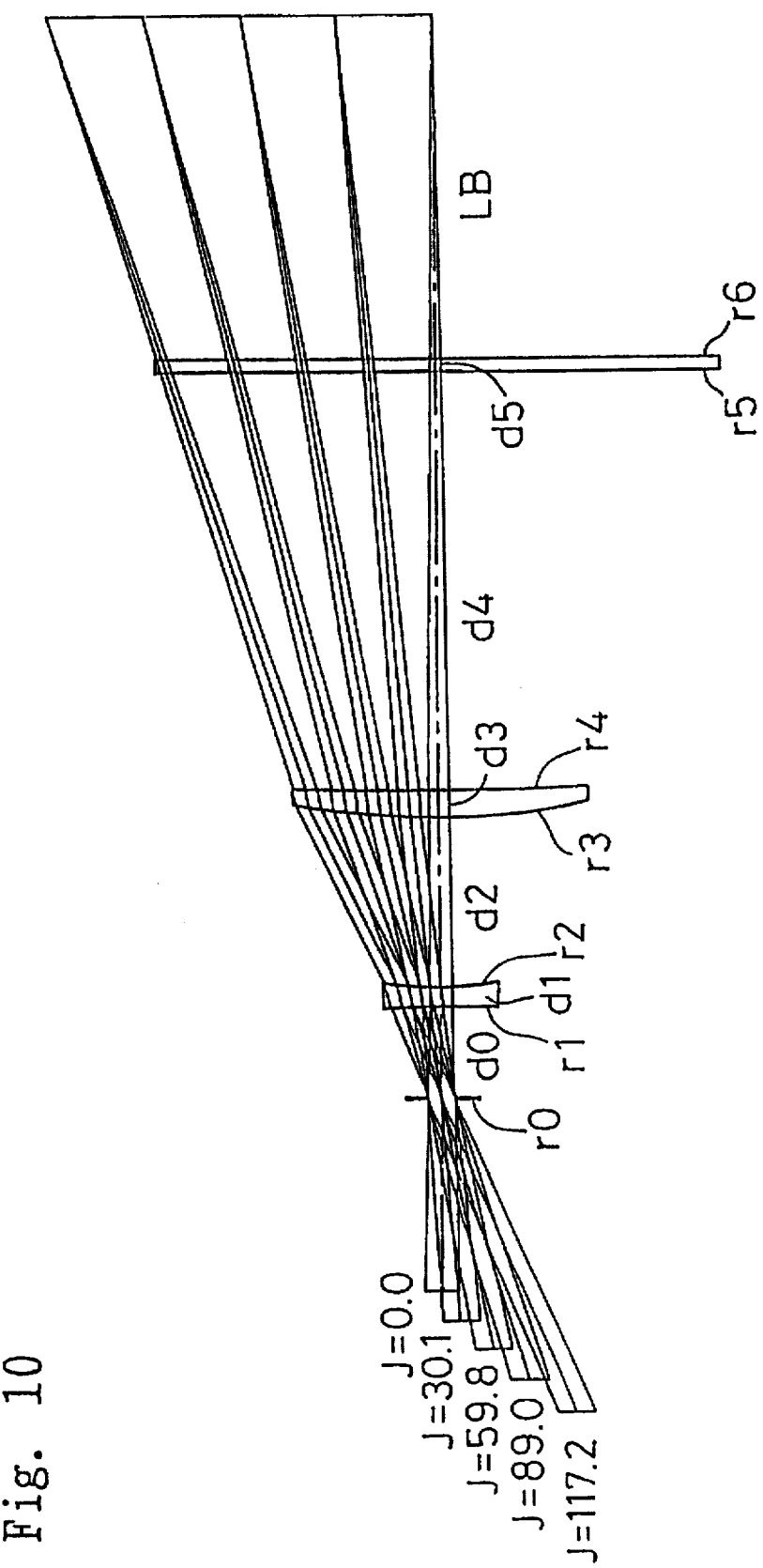
FIG. 10 shows the lens arrangement and optical paths of a tenth embodiment of the present invention.
Figure 11A:
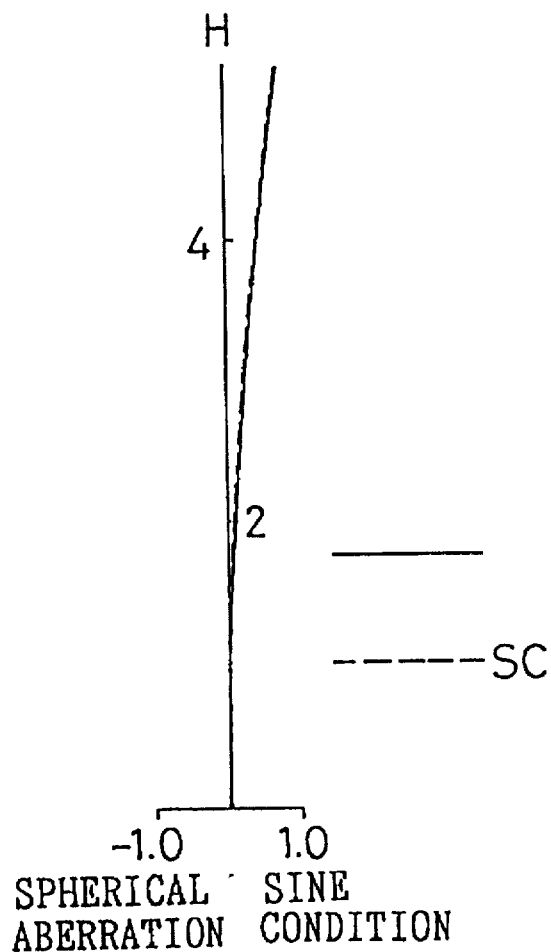
FIGS. 11A to 11C show aberration curves of the first embodiment of the present invention.
Figure 11B:
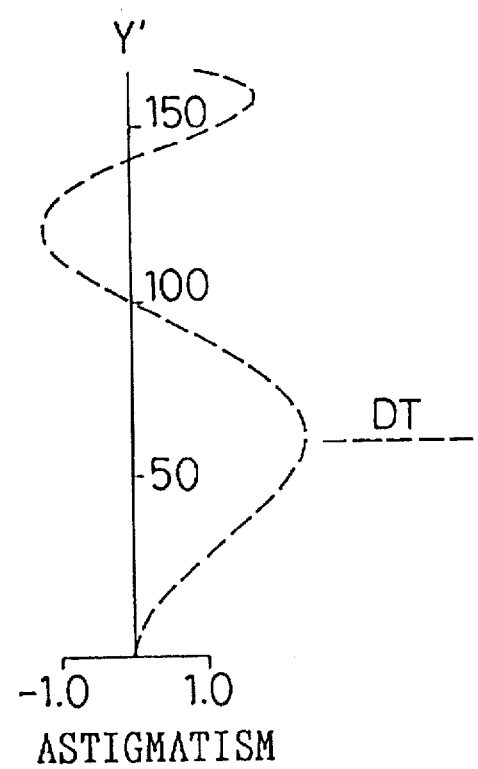
Figure 11C:
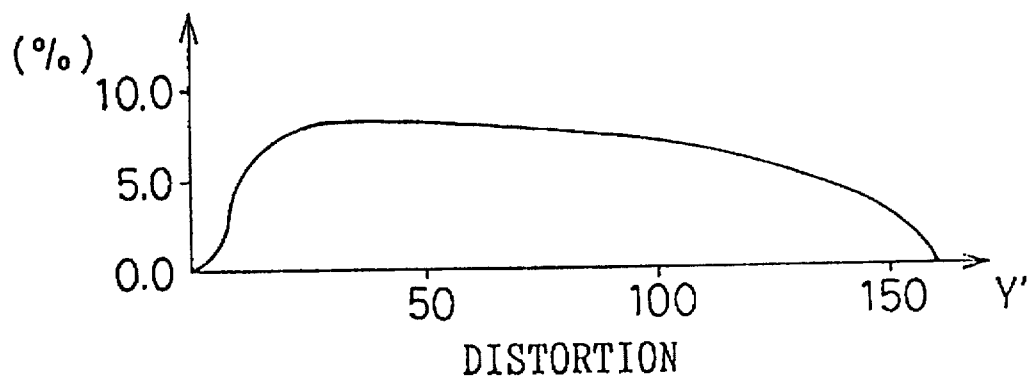
Figure 12A:
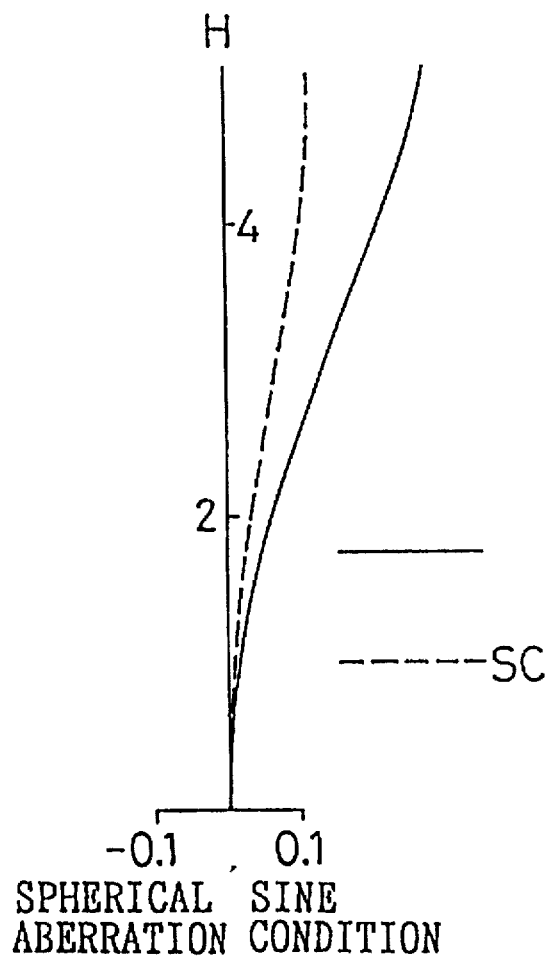
FIGS. 12A to 12C show aberration curves of the second embodiment of the present invention.
Figure 12B:
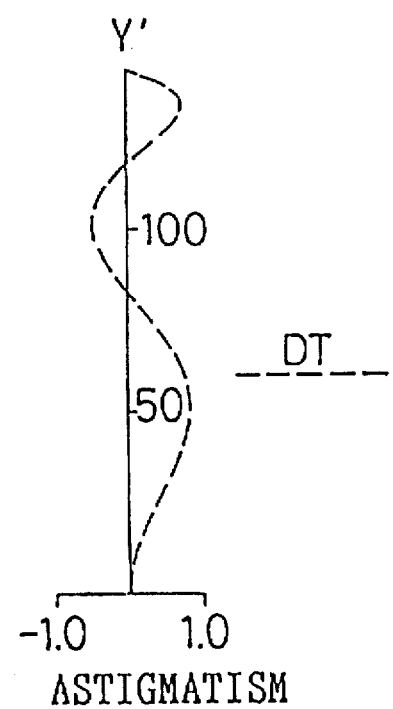
Figure 12C:
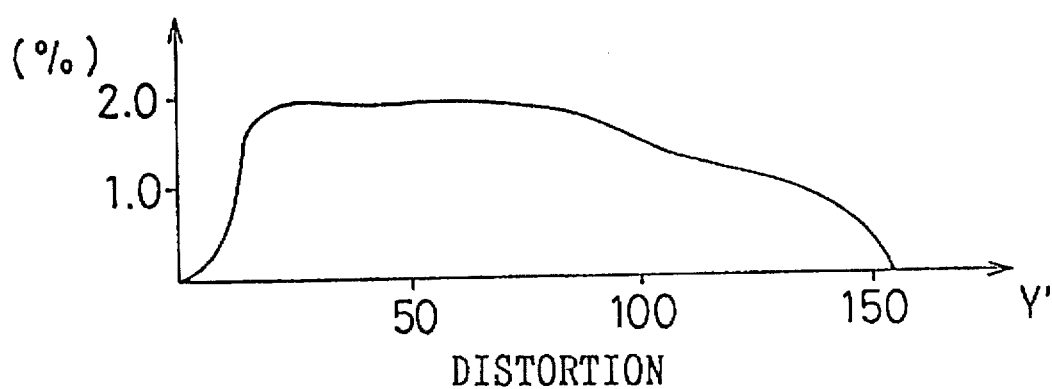
Figure 14A:
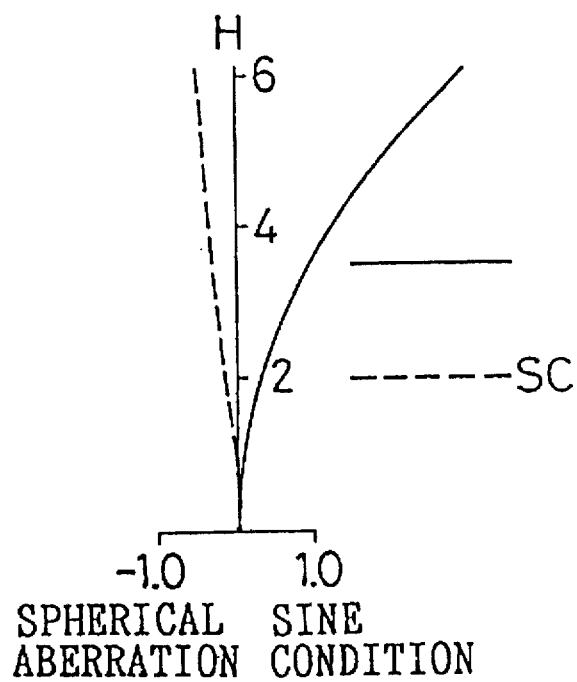
FIGS. 14A to 14C show aberration curves of the fourth embodiment of the present Invention.
Figure 14B:
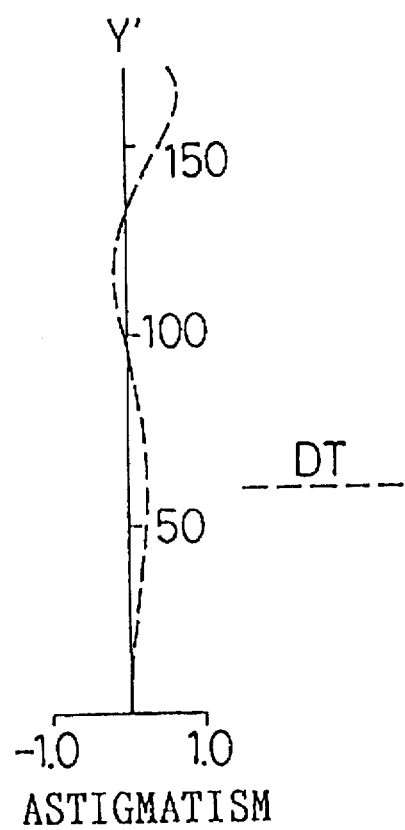
Figure 14C:
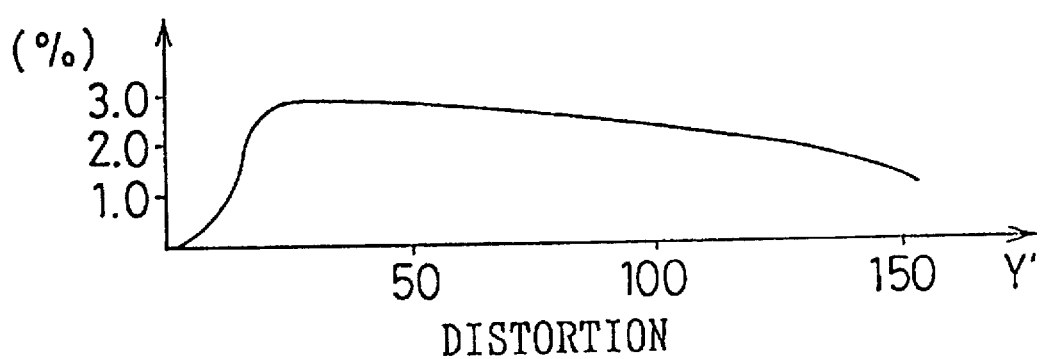
Figure 15A:
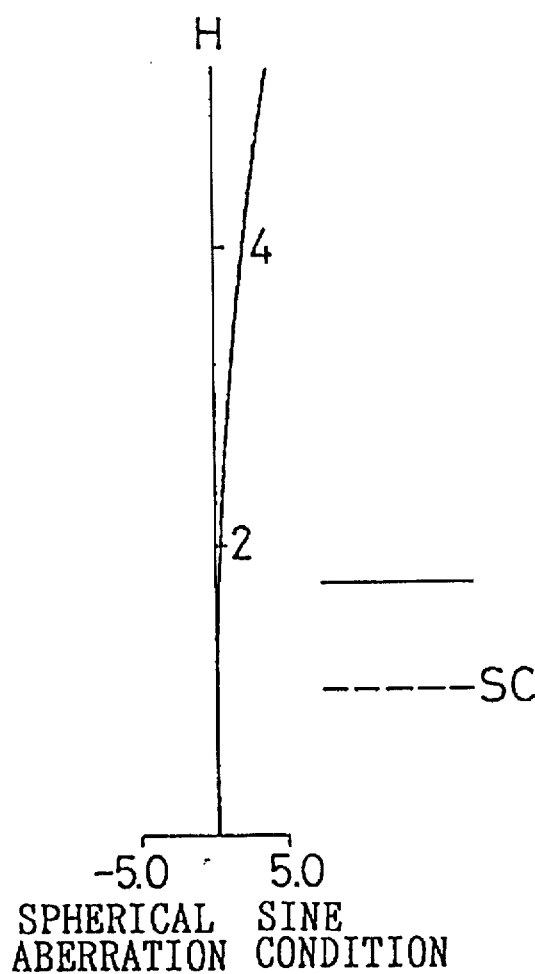
FIGS. 15A to 15C show aberration curves of the fifth embodiment of the present invention.
Figure 15B:
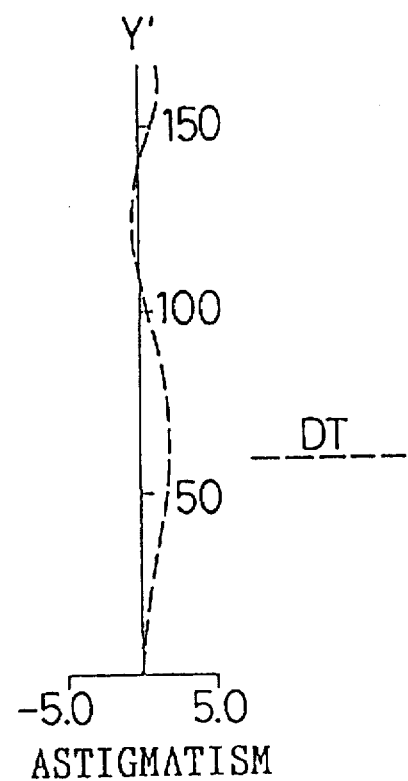
Figure 15C:
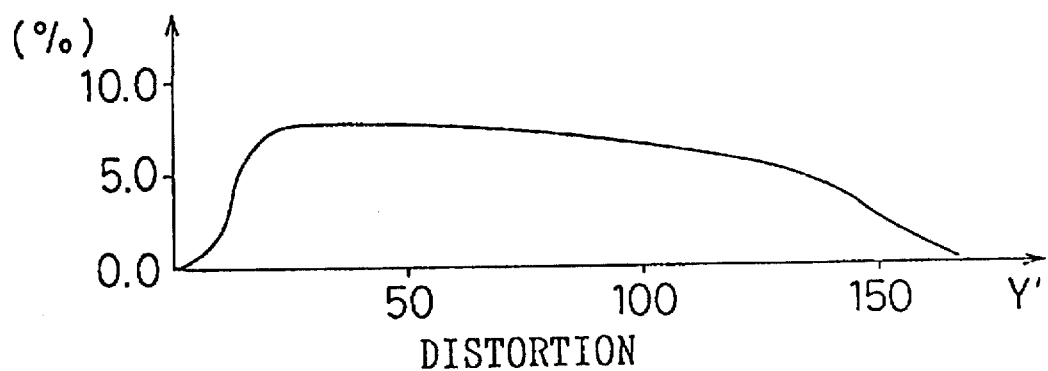
Figure 16A:
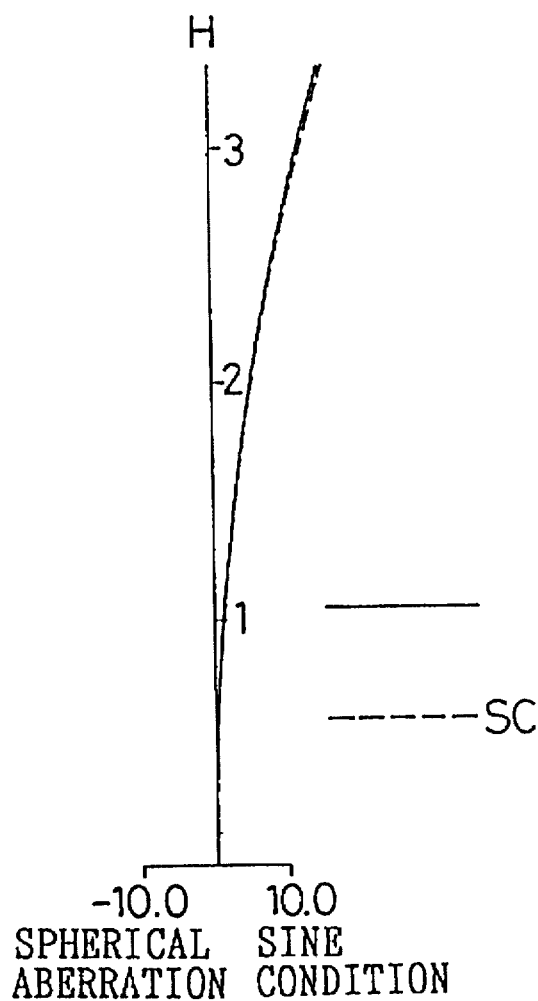
FIGS. 16A to 16C show aberration curves of the sixth embodiment of the present invention.
Figure 16B:
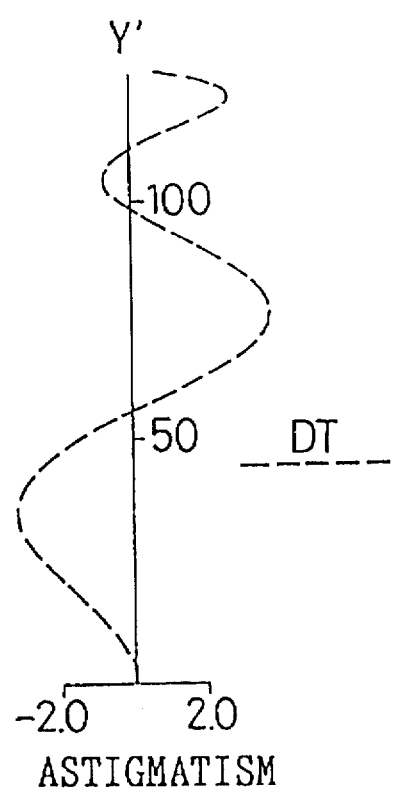
Figure 16C:
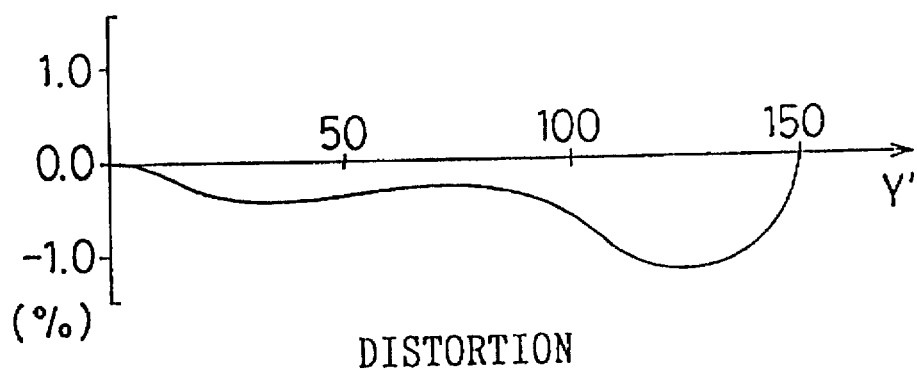
Figure 17A:
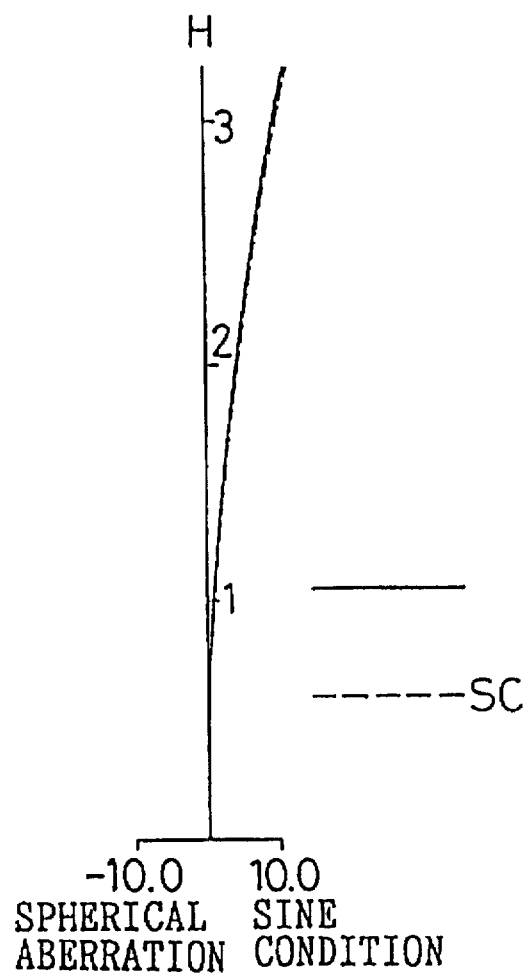
FIGS. 17A to 17C show aberration curves of the seventh embodiment of the present invention.
Figure 17B:
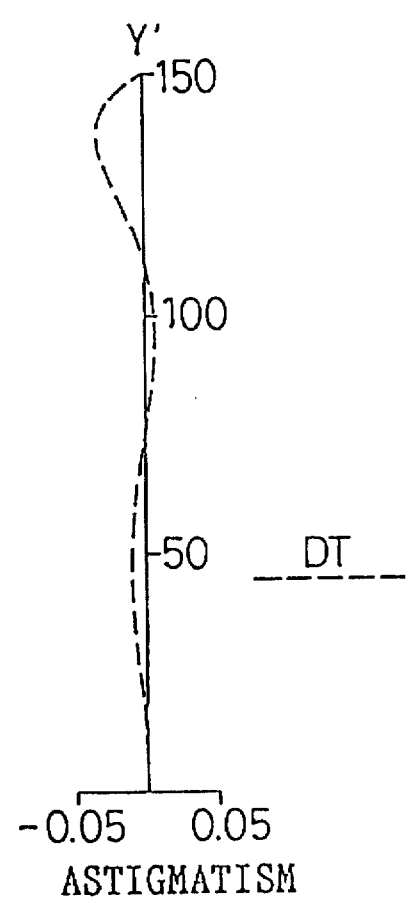
Figure 17C:
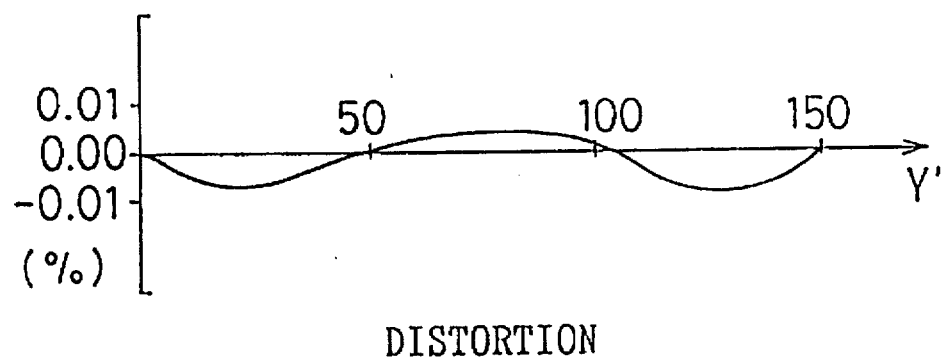
Figure 18A:
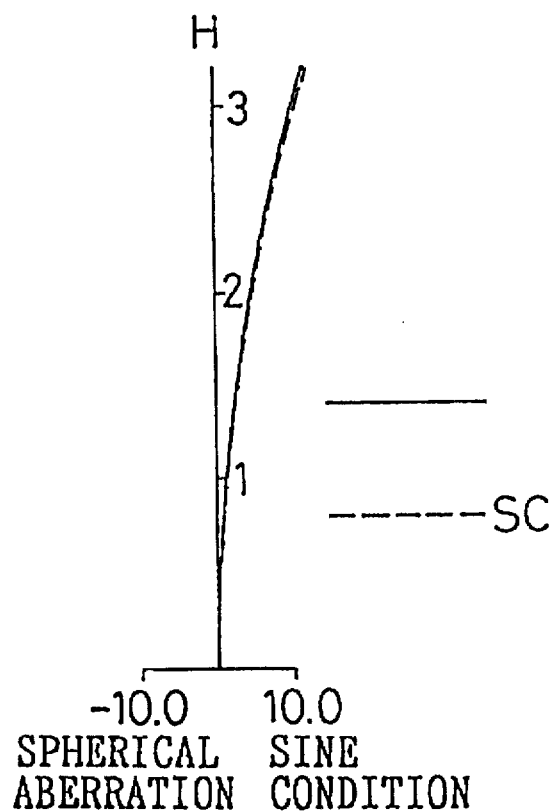
FIGS. 18A to 18C show aberration curves of the eighth embodiment of the present invention.
Figure 18B:
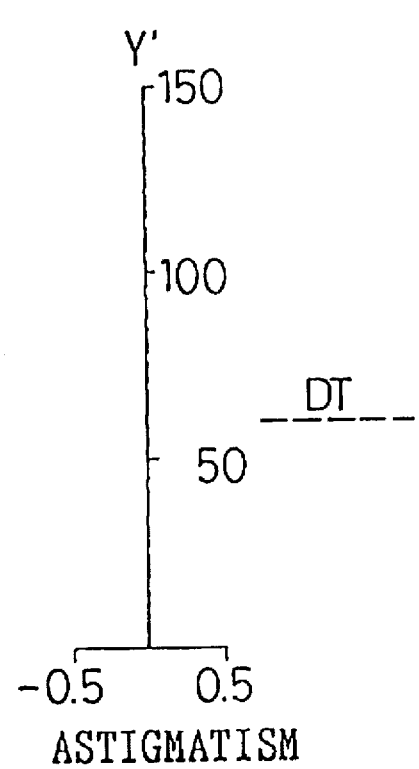
Figure 18C:
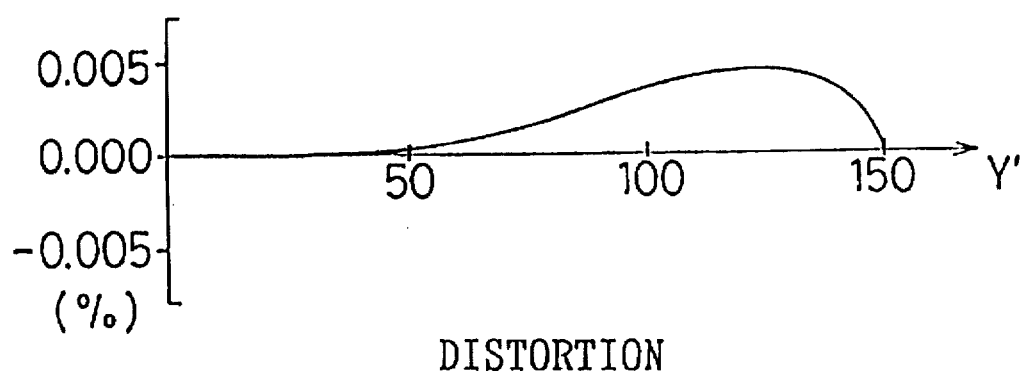
Figures 23A, 23B, 23C, 23D, 23E:
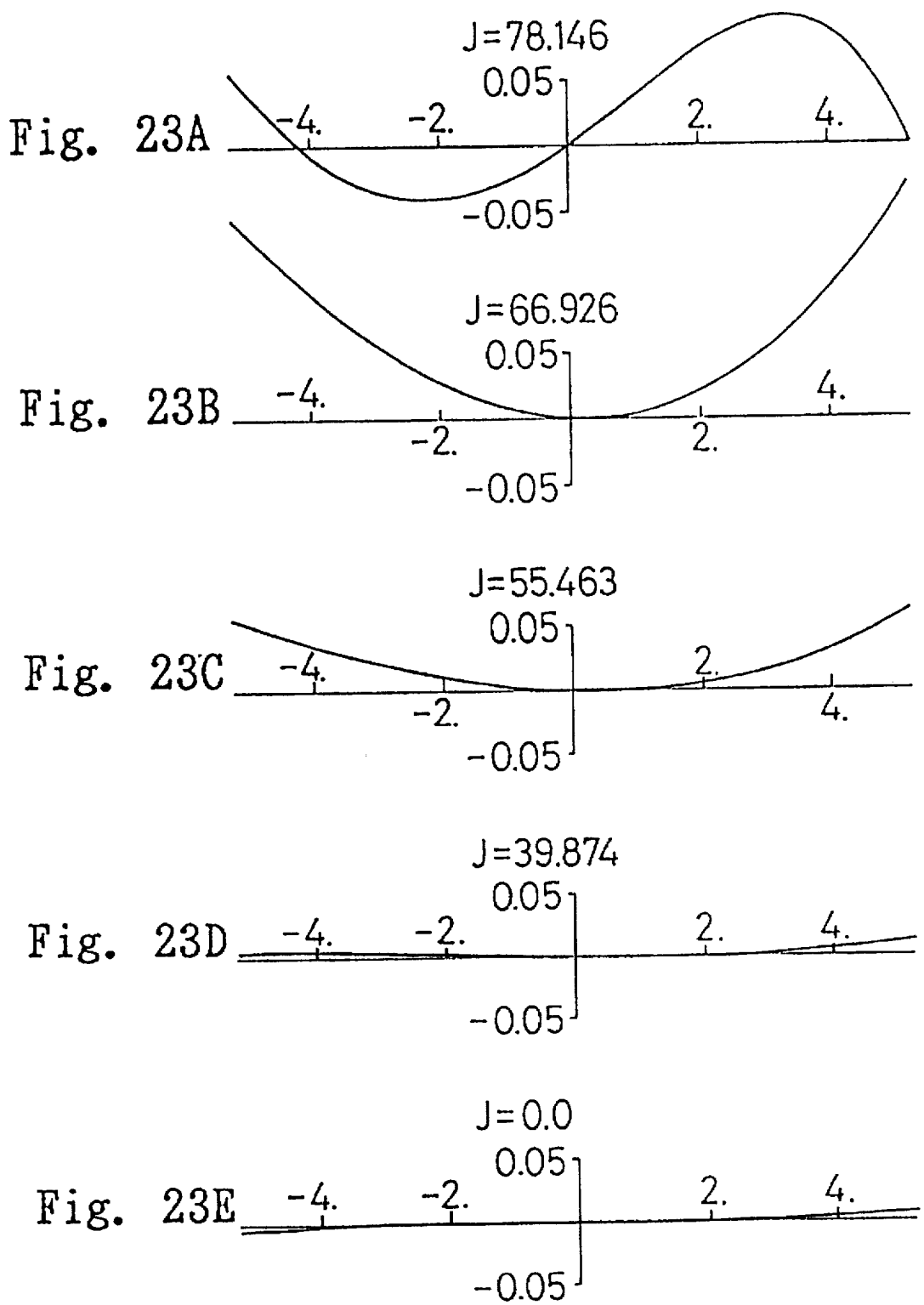
FIGS. 23A to 23E show lateral aberration curves of the third embodiment of the present invention.
Figure 24A:
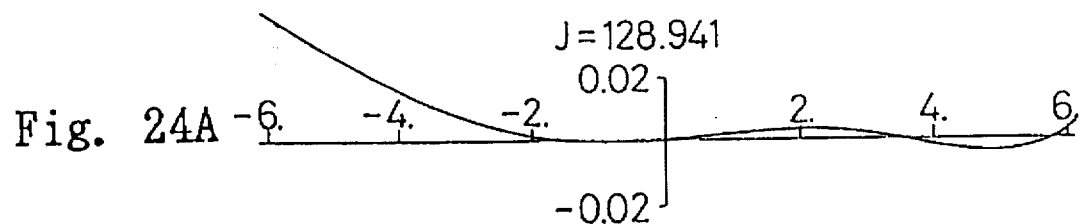
FIGS. 24A to 24E show lateral aberration curves of the fourth embodiment of the present invention.
Figure 24B:
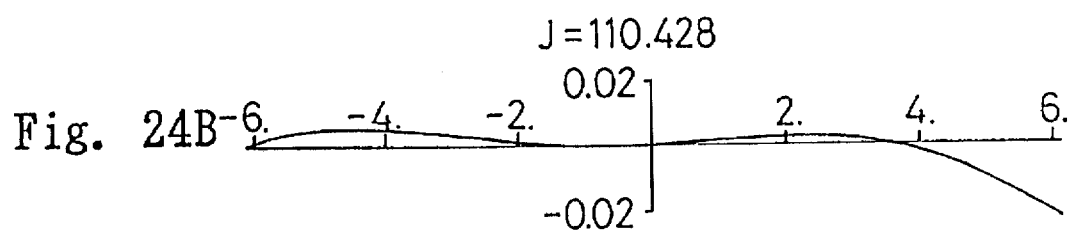
Figure 24C:
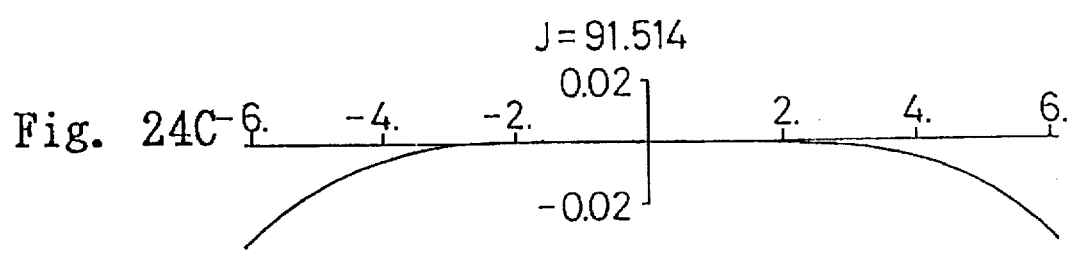
Figure 24D:
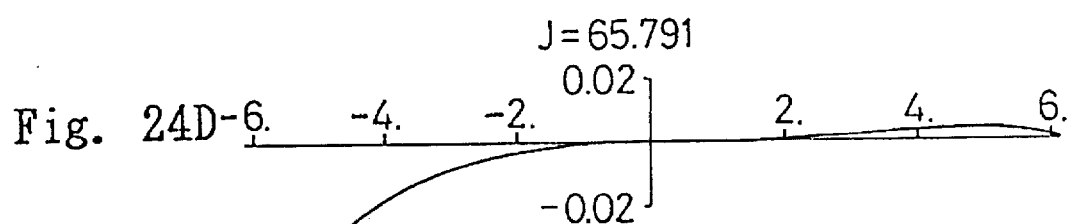
Figure 24E:
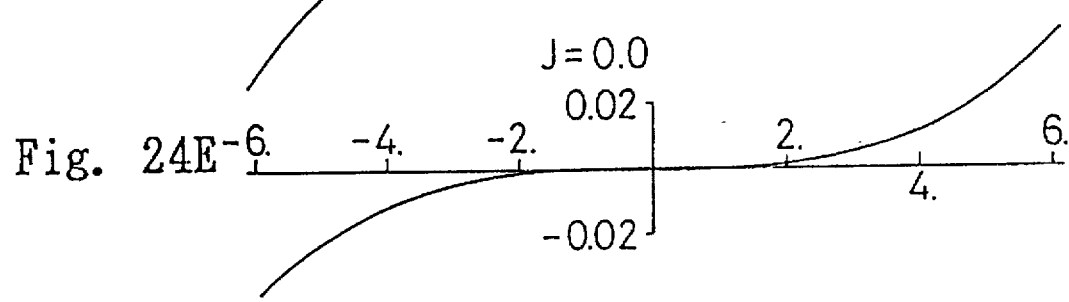
Figure 26A:
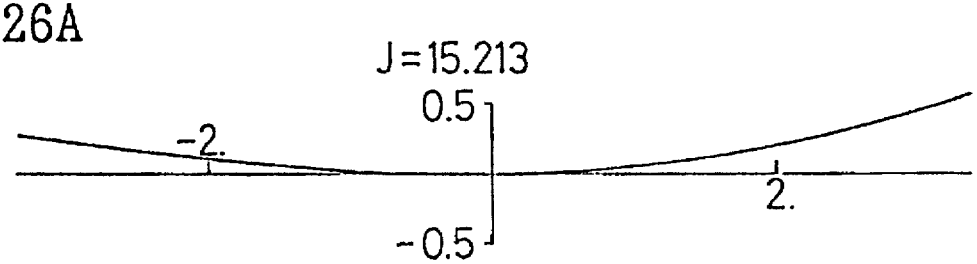
FIGS. 26A to 26E show lateral aberration curves of the sixth embodiment of the present invention.
Figure 26B:
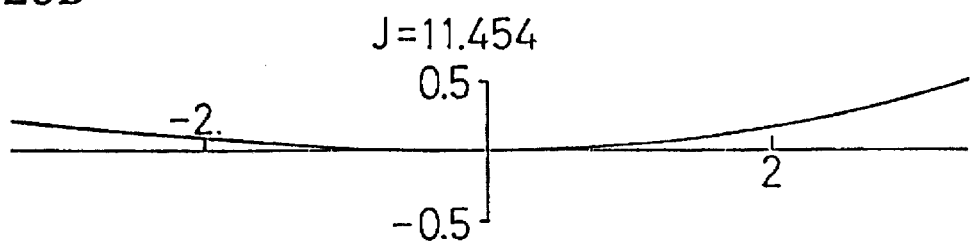
Figure 26C:
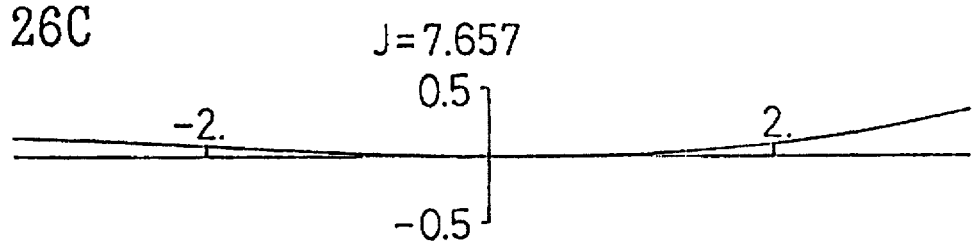
Figure 26D:
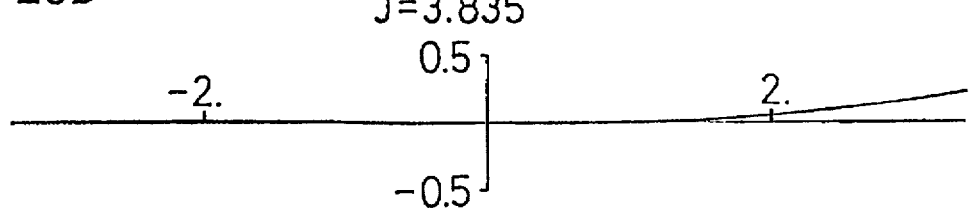
Figure 26E:
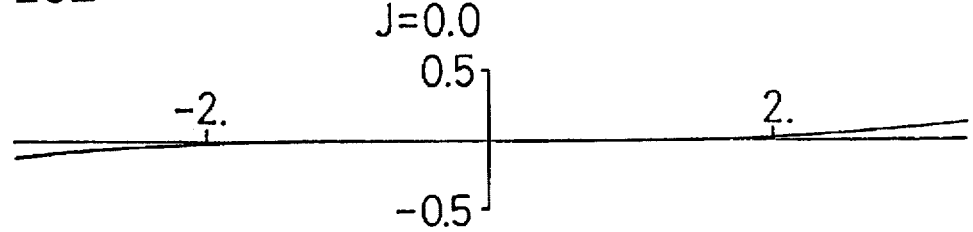
Figure 27A:
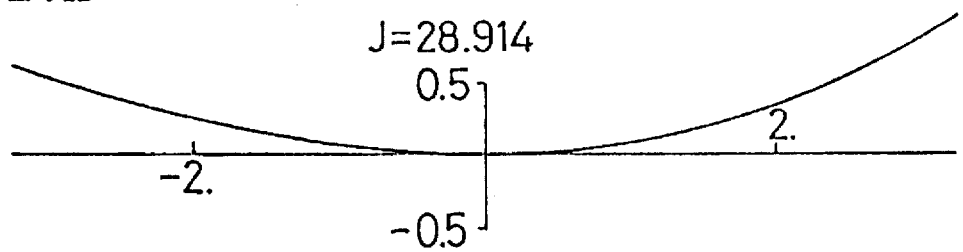
FIGS. 27A to 27E show lateral aberration curves of the seventh embodiment of the present invention.
Figure 27B:
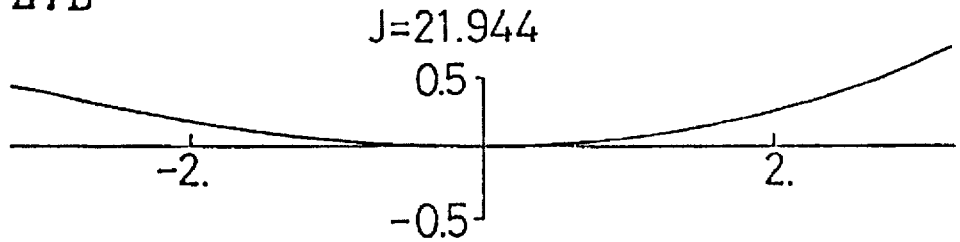
Figure 27C:
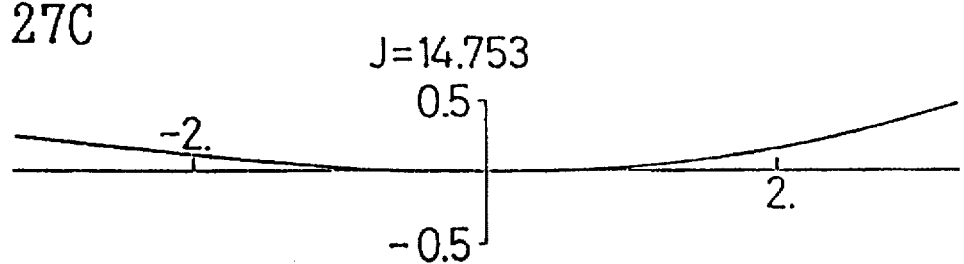
Figure 27D:
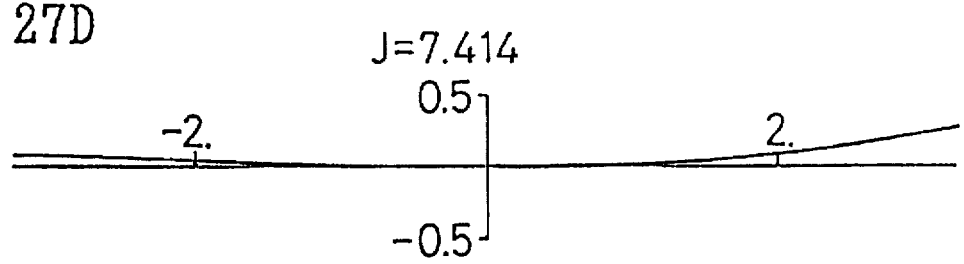
Figure 27E:
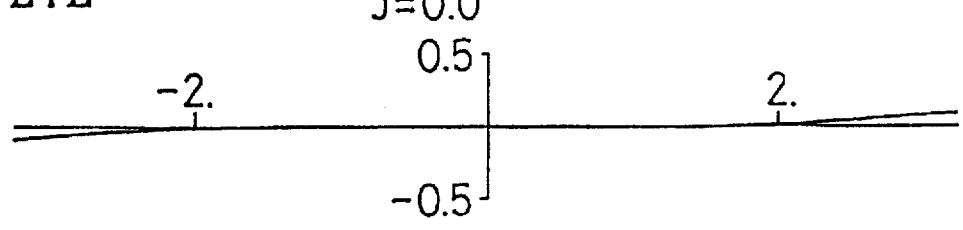
Figure 28A:
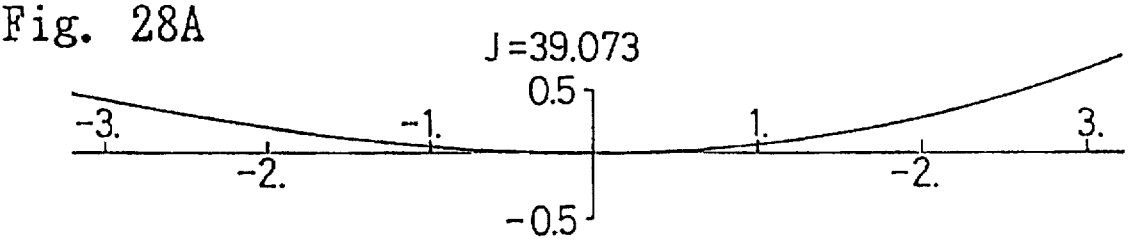
FIGS. 28A to 28E show lateral aberration curves of the eighth embodiment of the present invention.
Figure 28B:
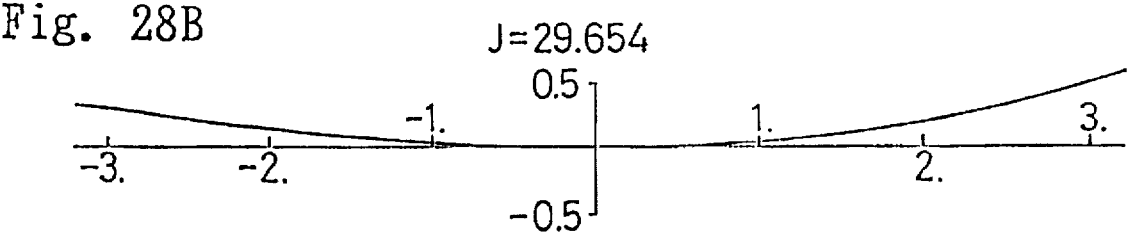
Figure 28C:
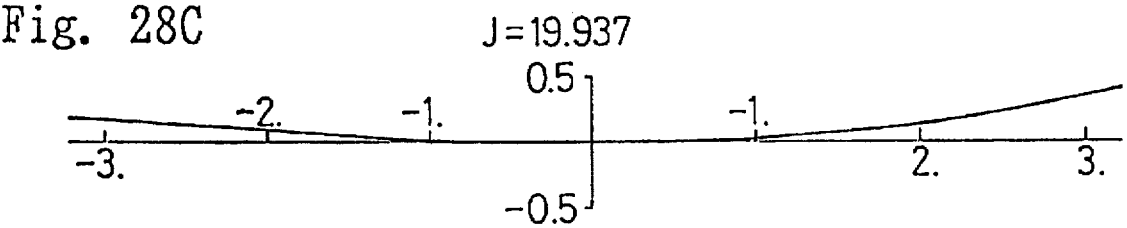
Figure 28D:
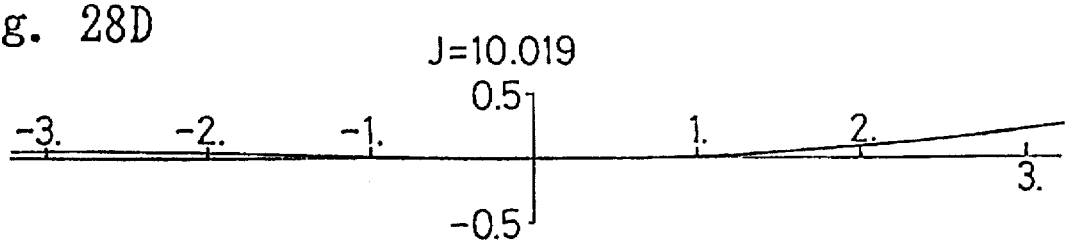
Figure 28E:
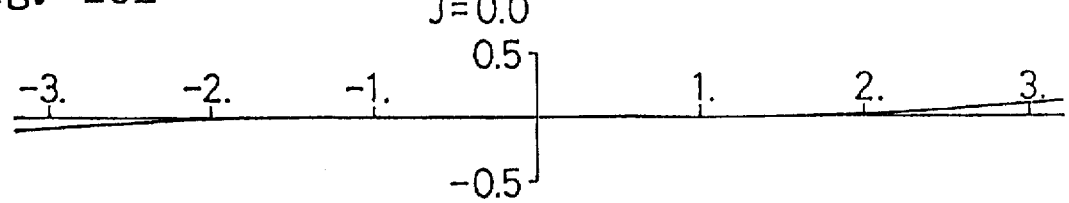
Figure 29A:
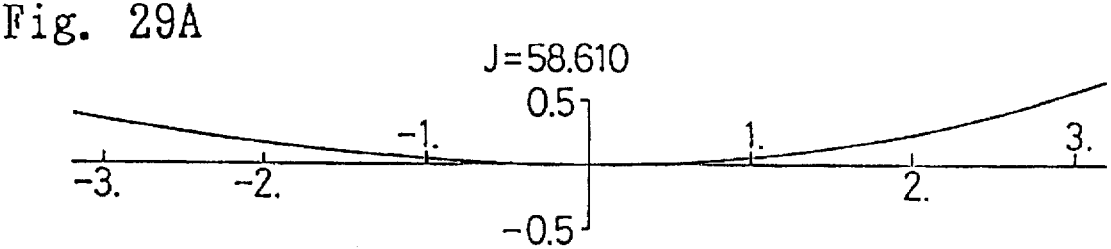
FIGS. 29A to 29E show lateral aberration curves of the ninth embodiment of the present invention.
Figure 29B:
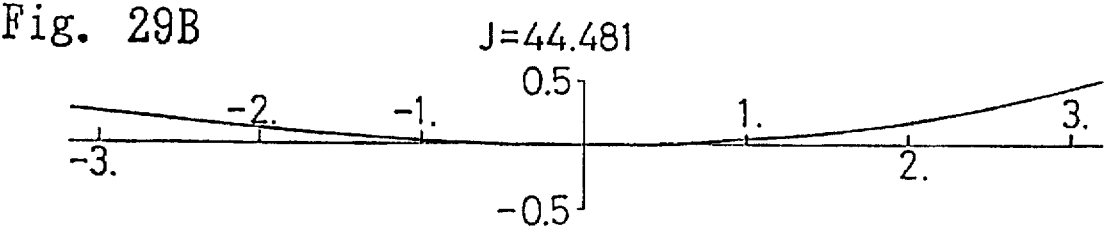
Figure 29C:
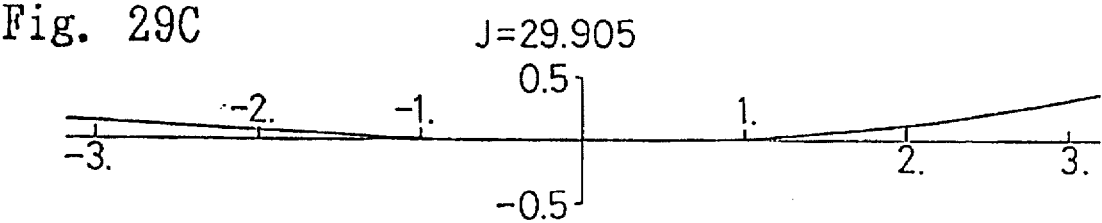
Figure 29D:
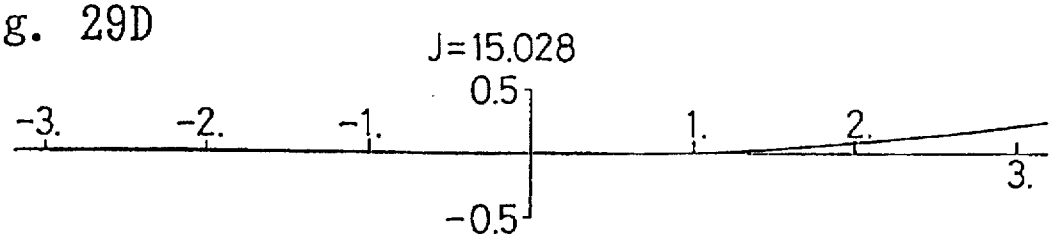
Figure 29E:
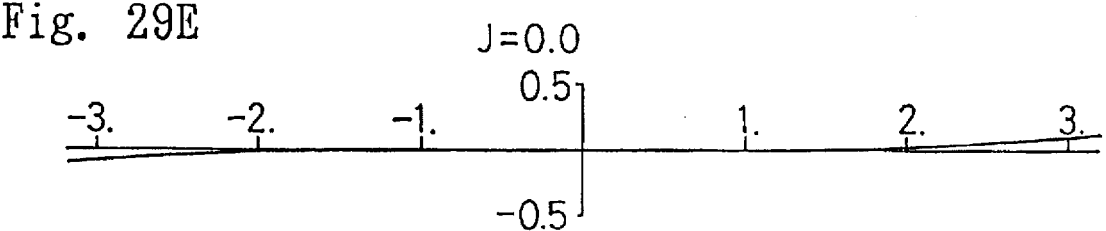

A scanning optical system of the present invention is provided with a deflector. A convergent beam deflected by the deflector at a uniform angular velocity is formed into an image on a scanned surface. The scanned surface is scanned substantially at a uniform velocity.

The scanning lens includes from the deflector side a negative lens element and at least one other lens element. The convergent beam is incident on a surface of the negative lens element which faces the deflector. Further, the following conditions (1) to (3) are fulfilled:

$$C < S1 \leq L \qquad (1)$$
$$Y = k\theta \qquad (2)$$
$$C = \frac{S1(L-k)}{S1-k} \qquad (3)$$

where S1 is a distance from a deflection surface of the deflector to an object surface (natural convergence point of the convergent beam), L is a distance from the deflection surface of the deflector to an image surface (i.e. total length), Y' is an image height on the scanned surface, θ is an angle (deflection angle) of the convergent beam deflected by the deflector to the optical axis of the scanning lens, and k is a proportional constant.

In the scanning lens including a negative lens adjacent to the deflector and at least one other lens element, distortion can excellently be corrected. The reason why the scanning lens of the present invention includes from the deflector side a negative lens element and at least one other lens element will be described in more detail. For example, if the deflector side lens element is a positive lens, the correction of distortion (i.e. correction of distortion for uniform velocity scanning) will be difficult. The correction of aberration (mainly, correction of distortion for uniform velocity scanning) will be difficult unless at least two lenses are provided. In addition, if the deflector side lens element is a positive lens, it will be necessary to arrange a negative lens on the image side of the positive lens to form a convergent beam fulfilling the condition (1) on the image surface, and the correction of distortion generated by this arrangement will be difficult.

The reason why the scanning lens is designed so that the convergent beam is incident on the surface of the negative lens element which faces the deflector will be described. When the beam is formed into an image in front of the surface, since a divergent beam is incident on the surface, the scanning lens needs to have a strong positive power, and if the scanning lens has a strong positive power, the aberration correction will be difficult and the reduction in total length will be difficult.

Further, according to the present invention, the scanning lens for converging the beam is provided with no positive power in order that the width of a beam incident on the scanning lens is transformed into a spot size in accordance with the image density on the scanned surface by making a strong convergent beam incident on the scanning lens. Specifically, the focal length of the scanning lens is negative (negative power) or infinite (null power). Consequently, unlike the scanning lens having a positive focal length, the correction of aberration is not difficult although the total length is reduced, and aberrations (e.g. distortion, field curvature, astigmatism, coma, etc.) can excellently be corrected. In addition, even if the maximum deflection angle $\theta_{max}$ is constant, the maximum image height $Y'_{max}$ can be set to a higher value by using a stronger convergent beam to shift the natural convergence point of the convergent beam toward the deflector side.

The condition (1) is effective in reducing the total length. When the upper limit of the condition (1) is exceeded, the focal length of the scanning lens is positive, so that the correction of aberrations of the beam in the vicinity of the maximum deflection angle is difficult even if the maximum deflection angle $\theta_{max}$ is increased and the focal length is decreased to reduce the total length. When the lower limit of the condition (1) is exceeded, when S1=C, the focal length of the scanning lens is 0, so that the beam cannot be formed into an image, and when S1<C, the beam having exited from the scanning lens is formed into an image on the image surface after crossing the optical axis, so that the beam is largely bent by the scanning lens having a positive and short focal length. As a result, the correction of aberrations is difficult.

The conditions (2) and (3) are conditions for scanning the scanned surface at a uniform velocity with a beam deflected on the scanned surface at a uniform angular velocity to form the beam into an image on the scanned surface. C, defined by the condition (3), is a distance from the deflection surface to a thin lens when the scanning lens is represented as one thin lens. Therefore, C can be defined by the condition (3) with respect to any of the beam scanning systems using a convergent, a divergent and a parallel beams, respectively.

The reason why the total length of the scanning lens fulfilling the conditions (1), (2) and (3) can be reduced will be described in detail. As mentioned above, when a parallel beam is incident on the scanning lens, the scanning lens requires the fθ characteristic and fulfills the following condition (4):

$$Y'=f\theta \quad (4)$$

The scanning lens having the fθ characteristic fulfills the following condition (5):

$$f=k=L-C' \quad (5)$$

where C' is a distance from the deflection surface to the rear principal point of the scanning lens (in the scanning system using a parallel beam), and L is the total length.

As mentioned above, to reduce the total length L, C' is reduced and the maximum deflection angle $\theta_{max}$ is increased. However, the correction of aberration is difficult as indicated above. However, what is required for a scanning lens is a working to scan the scanned surface at a uniform velocity with a beam deflected at a uniform angular velocity and to form the beam into an image on the scanned surface. Therefore, it is only necessary that the image height Y' is proportional to the deflection angle θ and to fulfill the above-mentioned condition (2) and the following condition (6). It is unnecessary to fulfill the conditions (4) and (5).

$$Y'_{max}=k\theta_{max} \quad (6)$$

To fulfill the conditions (2) and (6) required for the scanning lens and to reduce the total length (i.e. to reduce the distance between the image surface and the scanning lens), it is considered to increase the proportional constant k as well as to increase the maximum deflection angle $\theta_{max}$. A scanning optical system will be examined which does not fulfill the conditions (4) and (5) and where the beam incident thereon is not parallel (i.e. the beam is convergent or divergent).

When the beam incident on the scanning lens is convergent or divergent, the conditions (2) and (3) and the following conditions (7) and (8) are fulfilled. Now, let us see variation in proportional constant k and focal length f by varying the value of S1 in the conditions (3) and (8). FIGS. 33A to 33I show variation in beam condition (parallel, divergent, convergent) caused by varying the distance from a light emission point (e.g. laser diode) and the collimator lens when the total length L is fixed. FIG. 33A shows the beam condition when S1=−∞. FIG. 33I shows the beam condition when S1=∞. Both are cases where a parallel beam is incident on the scanning lens. In the figures, DS is the deflection surface, SL is the scanning lens, OS is the object surface, and IS is the image surface.

$$f=L-C+\frac{(L-C)^2}{S1-L} \quad (7)$$

$$k=L-C+\frac{C(L-C)}{S1-C} \quad (8)$$

Case (1) −∞<S1<0 (FIG. 33B)

When the object point (object surface) OS is located on the object side of the deflector (i.e. when the object distance is negative), a divergent beam is incident on the scanning lens SL. In this case, since the value of k is small compared to the case where a parallel beam is incident (FIG. 33A), the total length L increases. Although not contributing to the reduction in total length L, by letting the absolute value of S1 be comparatively low for the value of C, the main scanning direction width of the reflection area per one deflection surface of the deflector on the surface of deflection can be reduced, and since the size of the polygonal mirror is decreased by increasing the number of surfaces of the polygonal mirror, the scanning speed can be increased.

Case (2) S1=0 (FIG. 33C)

Since k=0, no scanning is performed.

Case (3) 0<S1<C (FIG. 33D)

The focal length f of the scanning lens SL is shorter than the total length L and f>0. Therefore, after converged and formed into an image, the beam is diverged and incident on the scanning lens SL, so that a thick beam is incident on a lens surface having a high curvature. Further, the beam having exited from the scanning lens SL is formed into an image on the scanned surface (k<0) after crossing the optical axis, the beam is largely bent at the last surface of the lens. As a result, the correction of aberrations is difficult.

Case (4) S1=C (FIG. 33E)

Since f=0, the beam cannot be formed into an image. In addition, since k=±∞, the image height diverges by a slight variation in deflection angle. As a result, it is impossible to arrange the lens system in this case.

Case (5) L<S1<∞ (FIG. 33H) Since f>0 and k>0, the focal length f is long compared to the case where a parallel beam is incident and the proportional constant k can be increased, so that the total length L can be decreased to be smaller than that of a scanning lens SL having the fθ characteristic. However, if the maximum deflection angle $\theta_{max}$ is increased by decreasing the total length L, the scanning lens SL is provided with a positive power for converging the beam, so that it is difficult to correct aberrations in the vicinity of the maximum deflection angle.

Case (6) C<S1<L (FIG. 33F)

By locating the natural convergence point OS of the convergent beam on the image side of the first surface of the scanning lens SL when C<0 and by letting C be C<S1 when C>0, the focal length f is f<0 and the value of k is higher than when $L<S1<\infty$, so that the total length L can further be reduced. Even if the maximum deflection angle $\theta_{max}$ is fixed, the total length L can be reduced by letting S1 approach C. Since the scanning lens SL has a negative power at the optical axis and the absolute value of the negative power decreases from the optical axis to the edge along the height, it is necessary to increase the number of lens elements of the scanning lens SL or to use an aspherical surface.

Case (7) S1=L (FIG. 33G)

The axial power of the lens is null. k=L, and the scanning lens SL is of a configuration where a negative power increases from the center to the edge along the height. The value of k is higher than when $L<S1<\infty$ (FIG. 33H), so that the total length L can further be reduced. Further, the null power is advantageous since the shift of the image surface IS caused by variation in surface configuration and refractive index when the temperature of the scanning lens SL increases is small.

In the above-described case (6) where $C<S1<L$ (FIG. 33F), it is understand from the total length L of subsequently-described seventh to ninth embodiments that the total length L decreases as the distance S1 approaches C. Specifically, the seventh, eighth and ninth embodiments are each a scanning optical system with a maximum image height Y' of approximately 150 and a maximum deflection angle $\theta_{max}$ of 23 degrees, and have different distances S1. By comparing these, it is understood that the total length L is reduced as S1 approaches C even if the value of k is fixed.

As described above, by setting the distance from the deflection surface DS of the deflector to the natural convergence point OS so that the condition (1): $C<S1<L$ is fulfilled, the proportional constant k can be set to a high value, so that the total length L can be reduced to the utmost without any problem in aberration correction.

Further, in the scanning optical system of the present invention, a convergent beam having been incident on the scanning lens is preferably bent so that the angle of view is larger than the deflection angle $\theta$ by deflecting the convergent beam at a predetermined deflection angle $\theta$ by the deflector and by making the convergent beam incident on the scanning lens SL.

With this arrangement, it is possible that the convergent beam is bent outwardly and then inwardly in the scanning lens SL before it exits from the scanning lens SL. By bending the convergent beam in this manner, the maximum deflection angle $\theta_{max}$ can be reduced. Specifically, even if the maximum deflection angle $\theta_{max}$ is reduced, a predetermined maximum image height $Y'_{max}$ can be obtained at a predetermined total length L. Since the main scanning direction width of the reflection surface per deflection surface of the deflector can be reduced by reducing the maximum deflection angle $\theta_{max}$, it is unnecessary to increase the size of the deflector, and the speed of the motor for rotating the deflector can be reduced.

Numerical data of first to tenth embodiments of the scanning optical system of the present invention are shown in Tables 1 to 10. ri (i=1, 2, 3, . . . ) is a radius of curvature (in the main.scanning direction) of an ith lens surface counted from the deflector side. di (i=1, 2, 3, . . . ) is an axial distance between an ith lens surface and an i+1 th lens surface counted from the deflector side. r0 (i=0) is a radius of curvature (=∞) of the deflection surface of the deflector. d0 (i=0) is an axial distance from the deflection point of the deflector on the deflection surface to an ith lens surface. Ni (i=1, 2, 3, . . . ) is a refractive index of an ith lens counted from the deflector surface for light having a wavelength of 780 nm. The refractive index between lenses (air distance) is 1.00.

Figure 32:
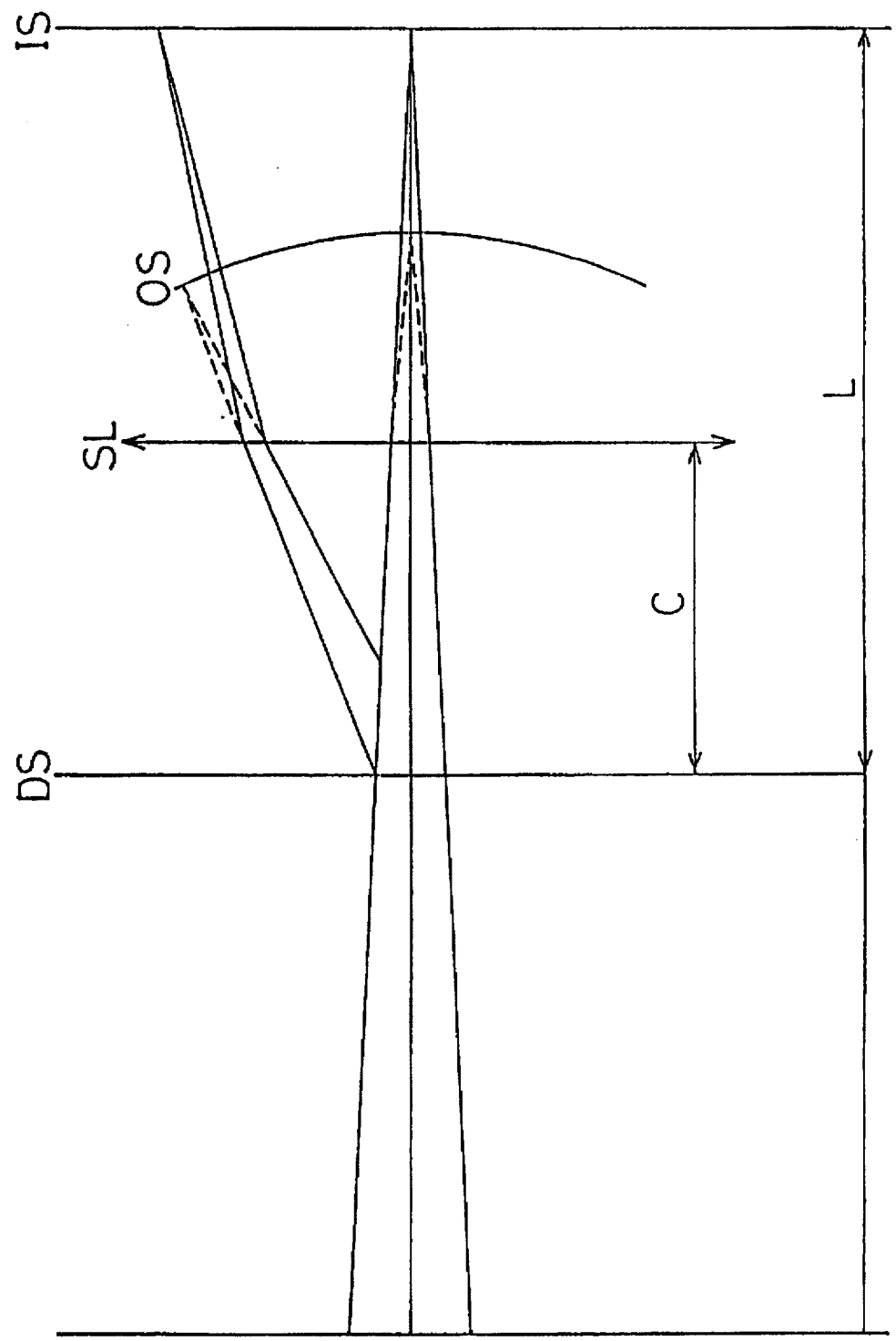
FIG. 32 is a view of assistance in explaining the reference designations used in the description of the present invention.

The reference designations are the same as those described above: f is a focal length of the scanning lens SL; $\theta$ is an angle of view (defined as deflection angle) of the deflected beam to the optical axis of the scanning lens; $\theta_{max}$ is an angle of view when the deflection angle $\theta$ is maximum (defined as maximum deflection angle); Y' is an image height on the scanned surface; $Y'_{max}$ is an image height which is maximum on the scanned surface; S1 is a distance from the deflection surface DS to the natural convergence point OS of the convergent beams (convergence point of the convergent beam when no scanning lens is provided, i.e. object point); L is a distance from the deflection surface DS of the deflector to the scanned surface (image surface IS); LB is a lens back (i.e. axial distance from the image side surface of the most image side lens to the scanned surface (image surface IS)); and k is a proportional constant so that $Y'=k\theta$. The relationship among the deflection surface DS, the scanning lens SL, the natural convergence point OS of the beam, the image surface IS, C defined by the condition (3) and the total length L are shown in FIG. 32.

C corresponds to a distance from the deflection surface of the deflector to a thin lens when the scanning lens is represented as one thin lens. C is defined by the above-mentioned condition (3) or the following condition (3A). Since the condition (3A) is a condition obtained in view of only axial portion of the lens and the off-axial portion is not considered, in the present invention, C is defined by the condition (3).

$$C = \frac{L + S1 - \{(L-S1)(L-S1-4f)\}^{\frac{1}{2}}}{2} \quad (3A)$$

In the tables, the surfaces marked with asterisks (*) are aspherical. The aspherical surfaces are defined by the following equation:

$$x = \frac{C_0 \cdot \Phi^2}{1 + (1 - \epsilon \cdot C_0^2 \cdot \Phi^2)^{\frac{1}{2}}} + \sum_i Ai\Phi_i$$

where x is a coordinate from the vertex of the lens along the optical axis, $\Phi$ is a height from the optical axis, $C_0$ is a paraxial radius of curvature of an aspherical lens surface, $\epsilon$ is a conic constant, and Ai is a higher-order parameter (i=2 to 10).

Figure 31:
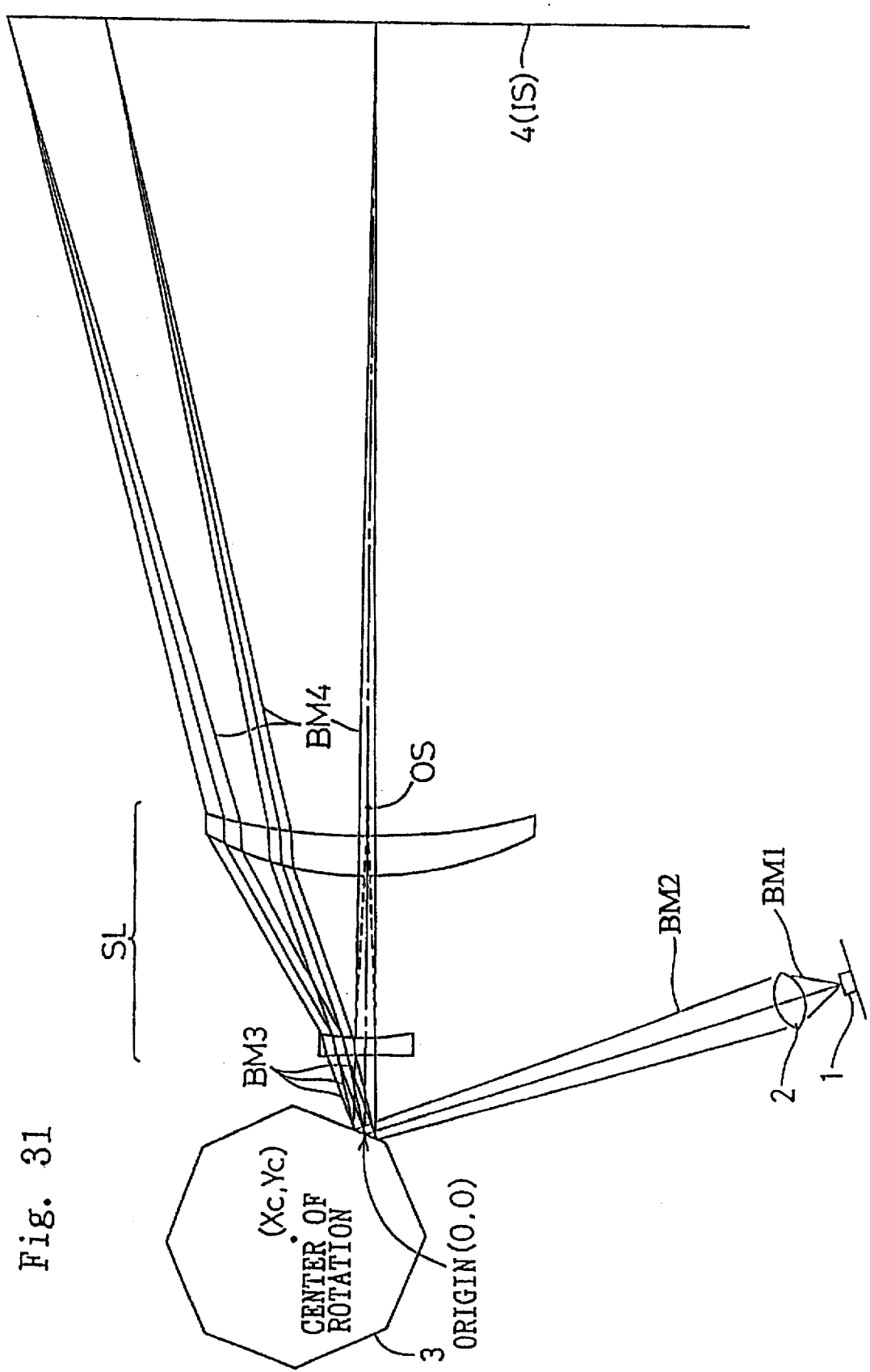
FIG. 31 shows the schematic arrangement and optical paths of the entire scanning optical system embodying the present invention.

FIG. 31 shows the entire arrangement of a scanning optical system embodying the present invention. In this scanning optical system, a divergent beam BM1 emitted from a light source (comprising a light emitting device such as a laser diode) is converged into a convergent beam (incident light) BM2 by a converging lens 2 and then incident on a deflector (polygonal mirror) 3. A convergent beam BM3 (the origin is (0,0)) deflected at a uniform angular velocity by a deflector 3 rotating with ($X_c$, $Y_c$) as the center of rotation is incident on the scanning lens SL. The natural convergence point OS of the convergent beam BM3 is located on the image side of the deflector side surface of the most deflector side lens of the scanning lens SL. A beam BM4 is formed into an image on a scanned surface 4 by the scanning lens SL to scan the scanned surface 4 substantially at a uniform velocity.

The scanning optical systems of the first to tenth embodiments are provided with the deflector 3 and the scanning lens SL which forms the convergent beam BM3 deflected by the deflector 3 at a uniform angular velocity into an image on the scanned surface 4 to scan the scanned surface 4 substantially at a uniform velocity. The scanning lens SL includes from the deflector side a negative lens element and at least one other lens element. On the surface of the negative lens element which faces the deflector 3, the convergent beam is incident. Further, the scanning optical systems of the first to tenth embodiments fulfill the conditions (1) to (3).

FIGS. 1 to 10 are cross-sectional views showing the main scanning direction arrangements and optical paths of the scanning lenses SL corresponding to the first to tenth embodiments. The reference designation J in these figures shows a deflection condition of a beam having an angle of view (deflection angle θ) defined by the following equation (9). For example, FIG. 1 showing the optical paths of the first embodiment show the deflection of beams having angles of view of J=0.0, 55.5 and 78.1, respectively.

$$S1 \times \sin \theta = J \qquad (9)$$

The specific arrangements of the scanning lens SL of each embodiment will be described. The scanning lens SL of the first embodiment includes from the deflector side a negative biconcave lens element and a positive meniscus lens element (whose image side surface is aspherical) convex to the deflector side. The scanning lens SL of the second embodiment includes from the deflector side a negative meniscus lens element (whose deflector side surface is aspherical) concave to the deflector side, a negative meniscus lens element concave to the image side and a positive meniscus lens element (whose image side surface is aspherical) convex to the deflector side. The scanning lens SL of the third embodiment includes from the deflector side a negative bi-concave lens element and a positive meniscus lens element (whose both side surfaces are aspherical) convex to the deflector side. The scanning lens SL of the fourth embodiment includes from the deflector side a negative meniscus lens (whose deflector side surface is aspherical) concave to the deflector side, a negative bi-concave lens element and a positive bi-convex lens element (whose image side surface is aspherical). The scanning lens SL of the fifth embodiment includes from the deflector side a negative bi-concave lens element (whose deflector side surface is aspherical), a negative meniscus lens element convex to the image side and a positive meniscus lens element (whose image side surface is aspherical) convex to the deflector side. The scanning lens SL of the sixth embodiment includes from the deflector side a negative meniscus lens element concave to the deflector side and a negative meniscus lens element (whose both side surfaces are aspherical) concave to the image side. The scanning lenses SL of the seventh, eighth and ninth embodiments include from the deflector side a negative meniscus lens element concave to the deflector side and a positive meniscus lens element (whose image side surface is aspherical) convex to the image side. The scanning lens SL of the tenth embodiment includes from the deflector side a negative meniscus lens element concave to the image side, a positive meniscus lens element (whose image side surface is aspherical) convex to the deflector side and a cylindrical lens element.

FIGS. 11A to 11C through 20A to 20C and FIGS. 21A to 21E through FIGS. 30A to 30E show aberrations of the first to tenth embodiments. FIGS. 11A to 11C through 20A to 20C show aberrations (with a wavelength of 780 nm) corresponding to the first to tenth embodiments, respectively. In these figures, the solid lines represent spherical aberration, the broken lines SC represent sine condition, and the broken lines DT represent astigmatism on the tangential surface. FIGS. 21A to 21E through FIGS. 30A to 30E show lateral aberration curves on the Gaussian surface corresponding to the first to tenth embodiments, respectively. The reference designation J in these figures shows the amount of aberration on the image surface of a beam having an angle of view defined by the equation (9). For example, FIGS. 21A to 21E show the generation of lateral aberration on the image surfaces of beams having angles of view of J=0.0, 39.874, 55.463, 66.926 and 78.146.

In these embodiments, to fulfill the conditions (1) to (3), a strong convergent beam is incident on the scanning lens SL. Thereby, the focal length f of the scanning lens SL is negative (negative power) or infinite (null power) in order that the width of the beam incident on the scanning lens SL is transformed into a spot size on the scanned surface in accordance with the image density. Specifically, in the embodiments, since the distance S1 from the deflection surface DS to the natural convergence point OS fulfill the condition (1): C<S1≦L, the proportional constant k can be set to a high value, so that the total length is reduced to the utmost without any problem in aberration correction. Further, unlike the scanning lens SL having a positive focal length, the correction of aberration is not difficult although the total length is reduced. As a result, in the embodiments, aberrations such as distortion, coma, field curvature, astigmatism, etc. are excellently corrected.

As mentioned above, the seventh to ninth embodiments are each a scanning optical system with a maximum image height Y' of approximately 150 and a maximum deflection angle θ$_{max}$ of 23 degrees, and have different distances S1. However, it is understood that in the seventh to ninth embodiments, the total length L is decreased (the total length L of the seventh embodiment is the longest) as S1 approaches C even if the value of k is almost fixed.

The scanning optical systems of the first, third, sixth, seventh, eighth and ninth embodiments are characterized in that a convergent beam deflected at a predetermined deflection angle and incident-on the scanning lens SL is bent at an angle of view greater than the deflection angle after incident on the scanning lens SL. With this arrangement, the convergent beam is bent outwardly and then inwardly in the scanning lens SL before it exits from the scanning lens SL. For example in the third embodiment having a scanning lens SL including two lens elements, the convergent beam is bent outwardly by the negative biconcave lens element and then bent inwardly by the positive meniscus lens element convex to the deflector side.

As mentioned above, the maximum deflection angle θ$_{max}$ can be reduced by bending the convergent beam in this manner. Specifically, even if the maximum deflection angle θ$_{max}$ is reduced, a predetermined maximum image height Y'$_{max}$ can be obtained at a predetermined total length L. Since the main scanning direction width of the reflection surface per deflection surface of the deflector can be reduced by reducing the maximum deflection angle θ$_{max}$, it is unnecessary to increase the size of the deflector, and the speed of the motor (not shown) for rotating the deflector can be reduced.

As described above, according to the present invention, the scanning lens includes from the deflector side a negative lens element and at least one other lens element, so that distortion is excellently corrected. Moreover, the convergent beam is incident on a surface of the negative lens element which faces the deflector, so that aberration correction is easy and the total length is reduced. Further, since the conditions (1) to (3) are fulfilled, the aberration correction is not difficult even if the total length is reduced, and aberrations (e.g. distortion, field curvature, astigmatism, coma, etc.) are excellently corrected. Even if the maximum deflection angle is fixed, the maximum image height can be set to a higher value by shifting the natural convergence point of the convergent beam toward the deflector side, so that the total length is further reduced.

Thus, aberrations are excellently corrected irrespective of the maximum deflection angle, and a scanning optical system having a reduced total length is realized. That is, the total length is reduced not by only increasing the maximum deflection angle but by making a strong convergent beam incident on the scanning lens. Further, the total length is reduced by making a strong convergent beam incident on the scanning lens without increasing the maximum deflection angle to reduce the total length.

Further, if the convergent beam having been incident on the scanning lens is bent at an angle of view greater than the deflection angle by deflecting the convergent beam at a predetermined deflection angle by the deflector and by making the convergent beam incident on the scanning lens SL, the maximum deflection angle can be decreased to decrease the main scanning direction width per deflection surface of the deflector, so that it is unnecessary to increase the size of the deflector and the speed of the motor for rotating the deflector is reduced.

Subsequently, another implementation of the present invention will be described. This implementation is a scanning optical system where the performance variation due to a temperature variation is small even if a resin-made scanning lens is used. This scanning optical system is provided with a deflector and a scanning lens which forms a convergent beam deflected by the deflector at a uniform angular velocity into an image on a scanned surface to scan the scanned surface substantially at a uniform velocity. The scanning lens includes from the deflector side a negative first lens element and a positive second lens element. At least one surface of the second lens element is a toric surface where the refractive power is different between the main and sub scanning directions. The toric surface fulfills the following condition (11):

$$|1-\beta| < 0.25 \tag{11}$$

where $\beta$ is a magnification of the scanning lens in the main scanning direction.

The condition (11) is a condition for decreasing the image surface shift amount $\Delta BF$ defined by the above-mentioned condition (a). When the limit of the condition (11) is exceeded, the image surface shift amount $\Delta BF$ due to a temperature variation increases, so that the performance extremely deteriorates due to the temperature variation even if the aberration performance of the scanning lens is improved.

The scanning lens preferably fulfills the following condition (12):

$$-0.5 > \frac{f_{1M}}{f_{2M}} > -33 \tag{12}$$

where $f_{1M}$ is a focal length of the first lens element in the main scanning direction and $f_{2M}$ is a focal length of the second lens element in the main scanning direction.

The condition (12) is a condition for correcting field curvature in the main scanning direction within the limit of the condition (11). Since the first lens element has a negative refractive power, its focal length $f_{1M}$ is negative. When the focal length $f_{1M}$ is positive, to fulfill the condition (11), the focal length $f_{2M}$ of the second lens element in the main scanning direction must take a high positive value or a low negative value. Then, however, it is difficult to correct field curvature in the main scanning direction. Even if the focal length $f_{1M}$ is negative, when the limits of the condition (12) are exceeded, the focal length $f_{2M}$ takes a high positive value, so that it is difficult to correct field curvature in the main scanning direction like the above case.

The scanning lens preferably fulfills the following condition (13):

$$f_{1M} = f_{1S} \tag{13}$$

where $f_{1S}$ is a focal length of the first lens element in the sub scanning direction.

The condition (13) represents that the first lens element includes rotationally symmetric surfaces. This is because rotationally symmetric surfaces which are easy to process and measure are preferable in metal mold processing of injection-molded lenses.

The scanning lens preferably fulfills the following condition (14):

$$-4 > \frac{f_{1S}}{f_{2S}} > -350 \tag{14}$$

where $f_{2S}$ is a focal length of the second lens element in the sub scanning direction.

The condition (14) defines the ratio between the sub scanning direction focal length of the first lens element including the rotationally symmetric surfaces and the sub scanning direction focal length $f_{2S}$ of the second lens element, and is a condition for maintaining the sub scanning direction field curvature in an excellent condition. When the limits of the condition (14) are exceeded, it is difficult to correct astigmatism on the main scanning image surface and on the sub scanning image surface.

The scanning lens preferably fulfills the following condition (15):

$$5 < \frac{f_{2M}}{f_{2S}} < 15 \tag{15}$$

The condition (15) is a condition for making gentle the change of the thickness of the lens and for making excellent the image surfaces in the main and sub scanning directions. When the limits of the condition (15) are exceeded, it is difficult to process the metal mold.

Figure 56:
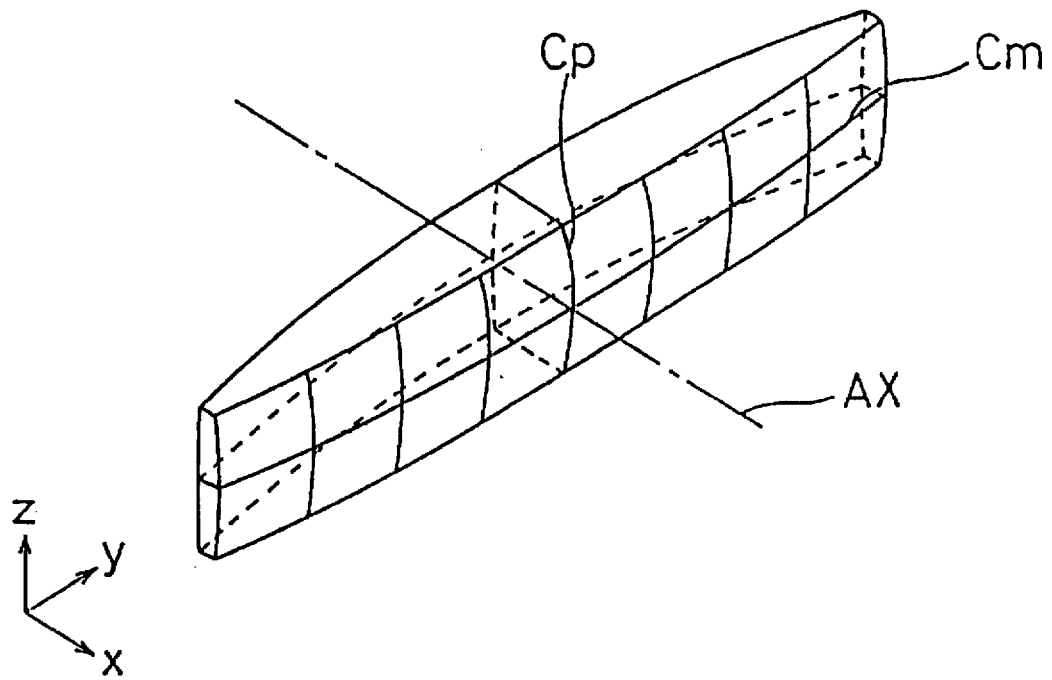
FIG. 56 is a view of assistance in explaining a deformed toric surface of the scanning lens incorporated in the present invention.

As mentioned above, at least one surface of the second lens element is a toric surface where the refractive power is different between in the main and sub scanning directions. Here, the toric surface of the second lens element will be described with an extended y toric surface as a example. As shown in FIG. 56, the main scanning cross section of the extended y toric surface is aspherical, and the curvature in the sub scanning direction continuously changes along the main scanning cross section. This toric surface is defined as a function of y and z by the following expression (A):

$$x = \frac{\kappa \cdot z^2}{1+(1-\mu \cdot \kappa^2 \cdot z^2)^{\frac{1}{2}}} + \rho + A \tag{A}$$

where $$\kappa = \frac{K}{1-K \cdot \rho} \tag{B}$$

(B)

$$\rho = \frac{c \cdot \xi^2}{1+(1-\epsilon \cdot c^2 \cdot \xi^2)^{\frac{1}{2}}} \tag{C}$$

$$\xi = y - S \tag{D}$$

That is, the extended y toric surface is obtained as a standard y toric surface to which a two-dimensional additional term A(y, z) is added. When a curve on the main scanning cross section is a main curve $C_m$ and a curve on the sub scanning cross section is a profile curve $C_p$ (i.e. x: along the optical axis, y: the main scanning direction, and z: the sub scanning direction), K and c respectively represent curvatures in the main curve direction and in the profile curve direction at the vertex (exactly, $K+2a_{0,2}$ and $c+2a_{2,0}$, respectively). $1/K$ is a radius of curvature of the main curve $C_m$ at the vertex, and $1/c$ is a radius of curvature of the profile curve $C_p$ (radius of curvature of the main curve $C_m$ in the sub scanning direction at the vertex), and $\mu$ and $\epsilon$ respectively represent conic constants in the main curve direction and in the profile curve direction (hyperbola when negative, parabola when zero, ellipse when positive, circle when one).

For example, when $\mu=1$, $S=$) and $A=0$, the expression (A) represents a conventional toric surface (a surface made by rotating a secondary profile curve $\rho$ about an axis parallel to the y-axis with a radius of $1/K$). S and A of the expression (A) are defined by the following expressions:

$$S = \frac{cs \cdot z^2}{1+(1-\mu \cdot cs^2 \cdot z^2)^{\frac{1}{2}}} + \sum_{j=2}^{8} S_j \cdot |y|^j$$

$$A = \sum_{i=0}^{16} \left[ \sum_{j=0}^{\beta} a_{i,j} \cdot |z|^j \right] \cdot |\xi|^i$$

where $a_{0,0} \equiv 0$, $a_{i,1} \equiv 0$, and $a_{i,j} \equiv 0$.

With such features, even if a resin material having the value of $$-\frac{1}{n-1} \cdot \frac{\delta n}{\delta t} + \alpha$$

of the condition (a) which is much higher than that of a glass material is used for a scanning lens, $(1-\beta)^2$ decreases since the scanning lens fulfills the condition (11), so that the image surface shift is small.

Numerical data of eleventh to fifteenth embodiments of the present invention are shown in Tables 11 to 15. In each table, $r_o$ is a radius of curvature of the deflection surface of the deflector ($=\infty$), $r_{iM}$ (i=1, 2, 3, 4) is a radius of curvature in the main scanning direction of an ith surface counted from the deflector side, $r_{iS}$ (i=1, 2, 3, 4) is a radius of curvature in the sub scanning direction of an ith surface counted from the deflector side, $d_o$ is an axial distance from the deflection point on the surface of the deflector to an ith lens surface, di (i=1, 2, 3) is an axial distance from an ith surface to an i+1 surface counted from the deflector side, LB is a lens back (i.e. axial distance from the image side surface of the most image side lens to the scanned surface (image surface)), and Ni (i=1, 2) is a refractive index of an ith lens counted from the deflector side to light having a wavelength of 780 nm.

Data corresponding to the conditions (12), (14) and (15) are also shown in the tables. $\theta_{max}$ is an angle of view when an angle of view (deflection angle) of the deflected beam to the optical axis of the scanning lens is maximum (i.e. maximum deflection angle). S1 is a distance from the deflection surface to the natural convergence point of the convergent beam (convergence point of the convergent beam when no scanning lens is provided, i.e. object point). $Y_{max}$ is an image height which is maximum on the scanned surface.

In eleventh to fifteenth embodiments, the fourth surface ($r_{4M}$, $r_{4S}$) is the extended toric surface. The surfaces marked with asterisks (*) are aspherical. The aspherical surfaces are defined by the following expression:

$$X = \frac{C \cdot Y^2}{1+(1-\epsilon \cdot Y^2 \cdot C^2)^{\frac{1}{2}}} + \sum_i A i Y^i$$

where X is a displacement amount from a reference surface along the optical axis, Y is a height in a direction vertical to the optical axis, C is a paraxial curvature, $\epsilon$ is a conic constant, and Ai is an ith-order aspherical coefficient (i=4, 6, 8, 12).

Figure 34:
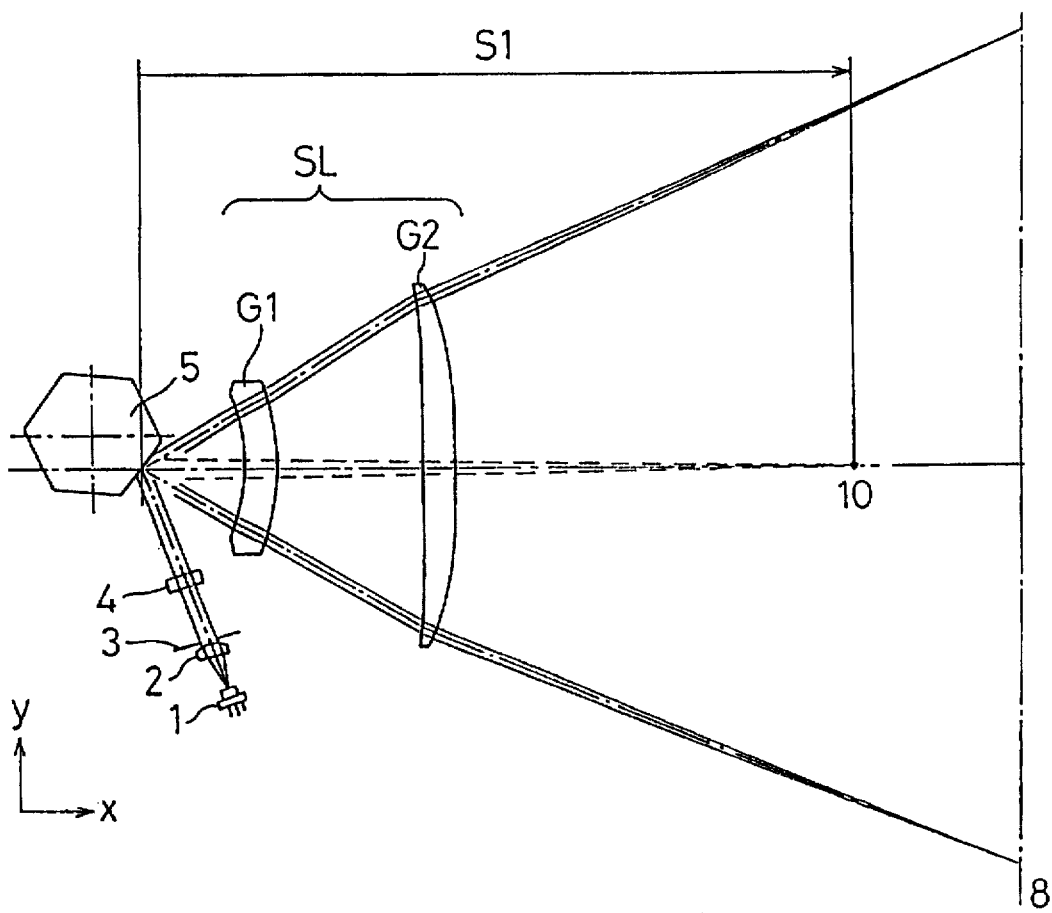
FIG. 34 shows the cross-section in the main scanning direction of a scanning optical system according to the present invention.
Figure 35:
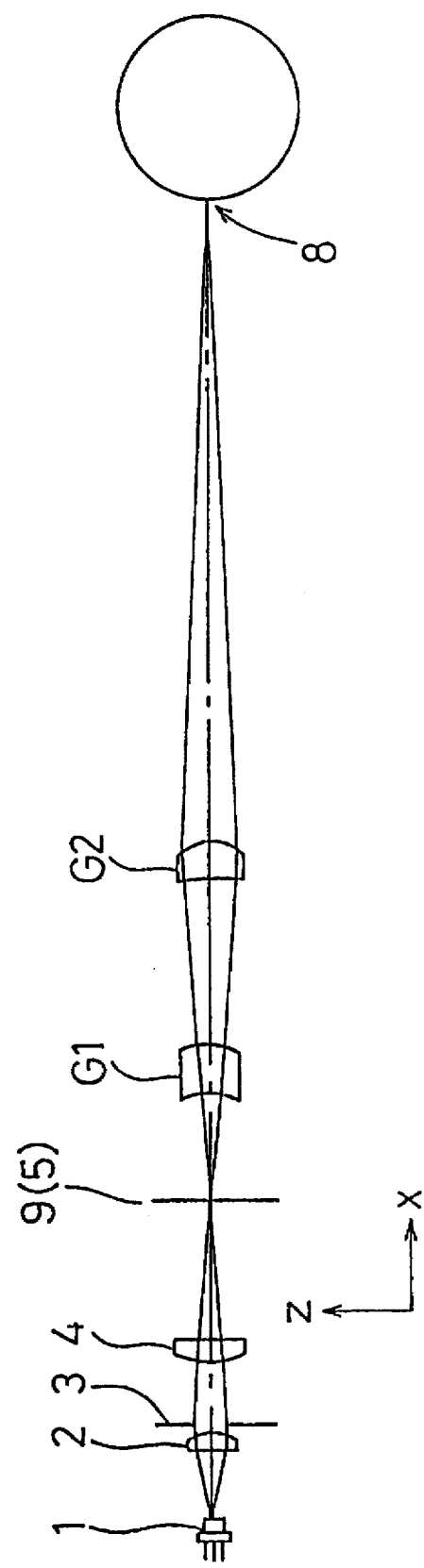
FIG. 35 shows the cross-section in the sub scanning direction of the scanning optical system according to the present invention.
Figure 36:
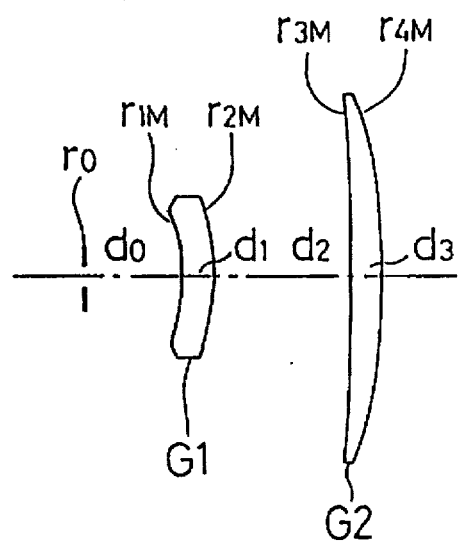
FIG. 36 is a cross-sectional view showing the main scanning direction lens arrangement of a first embodiment of the present invention.
Figure 37:
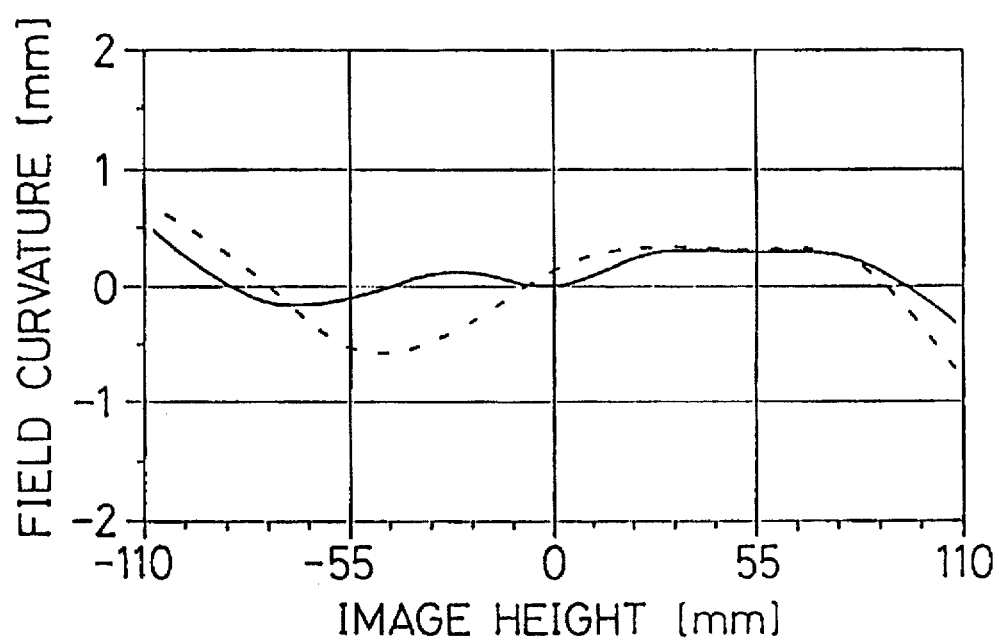
FIG. 37 shows field curvature of the first embodiment of the present invention.
Figure 38:
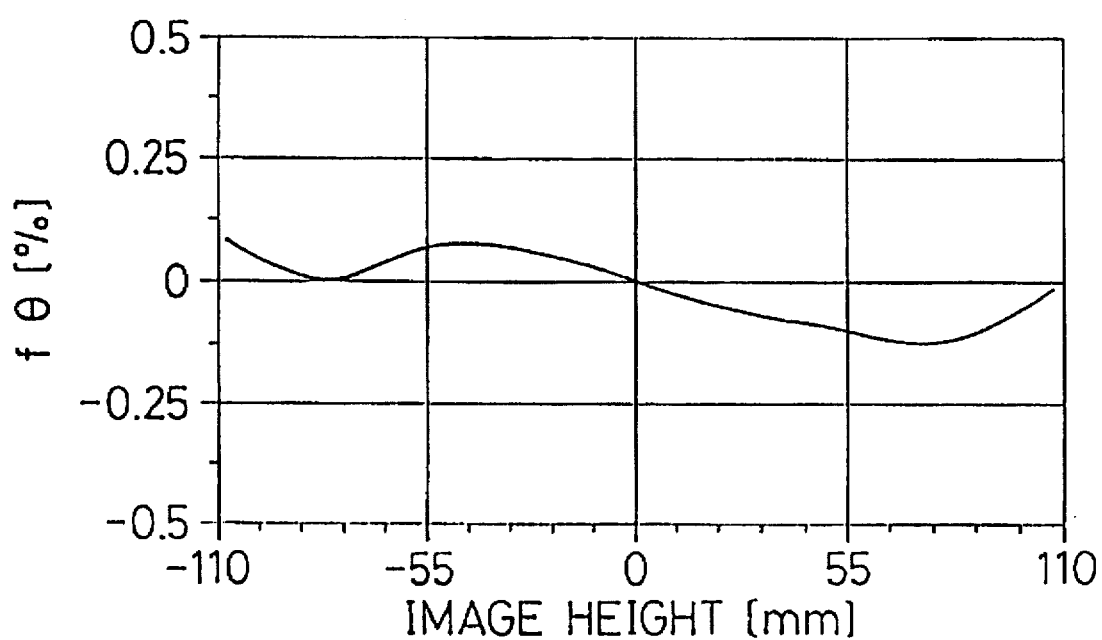
FIG. 38 shows the fθ characteristic of the first embodiment of the present invention.
Figure 39A:
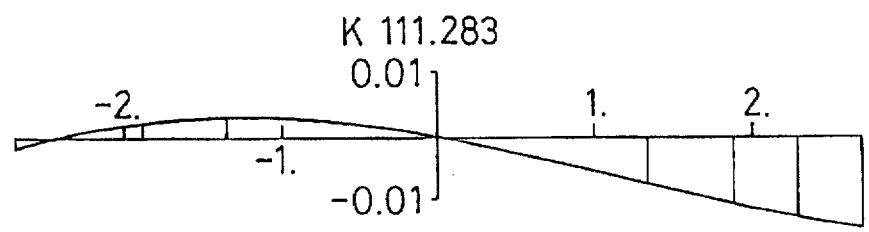
FIGS. 39A to 39E show lateral aberration curves of the first embodiment of the present invention.
Figure 39B:
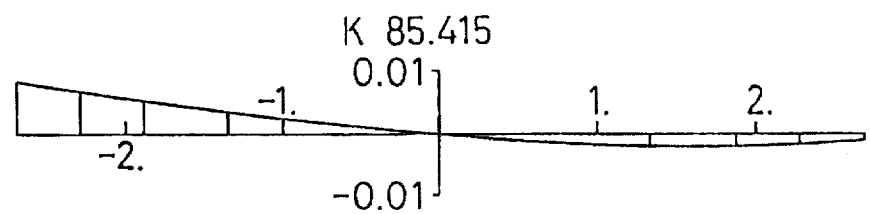
Figure 39C:
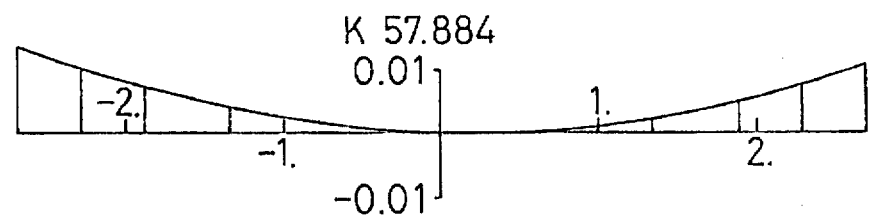
Figure 39D:
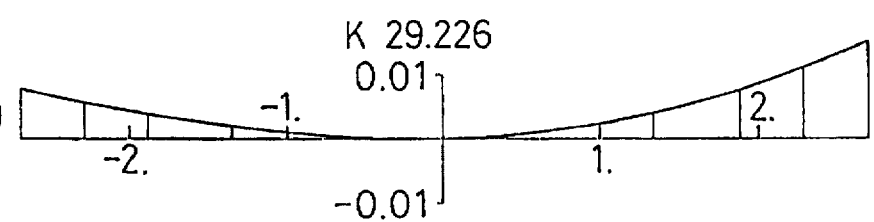
Figure 39E:
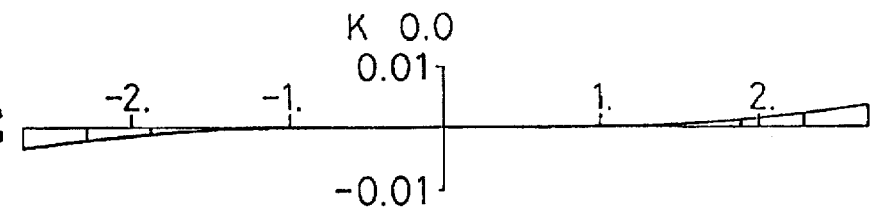
Figure 40:
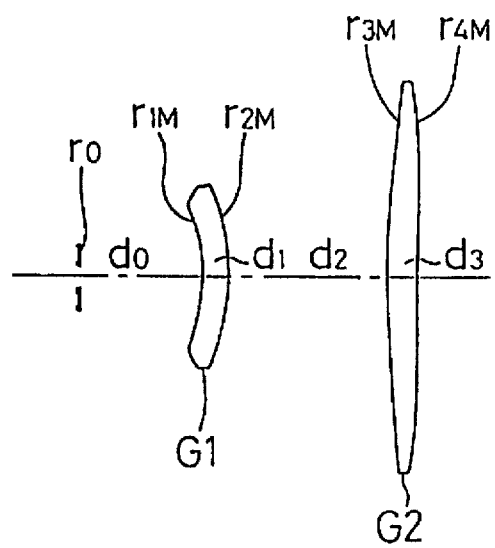
FIG. 40 is a cross-sectional view showing the main scanning direction lens arrangement of a second embodiment of the present invention.
Figure 41:
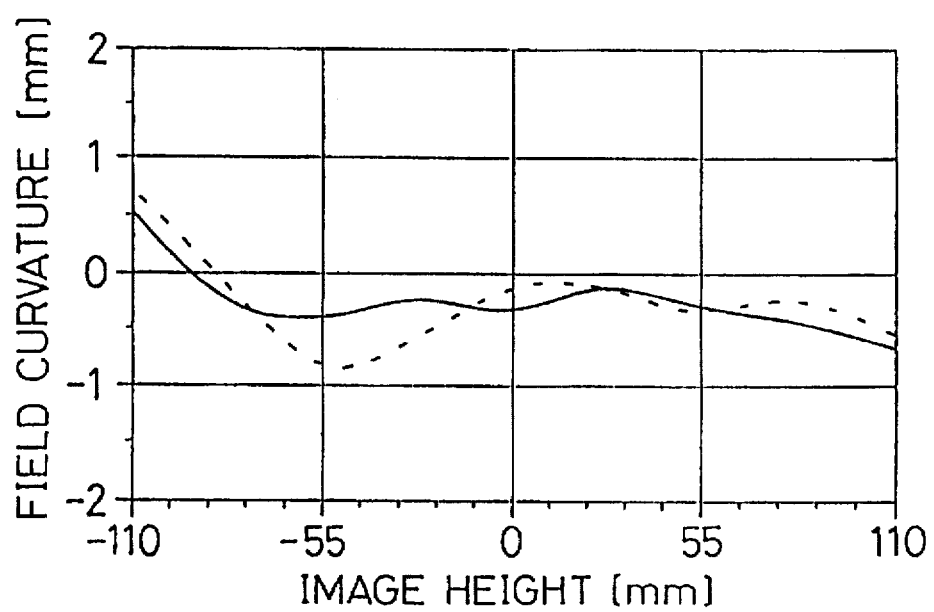
FIG. 41 shows field curvature of the second embodiment of the present invention.
Figure 42:
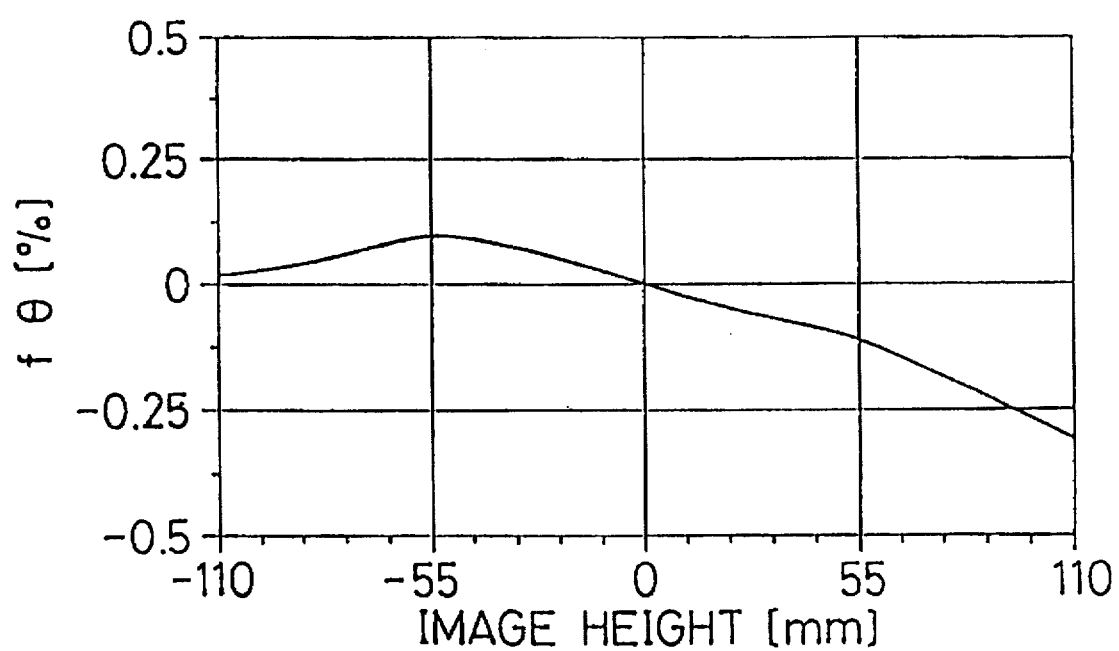
FIG. 42 shows the fθ characteristic of the second embodiment of the present invention.
Figure 43A:
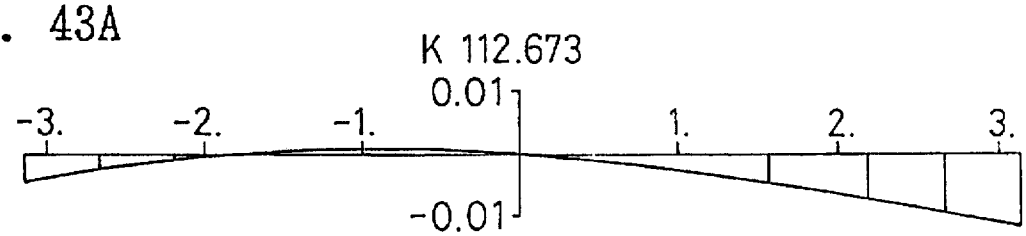
FIGS. 43A to 43E show lateral aberration curves of the second embodiment of the present invention.
Figure 43B:
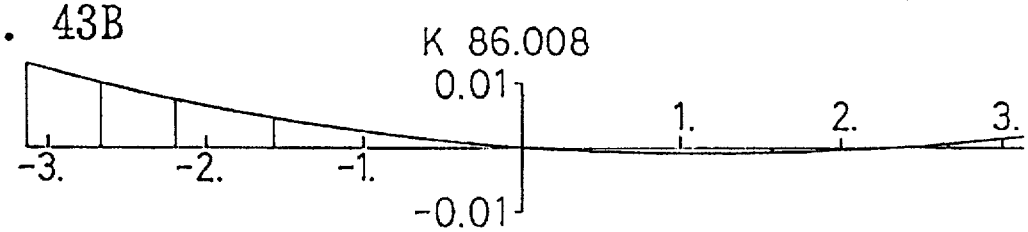
Figure 43C:
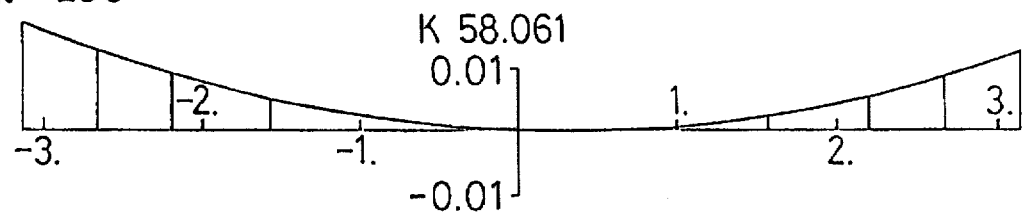
Figure 43D:
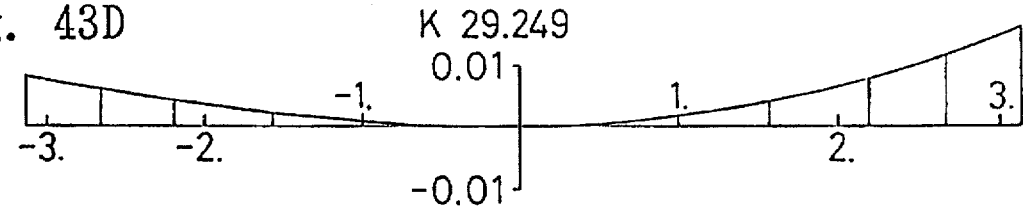
Figure 43E:
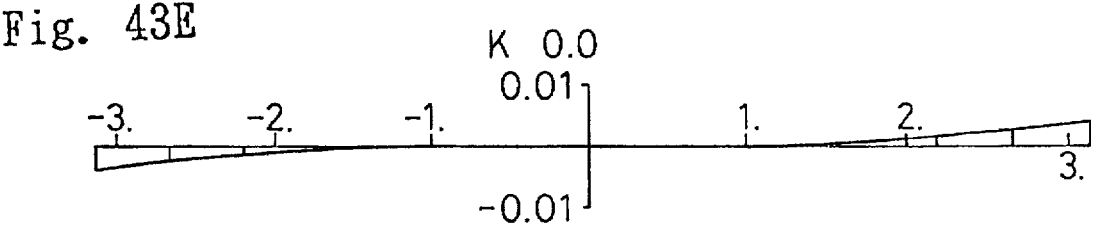
Figure 44:
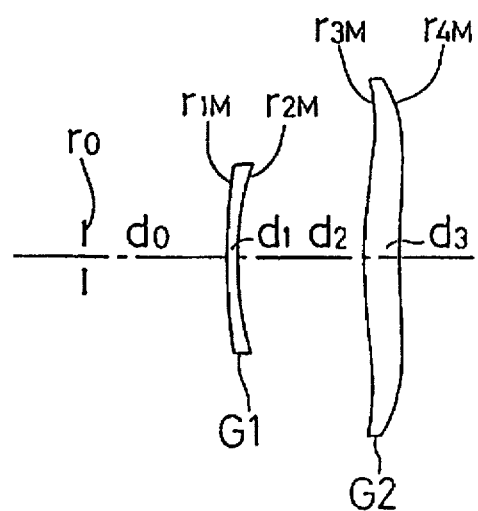
FIG. 44 is a cross-sectional view showing the main scanning direction lens arrangement of a third embodiment of the present invention.
Figure 45:
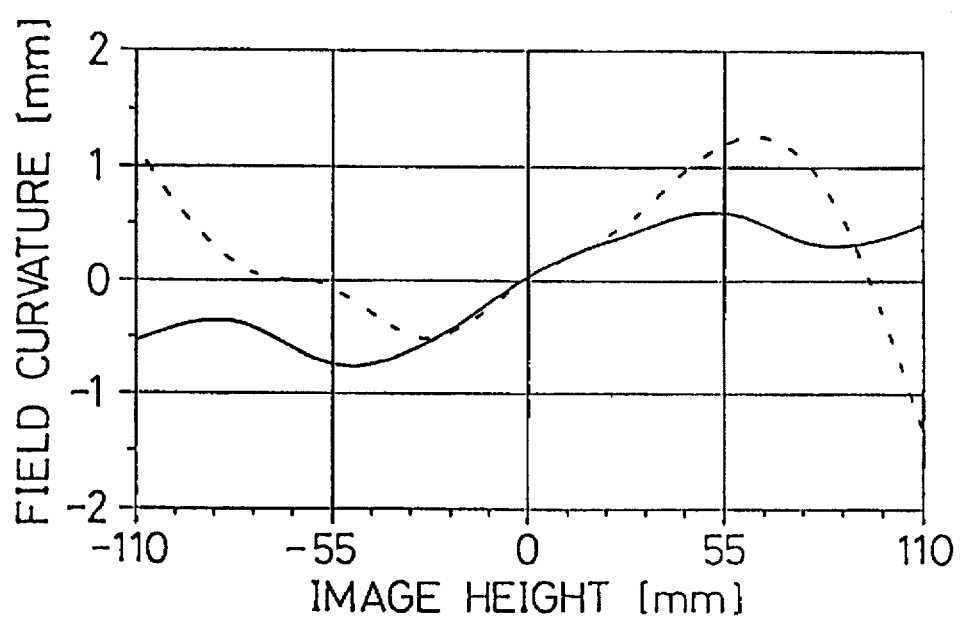
FIG. 45 shows field curvature of the third embodiment of the present invention.
Figure 46:
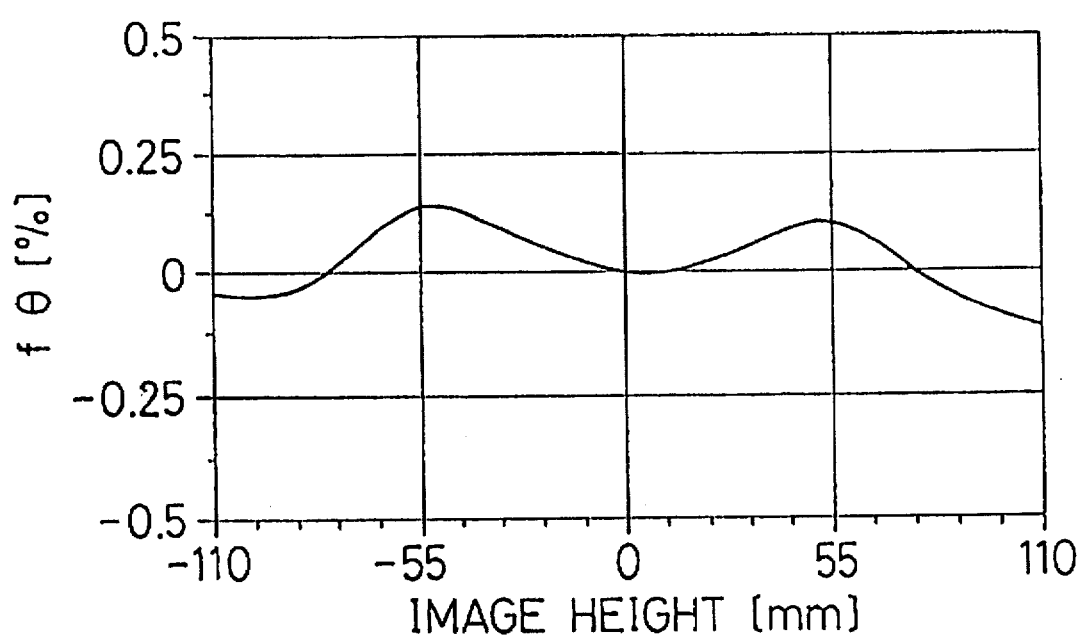
FIG. 46 shows the fθ characteristic of the third embodiment of the present invention.
Figure 47A:
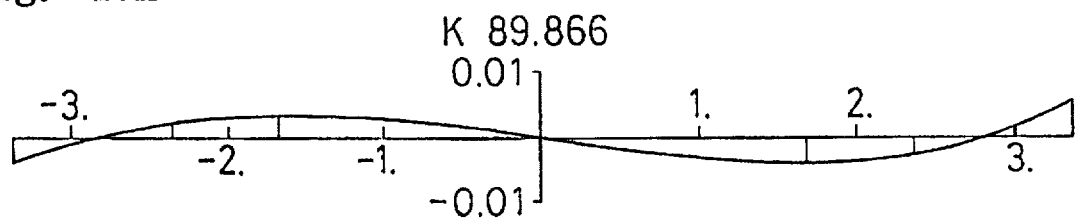
FIGS. 47A to 47E show lateral aberration curves of the third embodiment of the present invention.
Figure 47B:
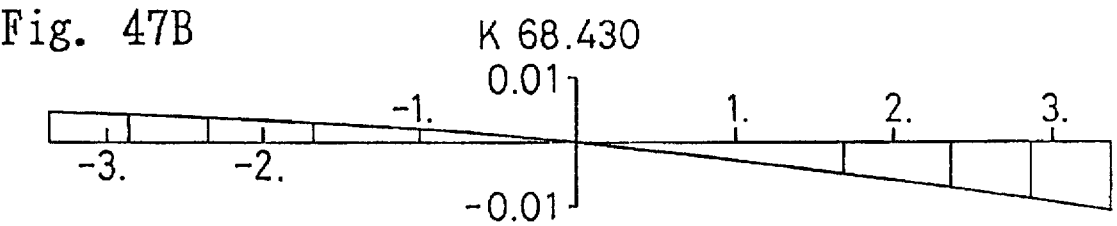
Figure 47C:
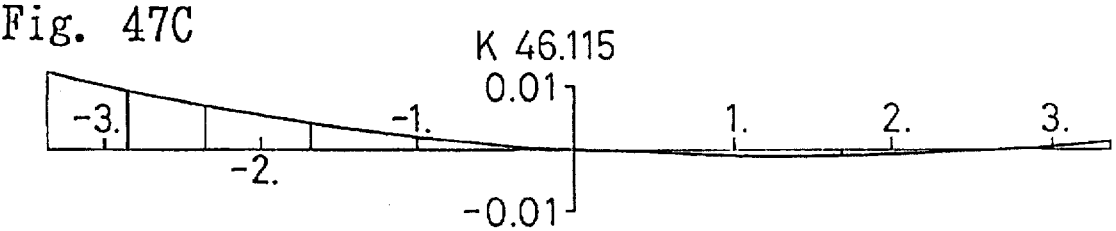
Figure 47D:
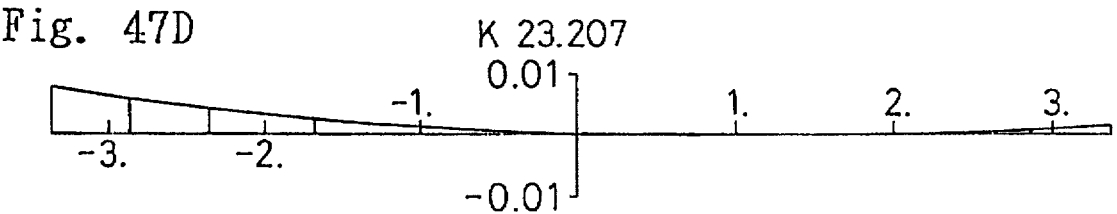
Figure 47E:
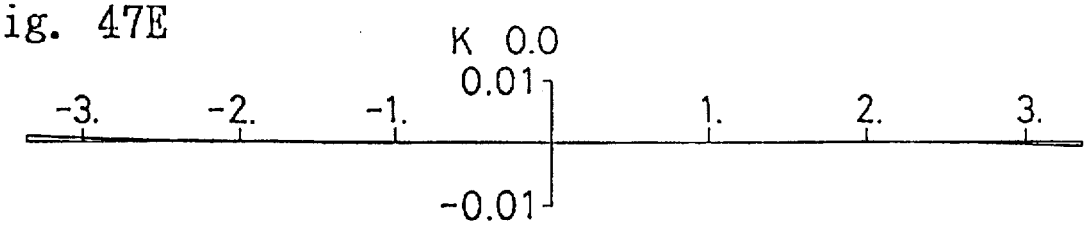
Figure 48:
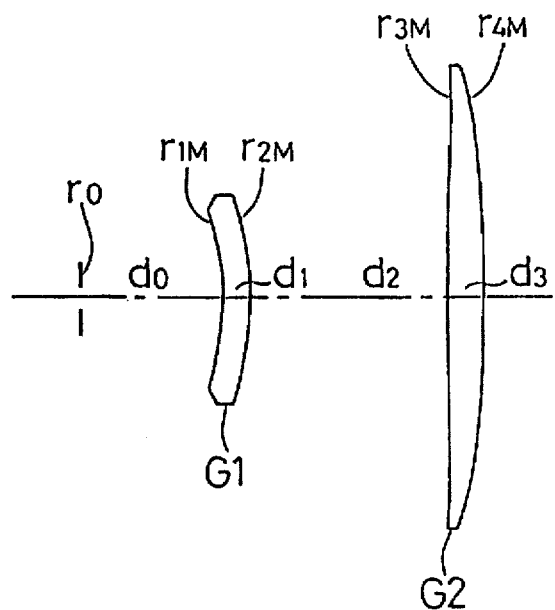
FIG. 48 is a cross-sectional view showing the main scanning direction lens arrangement of a fourth embodiment of the present invention.
Figure 49:
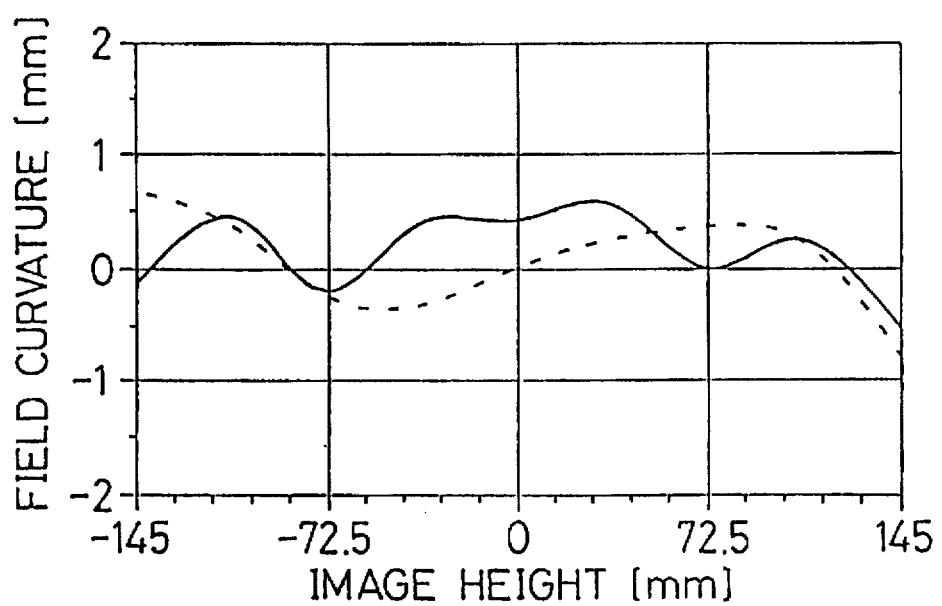
FIG. 49 shows field curvature of the fourth embodiment of the present invention.
Figure 50:
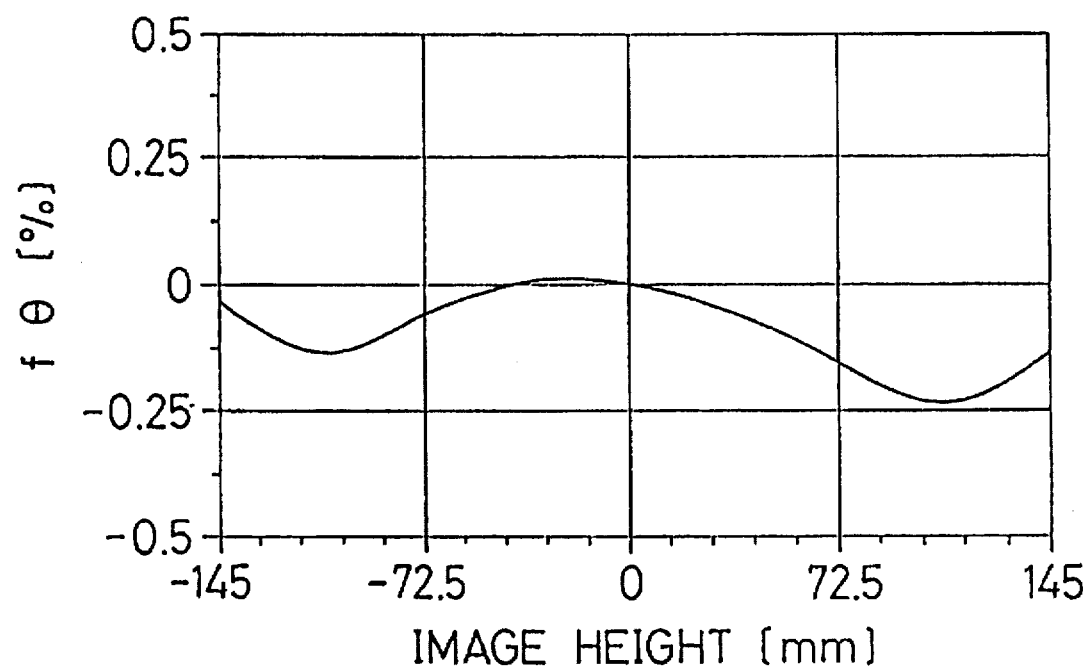
FIG. 50 shows the fθ characteristic of the fourth embodiment of the present invention.
Figure 51A:
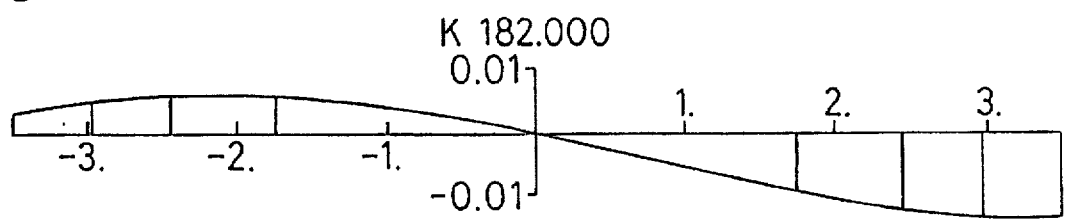
FIGS. 51A to 51E show lateral aberration curves of the fourth embodiment of the present invention.
Figure 51B:
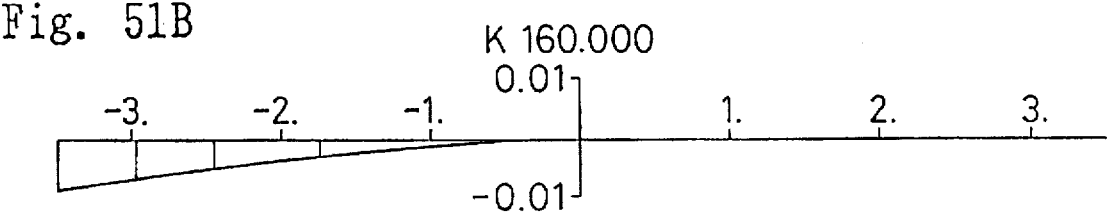
Figure 51C:
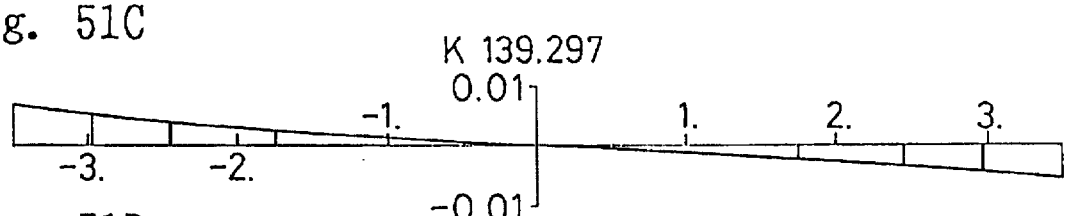
Figure 51D:
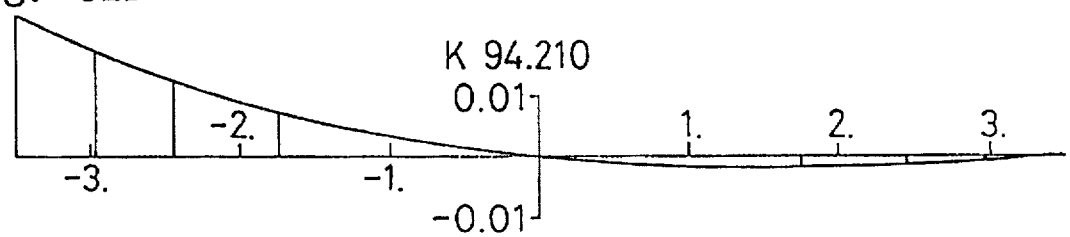
Figure 51E:
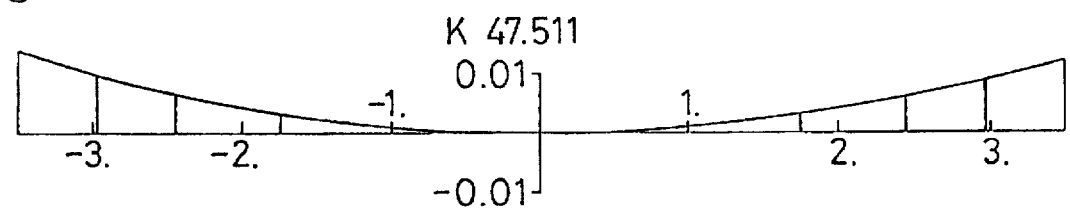
Figure 52:
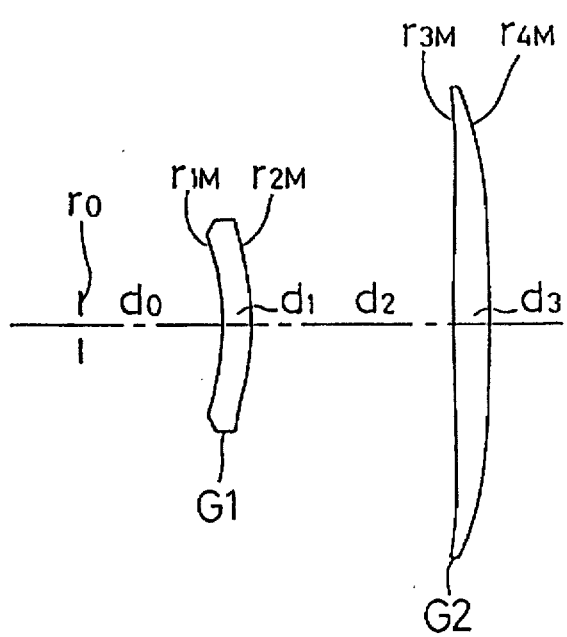
FIG. 52 is a cross-sectional view showing the main scanning direction lens arrangement of a fifth embodiment of the present invention.
Figure 53:
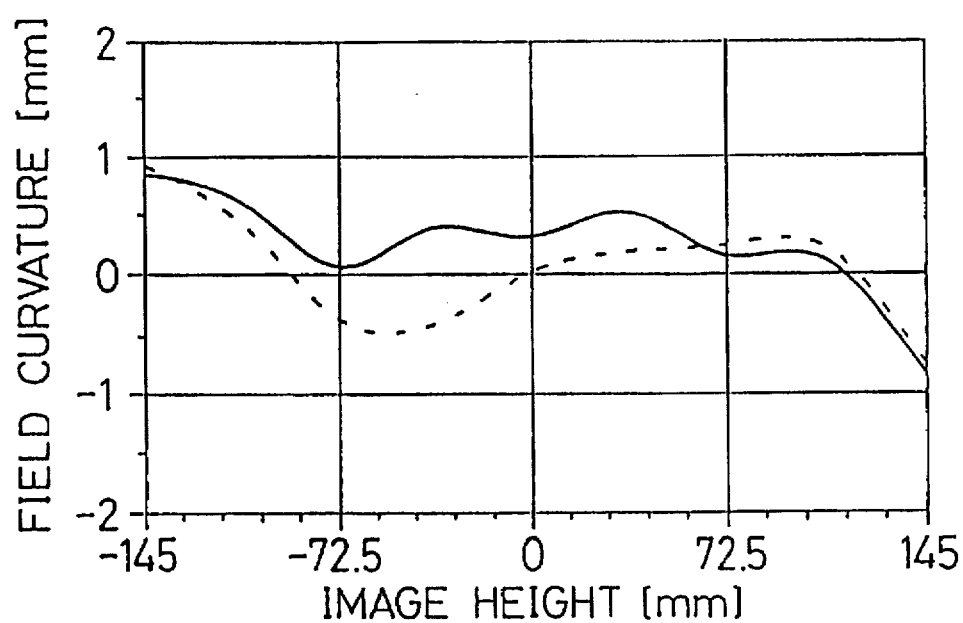
FIG. 53 shows field curvature of the fifth embodiment of the present invention.
Figure 54:
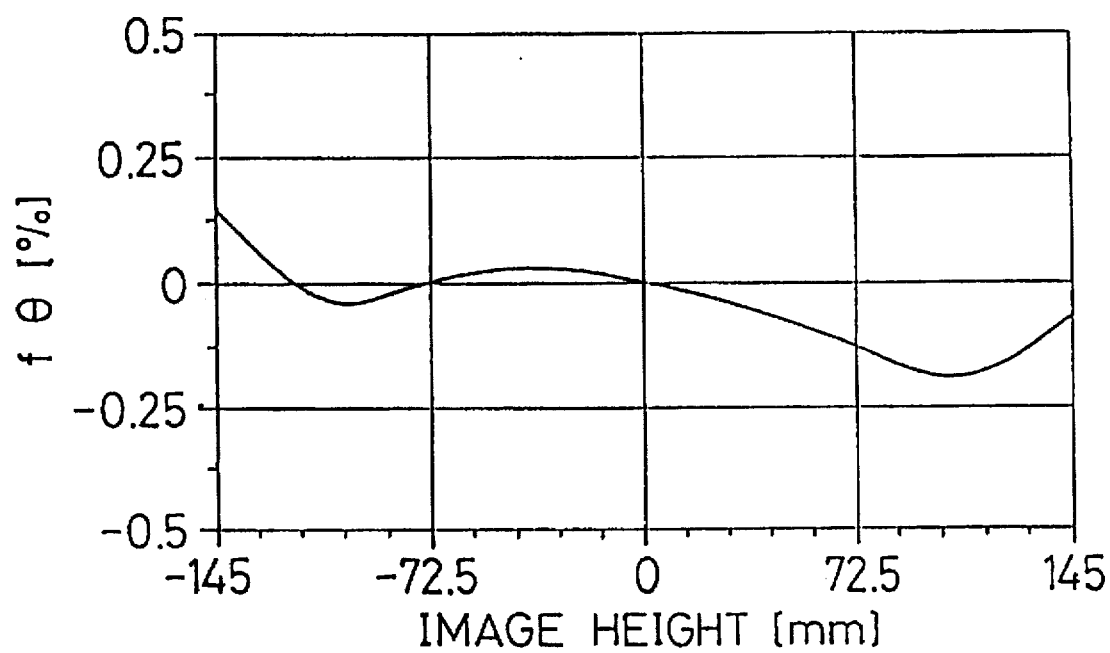
FIG. 54 shows the fθ characteristic of the fifth embodiment of the present invention.
Figure 55A:
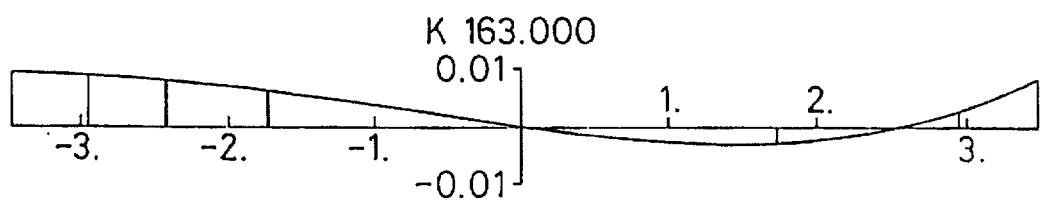
FIGS. 55A to 55E show lateral aberration curves of the fifth embodiment of the present invention.
Figure 55B:
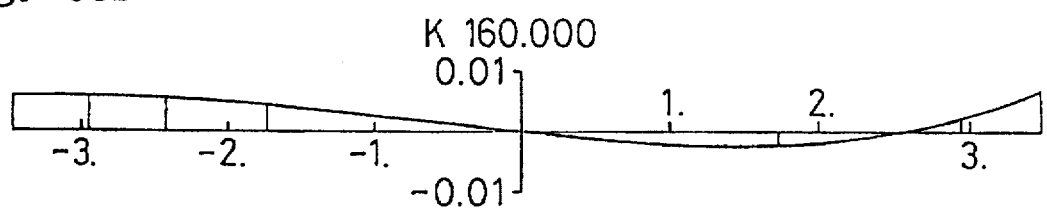
Figure 55C:
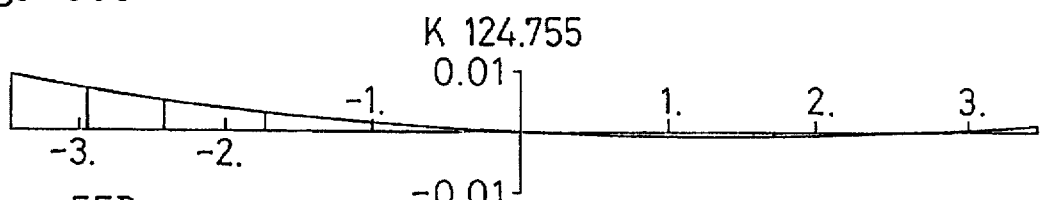
Figure 55D:
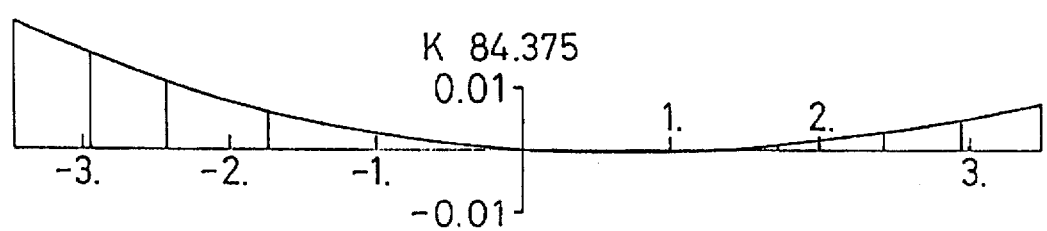
Figure 55E:
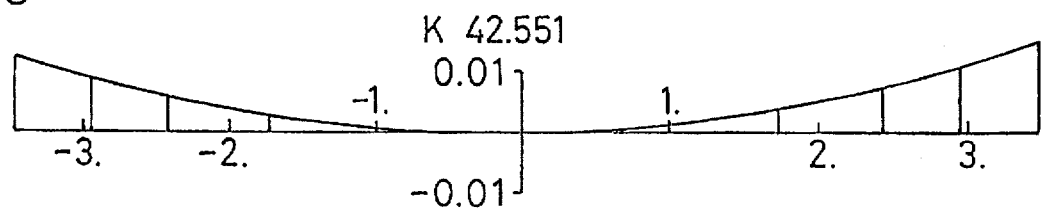

FIGS. 34 and 35 show the arrangement of the entire scanning optical system of the eleventh to fifteenth embodiments (the shown scanning lens SL is that of the eleventh embodiment). FIG. 34 shows the cross section in the main scanning direction, and FIG. 35 shows the cross section in the sub scanning direction. The scanning optical system is provided with a deflector 5 and a scanning lens SL which forms a convergent beam deflected by the deflector 5 at a uniform angular velocity into an image on a scanned surface 8 to scan the scanned surface 8 substantially at a uniform speed.

In this scanning optical system, a divergent beam emitted from a light source 1 comprising a semiconductor laser is transformed by a condenser lens 2 into a convergent beam in the main scanning direction. The convergent beam is a convergent beam which is condensed at a natural convergence point 10 when no scanning lens SL is provided. The width of the convergent beam is restricted by an aperture stop 3 so that a required beam diameter is obtained, and the beam is incident on a cylindrical lens 4 having a refractive power only in the sub scanning direction. The beam having exited from the cylindrical lens 4 is incident on the deflector (polygonal mirror) 5, and converged at the position of a polygonal reflection position 9 only in the sub scanning direction as shown in FIG. 35. The convergent beam deflected at a uniform angular velocity by the deflector 5 rotating (about an axis parallel to the sub scanning direction) at a high speed is incident on the scanning lens SL. The beam is transformed by the scanning lens SL into a uniform beam on an image surface 8 (i.e. the surface of a photoreceptor 8 which is the scanned surface) to scan the scanned surface 8 substantially at a uniform velocity.

As is understood from the sub scanning direction cross section shown in FIG. 35, since the beam is converged at the position of the polygonal reflection surface 9, the polygonal reflection surface 9 is substantially conjugate with the scanned surface on the photoreceptor 8 because of the extended y toric surface (the fourth surface having radii of curvature of $r_{4M}$, $r_{4S}$) included in the second lens element G2. This is in order to correct the shift of the convergence position on the photoreceptor 8 in the sub scanning direction when a slight image inclination occurs at the polygonal mirror 5.

The characteristics of the scanning lens SL will be described. As is apparent from the above-described optical arrangement, the scanning lens SL incorporated in the eleventh to fifteenth embodiments includes from the deflector side a negative first lens element G1 and a positive second lens element G2, both of which are made of resin. While the first lens element G1 is axially symmetric, the second lens element G2 has at the fourth surface (with radii of curvature of $r_{4M}$, $r_{4S}$) the extended y toric surface where the refractive power is different (i.e. the radius of curvature is different) between in the main and sub scanning directions.

Although a resin material having the value of $$-\frac{1}{n-1} \cdot \frac{\delta n}{\delta t} + \alpha$$

in the condition (10) which is much higher than that of a glass material is used for the first and second lens elements G1 and G2, since $(1-\beta)^2$ is small by the scanning lens SL fulfilling the condition (11), the performance variation such as the image surface shift due to a temperature variation is restrained. Since the scanning lens SL includes from the deflector side the negative first lens element G1 and the positive second lens element G2 and the second lens element G2 includes the toric surface where the refractive power is different between in the main and sub scanning directions, even though the performance variation due to a temperature variation is restrained, a high optical performance can be maintained to realize a high-performance scanning optical system. Thus, according to the scanning optical system suitable for the resin-made scanning lens SL, when a resin material is used for the scanning lens SL, axially symmetric aspherical surfaces and toric surfaces having complicated surface configurations and advantageous in improving the performance can be formed at a low cost, so that a high-performance optical system can be realized at a low cost. Since the optical systems of the eleventh to fifteenth embodiments are designed to fulfill the above-described conditions (11) to (15), the above-mentioned advantages are obtained.

FIGS. 36, 40, 44, 48 and 52 are cross-sectional views showing the main scanning direction arrangements of the scanning lenses SL of the eleventh to fifteenth embodiments. FIGS. 47, 41, 45, 49 and 53 show field curvature (with a wavelength of 780 nm) of the eleventh to fifteenth embodiments. The solid lines DT show field curvature in the main scanning direction. The broken lines DS show field curvature in the sub scanning direction. FIGS. 38, 42, 46, 50 and 54 show distortion (i.e. fθ characteristic with a wavelength of 780 nm) of the eleventh to fifteenth embodiments. FIGS. 39A to 39E, 43A to 43E, 47A to 47E, 51A to 51E and 55A to 55E show lateral aberration curves of the eleventh to fifteenth embodiments. The reference designation K in these figures represents the amount of aberration on an image surface of a beam having an angle of view (deflection angle θ) defined by Slxsinθ=K. For example, FIGS. 39A to 39E show the generation of coma on an image surface of a beam having angles of view of K=0.0, 29.226, 57.884, 85.415 and 111.283.

As described above, according to the scanning optical system of the present invention, since the scanning lens fulfills the condition (11), even though a resin-made scanning lens is used, the performance variation such as the image surface shift due to a temperature variation is restrained. Since the scanning lens includes from the deflector side the negative first lens element and the positive second lens element and at least one surface of the second lens element is a toric surface where the refractive power is different between in the main and sub scanning directions, even though the performance variation due to a temperature variation is restrained, a high optical performance is maintained, so that a high-performance scanning optical system is realized.

Thus, according to the scanning optical system suitable for the resin-made scanning lens, when a resin material is used for the scanning lens, axially symmetric aspherical surfaces and toric surfaces having complicated surface configurations and advantageous in improving the performance can be formed at a low cost, so that a high-performance optical system is realized at a low cost.

Obviously, many modifications and variations of the present invention are possible in light of the above teachings. It is therefore to be understood that within the scope of the appended claims, the invention may be practiced other than as specifically described.

TABLE 1

(1st Embodiment)

| f = −450 | S1 = 200 | k = 412.116 |
|---|---|---|
| θ$_{max}$ = 23(deg) | C = −68.383 | |
| Y$_{max}$ = 165.434 | L = 484.641 | |
| Radius of Curvature | Axial Distance | Refractive Index |

| | | | | | |
|---|---|---|---|---|---|
| r0 | | ∞ (Deflection surface) | | | |
| | | d0 | 30 | | |
| r1 | −433.866 | | | | |
| | | d1 | 8 | N1 | 1.51118 |
| r2 | 99.261 | | | | |
| | | d2 | 70 | | |
| r3 | 147.290 | | | | |
| | | d3 | 18 | N2 | 1.78571 |
| r4* | 311.493 | | | | |
| | | LB | 358.642 | | |

Aspherical Surface Data r4 : ε = 1
A4 = 2.263 × 10$^{-8}$
A6 = 2.879 × 10$^{-12}$
A8 = 8.138 × 10$^{-16}$
A10 = −8.711 × 10$^{-20}$

TABLE 2

(2nd Embodiment)

| f = ∞ | S1 = 330 | k = 358.774 |
|---|---|---|
| θ$_{max}$ = 23(deg) | C = −880.921 | |
| Y$_{max}$ = 144.021 | L = 435.585 | |
| Radius of Curvature | Axial Distance | Refractive Index |

| | | | | | |
|---|---|---|---|---|---|
| r0 | | ∞ (Deflection surface) | | | |
| | | d0 | 24 | | |
| r1* | −112.242 | | | | |
| | | d1 | 10 | N1 | 1.51118 |
| r2 | −114.044 | | | | |
| | | d2 | 8 | | |
| r3 | 1642.414 | | | | |
| | | d3 | 10 | N2 | 1.51118 |
| r4 | 119.379 | | | | |
| | | d4 | 40 | | |
| r5 | 127.693 | | | | |
| | | d5 | 24 | N3 | 1.78571 |
| r6* | 271.134 | | | | |
| | | LB | 309.585 | | |

Aspherical Surface Data r1 : ε = 1
A4 = 3.337 × 10$^{-10}$
A6 = 6.128 × 10$^{-10}$
A8 = 8.094 × 10$^{-12}$
A10 = −2.425 × 10$^{-14}$ r6 : ε = 1
A4 = 7.220 × 10$^{-8}$
A6 = 3.533 × 10$^{-12}$
A8 = 3.663 × 10$^{-15}$
A10 = −6.370 × 10$^{-19}$

TABLE 3

(3rd Embodiment)

| f = −450 | S1 = 200 | k = 349.459 |
|---|---|---|
| θ$_{max}$ = 23(deg) | C = −79.562 | |
| Y$_{max}$ = 140.282 | L = 408.915 | |
| Radius of | Axial | Refractive |

TABLE 3-continued

| Curvature | Distance | | Index | |
|---|---|---|---|---|
| r0 | ∞ (Deflection surface) | | | |
| | d0 | 50 | | |
| r1 | −301.843 | | | |
| | d1 | 10 | N1 | 1.51118 |
| r2 | 102.411 | | | |
| | d2 | 60 | | |
| r3* | 145.099 | | | |
| | d3 | 24 | N2 | 1.78571 |
| r4* | 350.334 | | | |
| | LB | 264.915 | | |

Aspherical Surface Data r3 : $\epsilon = 1$
$A4 = -1.544 \times 10^{-9}$
$A6 = -2.161 \times 10^{-12}$
$A8 = -2.714 \times 10^{-16}$
$A10 = 2.259 \times 10^{-20}$ r4 : $\epsilon = 1$
$A4 = 1.116 \times 10^{-8}$
$A6 = 4.009 \times 10^{-12}$
$A8 = -5.743 \times 10^{-16}$
$A10 = 3.421 \times 10^{-20}$

TABLE 4

(4th Embodiment)

$f = \infty$   $S1 = 330$   $k = 425.150$
$\theta_{max} = 23(\deg)$   $C = -456.187$
$Y'_{max} = 170.666$   $L = 556.684$

| Radius of Curvature | Axial Distance | | Refractive Index | |
|---|---|---|---|---|
| r0 | ∞ (Deflection surface) | | | |
| | d0 | 24 | | |
| r1* | −73.341 | | | |
| | d1 | 10 | N1 | 1.51118 |
| r2 | −84.919 | | | |
| | d2 | 8 | | |
| r3 | −172.433 | | | |
| | d3 | 10 | N2 | 1.51118 |
| r4 | 255.312 | | | |
| | d4 | 40 | | |
| r5 | 191.484 | | | |
| | d5 | 24 | N3 | 1.78571 |
| r6* | −1952.019 | | | |
| | LB | 440.684 | | |

Aspherical Surface Data r1 : $\epsilon = 1$
$A4 = 6.382 \times 10^{-10}$
$A6 = -5.633 \times 10^{-10}$
$A8 = 6.934 \times 10^{-12}$
$A10 = -1.296 \times 10^{-14}$ r6 : $\epsilon = 1$
$A4 = 6.164 \times 10^{-8}$
$A6 = 1.898 \times 10^{-12}$
$A8 = 8.303 \times 10^{-16}$
$A10 = -1.440 \times 10^{-19}$

TABLE 5

(5th Embodiment)

$f = -500$   $S1 = 200$   $k = 415.377$
$\theta_{max} = 23(\deg)$   $C = -94.755$
$Y'_{max} = 166.727$   $L = 517.358$

| Radius of Curvature | Axial Distance | | Refractive Index | |
|---|---|---|---|---|
| r0 | ∞ (Deflection surface) | | | |
| | d0 | 24 | | |
| r1* | −142.864 | | | |
| | d1 | 10 | N1 | 1.51118 |
| r2 | 203.025 | | | |
| | d2 | 8 | | |
| r3 | 243.954 | | | |
| | d3 | 10 | N2 | 1.51118 |
| r4 | 121.323 | | | |
| | d4 | 40 | | |

TABLE 5-continued

| | | | | |
|---|---|---|---|---|
| r5 | 127.693 | | | |
| | d5 | 24 | N3 | 1.78571 |
| r6* | 485.215 | | | |
| | LB | 401.358 | | |

Aspherical Surface Data r1 : $\epsilon = 1$
$A4 = -2.025 \times 10^{-25}$
$A6 = -1.021 \times 10^{-8}$
$A8 = 1.013 \times 10^{-10}$
$A10 = -2.515 \times 10^{-13}$ r6 : $\epsilon = 1$
$A4 = 9.191 \times 10^{-8}$
$A6 = 3.653 \times 10^{-12}$
$A8 = 4.666 \times 10^{-15}$
$A10 = -6.762 \times 10^{-19}$

TABLE 6

(6th Embodiment)

$f = -41.824$   $S1 = 66.905$   $k = 375.726$
$\theta_{max} = 23(\deg)$   $C = 30.740$
$Y'_{max} = 143.778$   $L = 225.710$

| Radius of Curvature | Axial Distance | | Refractive Index | |
|---|---|---|---|---|
| r0 | ∞ (Deflection surface) | | | |
| | d0 | 30 | | |
| r1 | −18.678 | | | |
| | d1 | 8 | N1 | 1.51118 |
| r2 | −95.084 | | | |
| | d2 | 18.69 | | |
| r3* | 31.304 | | | |
| | d3 | 8 | N2 | 1.48457 |
| r4* | 30.295 | | | |
| | LB | −169.1471 | | |

Aspherical Surface Data r3 : $\epsilon = -3.93579$
$A2 = -3.362 \times 10^{-3}$
$A4 = -7.627 \times 10^{-6}$
$A6 = -9.441 \times 10^{-10}$
$A8 = 1.288 \times 10^{-13}$
$A10 = -4.025 \times 10^{-17}$ r4 : $\epsilon = -4.45660$
$A2 = 2.208 \times 10^{-3}$
$A4 = 6.858 \times 10^{-6}$
$A6 = 3.508 \times 10^{-10}$
$A8 = 4.270 \times 10^{-13}$
$A10 = -3.714 \times 10^{-6}$

TABLE 7

(7th Embodiment)

$f = -71$   $S1 = 74$   $k = 373.673$
$\theta_{max} = 23(\deg)$   $C = 19.243$
$Y'_{max} = 150.002$   $L = 295.746$

| Radius of Curvature | Axial Distance | | Refractive Index | |
|---|---|---|---|---|
| r0 | ∞(Deflection surface) | | | |
| | d0 | 34.712 | | |
| r1 | −17.294 | | | |
| | d1 | 8 | N1 | 1.51118 |
| r2 | −108.430 | | | |
| | d2 | 20.544 | | |
| r3 | −98.026 | | | |
| | d3 | 18 | N2 | 1.78571 |
| r4* | −57.008 | | | |
| | LB | 214.490 | | |

Aspherical Surface Data r4 : $\epsilon = 0.99525$
$A2 = 1.472 \times 10^{-3}$
$A4 = 2.010 \times 10^{-8}$
$A6 \; 7.915 \times 10^{-12}$
$A8 \; 5.611 \times 10^{-16}$

TABLE 8

(8th Embodiment)

$f = -170$  $S1 = 100$  $k = 373.673$
$\theta_{max} = 23(\text{deg})$  $C = -9.614$
$Y'_{max} = 150.00217$  $L = 399.985$

| Radius of Curvature | Axial Distance | Refractive Index |
|---|---|---|
| r0 | ∞ (Deflection surface) | |
| | d0  34.712 | |
| r1  −18.836 | | |
| | d1  8 | N1  1.51118 |
| r2  −94.813 | | |
| | d2  20.544 | |
| r3  −164.251 | | |
| | d3  18 | N2  1.78571 |
| r4*  −63.535 | | |
| | LB  318.728 | |

Aspherical Surface Data r4  :$\epsilon = 0.99349$
$A2 = 1.375 \times 10^{-4}$
$A4 = -4.202 \times 10^{-8}$
$A6 = 3.028 \times 10^{-12}$
$A8 = -4.092 \times 10^{-16}$

TABLE 9

(9th Embodiment)

$f = -550$  $S1 = 150$  $k = 373.758$
$\theta_{max} = 23(\text{deg})$  $C = -79.899$
$Y'_{max} = 149.964$  $L = 492.669$

| Radius of Curvature | Axial Distance | Refractive Index |
|---|---|---|
| r0 | ∞ (Deflection surface) | |
| | d0  34.712 | |
| r1  −17.294 | | |
| | d1  8 | N1  1.51118 |
| r2  −108.430 | | |
| | d2  20.544 | |
| r3  −98.026 | | |
| | d3  18 | N2  1.78571 |
| r4*  −57.008 | | |
| | LB  411.413 | |

Aspherical Surface Data r4  :$\epsilon = 0.99185$
$A2 = -1.124 \times 10^{-3}$
$A4 = -1.268 \times 10^{-7}$
$A6 = -1.165 \times 10^{-11}$
$A8 = -3.878 \times 10^{-15}$

TABLE 10

(10th Embodiment)

$f = -4000$  $S1 = 300$  $k = 373.606$
$\theta_{max} = 23 (\text{deg})$  $C = -150.342$
$Y'_{max} = 150.0$  $L = 410.493$

| Radius of Curvature | Axial Distance | Refractive Index |
|---|---|---|
| r0 | ∞ (Deflection surface) | |
| | d0  34.577 | |
| r1  1491.157 | | |
| | d1  8 | N1  1.51118 |
| r2  167.204 | | |
| | d2  64 | |
| r3  290.725 | | |
| | d3  10 | N2  1.78571 |

TABLE 10-continued

| | | |
|---|---|---|
| r4*  1298.904 | | |
| | d4  157.47 | |
| r5  ∞ | | |
| | d5  5 | |
| r6  ∞ | | |
| | LB  131.446 | |

Aspherical Surface Data r4  :$\epsilon = 1$
$A4 = -8.155 \times 10^{-9}$
$A6 = -6.357 \times 10^{-14}$
$A8 -1.385 \times 10^{-16}$
$A10 = -4.191 \times 10^{-20}$
$A12 = -1.235 \times 10^{-23}$

TABLE 11

(11th Embodiment)

$\beta = 0.92$  $f_{1M} = f_{1S} = -1666.7$ mm  $f_{1M}/f_{2M} = -2.76$
$\theta_{max} = 32°$  $f_{2M} = 604.68$ mm  $f_{1S}/f_{2S} = -33.12$
$S1 = 210$ mm  $f_{2S} = 50.33$ mm  $f_{2M}/f_{2S} = 12.01$
$y_{max} = 108.5$ mm
$f_M = 828.46$ mm

| Radius of Curvature | Axial Distance | Refractive Index ($\lambda = 780$ mm) |
|---|---|---|
| r0 | ∞ (Deflection surface) | |
| | d0  26 | |
| *r1M = r1S  −43.176 | | |
| | d1  8.45 | N1  1.5188 |
| *r2M = r2S  −48.484 | | |
| | d2  37.2 | |
| *r3M = r3S  −9078.5 | | |
| | d3  8.6 | N2  1.5188 |
| r4M  −303.34 | | |
| r4S  −26.176 | | |
| | LB  142.87 | |

Aspherical Surface Data

| | r1M,r1S | r2M,r2S | r3M,r3S |
|---|---|---|---|
| $\epsilon$ | 1 | 1 | 1 |
| A4 | $0.47894 \times 10^{-5}$ | $0.47814 \times 10^{-5}$ | $-0.17366 \times 10^{-6}$ |
| A6 | $0.53714 \times 10^{-9}$ | $0.15067 \times 10^{-9}$ | $-0.94860 \times 10^{-10}$ |
| A8 | $-0.51467 \times 10^{-13}$ | $0.99634 \times 10^{-15}$ | $0.84580 \times 10^{-14}$ |
| A10 | $-0.16200 \times 10^{-14}$ | $-0.18859 \times 10^{-18}$ | $0.15846 \times 10^{-18}$ |
| A12 | 0.0 | 0.0 | 0.0 |

| | r4M | r4S |
|---|---|---|
| | $\mu = 1$ | $\epsilon = 1$ |
| a0,4 | $-0.71212 \times 10^{-6}$ | a2,2  $0.21 \times 10^{-5}$ |
| a0,6 | $0.34155 \times 10^{-10}$ | a2,4  $-0.65 \times 10^{-9}$ |
| a0,8 | $-0.30602 \times 10^{-13}$ | a2,6  $-0.425 \times 10^{-13}$ |
| a0,10 | $0.26748 \times 10^{-17}$ | a2,8  0.0 |

TABLE 12

(12th Embodiment)

$\beta = 0.94$  $f_{1M} = f_{1S} = -1428.6$ mm  $f_{1M}/f_{2M} = -2.11$
$\theta_{max} = 28°$  $f_{2M} = 677.37$ mm  $f_{1S}/f_{2S} = -24.1$
$S1 = 240$ mm  $f_{2S} = 59.276$ mm  $f_{2M}/f_{2S} = 11.43$
$y_{max} = 110$ mm
$f_M = 1105.2$ mm

| Radius of Curvature | Axial Distance | Refractive Index ($\lambda = 780$ mm) |
|---|---|---|
| r0 | ∞ (Deflection surface) | |
| | d0  35.596 | |
| *r1M = r1S  −45.136 | | |
| | d1  7.504 | N1  1.5188 |

TABLE 12-continued

| *r2M = r2S | −50.792 | | | | |
|---|---|---|---|---|---|
| *r3M = r3S | 243.05 | d2 | 45.828 | | |
| r4M | 778.49 | d3 | 8.658 | N2 | 1.5188 |
| r4S | −34.78 | | | | |
| | | LB | 157.3 | | |

Aspherical Surface Data

| | r1M,r1S | r2M,r2S | r3M,r3S |
|---|---|---|---|
| ε | 1 | 1 | 1 |
| A4 | $0.31593 \times 10^{-5}$ | $0.30052 \times 10^{-5}$ | $-0.26469 \times 10^{-6}$ |
| A6 | $0.43336 \times 10^{-9}$ | $0.11820 \times 10^{-9}$ | $-0.77142 \times 10^{-11}$ |
| A8 | $0.22058 \times 10^{-12}$ | $0.43851 \times 10^{-15}$ | $-0.42646 \times 10^{-14}$ |
| A10 | $-0.42038 \times 10^{-15}$ | $-0.20373 \times 10^{-18}$ | $0.63451 \times 10^{-18}$ |
| A12 | 0.0 | 0.0 | 0.0 |

| | r4M, μ = 1 | | r4S, ε = 1 |
|---|---|---|---|
| a0,4 | $-0.49810 \times 10^{-6}$ | a2,2 | $0.61 \times 10^{-6}$ |
| a0,6 | $0.50641 \times 10^{-10}$ | a2,4 | $-0.29 \times 10^{-9}$ |
| a0,8 | $-0.16193 \times 10^{-13}$ | a2,6 | $-0.12 \times 10^{-13}$ |
| a0,10 | $0.121 \times 10^{-17}$ | a2,8 | 0.0 |

TABLE 13

(13th Embodiment)

| β = 1.18 | $f_{1M} = f_{1S} = -317.28$ mm | $f_{1M}/f_{2M} = -0.76$ |
|---|---|---|
| $\theta_{max} = 26°$ | $f_{2M} = 417.36$ mm | $f_{1S}/f_{2S} = -6.08$ |
| S1 = 205 mm | $f_{2S} = 52.217$ mm | $f_{2M}/f_{2S} = 7.99$ |
| $y_{max} = 110$ mm | | |
| $f_M = -1803.6$ mm | | |

| | Radius of Curvature | Axial Distance | Refractive Index (λ= 780 mm) |
|---|---|---|---|
| r0 | ∞ (Deflection surface) | | |
| | | d0 | 39.096 | |
| r1M = r1S | 158.34 | | | |
| | | d1 | 3 | N1 1.5188 |
| *r2M = r2S | 80.185 | | | |
| | | d2 | 35.187 | |
| *r3M = r3S | 110.95 | | | |
| | | d3 | 10 | N2 1.5188 |
| r4M | 220.53 | | | |
| r4S | −34.740 | | | |
| | | LB | 162.94 | |

Aspherical Surface Data

| | r2M, r2S | r3M, r3S |
|---|---|---|
| ε | 1 | 1 |
| A4 | $-0.45493 \times 10^{-6}$ | $-0.19803 \times 10^{-5}$ |
| A6 | $0.41357 \times 10^{-9}$ | $0.18423 \times 10^{-11}$ |
| A8 | $0.63071 \times 10^{-14}$ | $0.21078 \times 10^{-13}$ |
| A10 | $0.16306 \times 10^{-17}$ | $0.26081 \times 10^{-17}$ |
| A12 | $-0.24491 \times 10^{-20}$ | $0.24297 \times 10^{-21}$ |

| | r4M, μ= 1 | | r4S, ε = 1 |
|---|---|---|---|
| a0,4 | $-0.18463 \times 10^{-5}$ | a2,2 | $-0.95 \times 10^{-6}$ |
| a0,6 | $-0.37616 \times 10^{-10}$ | a2,4 | $-0.1545 \times 10^{-8}$ |
| a0,8 | $0.26739 \times 10^{-14}$ | a2,6 | $0.2 \times 10^{-14}$ |
| a0,10 | $-0.96370 \times 10^{-18}$ | a2,8 | $-0.5 \times 10^{-17}$ |
| a0,12 | $-0.17325 \times 10^{-20}$ | — | — |

TABLE 14

(14th Embodiment)

| β = 0.77 | $f_{2M} = 771.15$ mm | $f_{1M}/f_{2M} = -30.36$ |
|---|---|---|
| $\theta_{max} = 30°$ | $f_{1M} = f_{1S} = -23410.7$ mm | $f_{1S}/f_{2S} = -319.9$ |
| S1 = 364 mm | $f_{2S} = 73.173$ mm | $f_{2M}/f_{2S} = 10.539$ |
| $y_{max} = 145$ mm | | |
| $f_M = 761.61$ mm | | |

| | Radius of Curvature | Axial Distance | Refractive Index (λ= 780 mm) |
|---|---|---|---|
| r0 | ∞ (Deflection surface) | | |
| | | d0 | 40 | |
| *r1M = r1S | 63.713 | | | |
| | | d1 | 8 | N1 1.5188 |
| *r2M = r2S | −66.796 | | | |
| | | d2 | 57 | |
| *r3M = r3S | 740.94 | | | |
| | | d3 | 10.5 | N2 1.5188 |
| r4M | −865.51 | | | |
| r4S | −39.82 | | | |
| | | LB | 207.51 | |

Aspherical Coefficients

| | r1M,r1S | r2M,r2S | r3M,r3S |
|---|---|---|---|
| ε | 1 | 1 | 1 |
| A4 | $0.27561 \times 10^{-5}$ | $0.25704 \times 10^{-5}$ | $-0.11207 \times 10^{-6}$ |
| A6 | $0.10910 \times 10^{-9}$ | $0.49323 \times 10^{-10}$ | $-0.18372 \times 10^{-10}$ |
| A8 | $-0.39438 \times 10^{-14}$ | $-0.13464 \times 10^{-14}$ | $0.20791 \times 10^{-14}$ |
| A10 | $-0.93906 \times 10^{-16}$ | $-0.41707 \times 10^{-17}$ | $0.66853 \times 10^{-20}$ |
| A12 | 0.0 | 0.0 | 0.0 |

| | r4M, μ= 1 | | r4S, ε = 1 |
|---|---|---|---|
| a0,4 | $-0.27746 \times 10^{-6}$ | a2,2 | $0.55 \times 10^{-6}$ |
| a0,6 | $0.70722 \times 10^{-11}$ | a2,4 | $-0.163 \times 10^{-9}$ |
| a0,8 | $-0.25285 \times 10^{-14}$ | a2,6 | $0.58 \times 10^{-14}$ |
| a0,10 | $0.20263 \times 10^{-18}$ | a2,8 | 0.0 |

TABLE 15

(15th Embodiment)

| β = 0.85 | $f_{1M} = f_{1S} = -3840.7$ mm | $f_{1M}/f_{2M} = -4.64$ |
|---|---|---|
| $\theta_{max} = 30°$ | $f_{2M} = 826.65$ mm | $f_{1S}/f_{2S} = -54.23$ |
| S1 = 326 mm | $f_{2S} = 70.817$ mm | $f_{2M}/f_{2S} = 11.67$ |
| $y_{max} = 145$ mm | | |
| $f_M = 979.71$ mm | | |

| | Radius of Curvature | Axial Distance | Refractive Index (λ= 780 mm) |
|---|---|---|---|
| r0 | ∞ (Deflection surface) | | |
| | | d0 | 40 | |
| *r1M = r1S | 63.016 | | | |
| | | d1 | 8 | N1 1.5188 |
| *r2M = r2S | −67.896 | | | |
| | | d2 | 57 | |
| *r3M = r3S | 791.83 | | | |
| | | d3 | 10 | N2 1.5188 |
| r4M | −931.65 | | | |
| r4S | −38.36 | | | |
| | | LB | 200.28 | |

Aspherical Coefficients

| | r1M,r1S | r2M,r2S | r3M,r3S |
|---|---|---|---|
| ε | 1 | 1 | 1 |
| A4 | $0.27561 \times 10^{-5}$ | $0.25910 \times 10^{-5}$ | $-0.16790 \times 10^{-6}$ |
| A6 | $0.10911 \times 10^{-9}$ | $0.49085 \times 10^{-10}$ | $-0.17858 \times 10^{-10}$ |
| A8 | $-0.39437 \times 10^{-14}$ | $-0.14805 \times 10^{-14}$ | $0.20887 \times 10^{-14}$ |

TABLE 15-continued (15th Embodiment)

| | | | |
|---|---|---|---|
| A10 | $-0.93906 \times 10^{-16}$ | $-0.42630 \times 10^{-17}$ | $0.75396 \times 10^{-20}$ |
| A12 | 0.0 | 0.0 | 0.0 |

| r4M $\mu = 1$ | | r4S $\epsilon = 1$ | |
|---|---|---|---|
| a0,4 | $-0.33352 \times 10^{-6}$ | a2,2 | $0.5 \times 10^{-6}$ |
| a0,6 | $0.54825 \times 10^{-11}$ | a2,4 | $-0.183 \times 10^{-9}$ |
| a0,8 | $-0.25956 \times 10^{-14}$ | a2,6 | $0.2 \times 10^{-14}$ |
| a0,10 | $0.15449 \times 10^{-18}$ | a2,8 | 0.0 |

What is claimed is:

1. A scanning optical system comprising:
a deflector;
a scanning lens on which a convergent beam deflected by the deflector at a uniform angular velocity is incident, said scanning lens forming the convergent beam into an image on a scanned surface to scan the scanned surface substantially at a uniform velocity,
wherein said scanning lens includes from a deflector side a first lens element of a negative refractive power and a second lens element of a positive refractive power, and wherein one surface of the second lens element is a toric surface where its refractive power in a main scanning direction and its refractive power in a sub scanning direction are different, and wherein said scanning lens fulfills the following condition:

$$|1-\beta|<0.25$$

where $\beta$ is a magnification of the scanning lens in the main scanning direction.

2. A scanning optical system as claimed in claim 1, wherein a radius of curvature of said toric surface in the sub scanning direction varies with an increase in angle of view in the main scanning direction.

3. A scanning optical system as claimed in claim 1, wherein said scanning lens fulfills the following condition:

$$5 < \frac{f_{2M}}{f_{2S}} < 15$$

where $f_{2M}$ is a focal length of the second lens element in the main scanning direction and $f_{2S}$ is a focal length of the second lens element in a sub scanning direction.

4. A scanning optical system comprising:
a deflector;
a scanning lens on which a convergent beam deflected by the deflector at a uniform angular velocity is incident, said scanning lens forming the convergent beam into an image on a scanned surface to scan the scanned surface substantially at a uniform velocity,
wherein said scanning lens includes from a deflector side a first lens element of a negative refractive power and a second lens element of a positive refractive power, and wherein said scanning lens fulfills the following condition:

$$|1-\beta|<0.25$$

where $\beta$ is a magnification of the scanning lens in a main scanning direction.

5. A scanning optical system as claimed in claim 4, wherein a first surface of said first lens element is a rotationally symmetric surface.

6. A scanning optical system as claimed in claim 4, wherein said scanning lens fulfills the following condition:

$$\frac{f_{1M}}{f_{2M}} < -0.5$$

where $f_{1M}$ is a focal length of the first lens element in the main scanning direction and $f_{2M}$ is a focal length of the second lens element in the main scanning direction.

7. A scanning optical system as claimed in claim 6, wherein the following condition is fulfilled:

$$-33 < \frac{f_{1M}}{f_{2M}} < -0.5.$$

8. A scanning optical system as claimed in claim 4, wherein said scanning lens fulfills the following condition:

$$\frac{f_{1S}}{f_{2S}} < -4$$

where $f_{1S}$ is a focal length of the first lens element in a sub scanning direction and $f_{2S}$ is a focal length of the second lens element in a sub scanning direction.

9. A scanning optical system as claimed in claim 8, wherein and scanning lens fulfills the following condition:

$$-350 < \frac{f_{1S}}{f_{2S}} < -4.$$

10. A scanning optical system as claimed in claim 4, wherein said first lens element is made of resin.

11. A scanning optical system as claimed in claim 4, wherein said first lens element is made of resin.

12. A scanning optical system as claimed in claim 4 wherein the first lens element is a negative bi-concave lens and the second lens element is a positive meniscus lens.

13. A scanning optical system comprising:
a deflector;
a scanning lens on which a convergent beam deflected by the deflector at a uniform angular velocity is incident, said scanning lens forming the convergent beam into an image on a scanned surface to scan the scanned surface substantially at a uniform velocity,
wherein said scanning lens includes from a deflector side a first lens element of a negative refractive power and a second lens element of a positive refractive power, and wherein one surface of the second lens element is a toric surface where its refractive power in a main scanning direction and its refractive power in a sub scanning direction are different, and wherein said scanning lens fulfills the following condition:

$$|1-\beta|<0.25$$

$$-33 < \frac{f_{1M}}{f_{2M}} < -0.5$$

$$-350 < \frac{f_{1S}}{f_{2S}} < -4$$

$$5 < \frac{f_{2M}}{f_{2S}} < 15$$

wherein $\beta$ is a magnification of the scanning lens in the main scanning direction, $f_{1M}$ is a focal length of the first lens element in the main scanning direction, $f_{1S}$ is a focal length of the first lens element in the sub scanning direction, $f_{2M}$ is a focal length of the second lens element in the main scanning direction, and $f_{2S}$ is a focal length of the second lens element in the sub scanning direction.

14. A scanning optical system as claimed in claim 13, wherein the following condition is fulfilled:

$$f_{1M}=f_{1S}.$$

15. A scanning optical system as claimed in claim 13, wherein a radius of curvature of said toric surface in the sub scanning direction varies with an increase in angle of view in the main scanning direction.

16. A scanning optical system comprising:

means for providing an optical beam;

means for converging the optical beam;

a deflector for scanning the converging optical beam and positioned relative to the means for converging to deflect an optical beam as a reflected convergent beam; and a scanning lens on which a convergent beam deflected by the deflector at a uniform angular velocity is incident, said scanning lens forming the convergent beam into an image on a scanned surface to scan the scanned surface substantially at a uniform velocity, wherein said scanning lens includes, from a deflector side a first lens element of a negative refractive power and a second lens element of a positive refractive power, at least one of the first and second lens elements is made from a resin material, and wherein one surface of the second lens element is a toric surface where its refractive power in a main scanning direction and its refractive power in a sub scanning direction are different, and wherein said scanning lens fulfills the following condition:

$$|1-\beta|<0.25$$

where $\beta$ is a magnification of the scanning lens in the main scanning direction.

17. A scanning optical system as claimed in claim 16, wherein a radius of curvature of said toric surface in the sub scanning direction varies with an increase in the angle of view in the main scanning direction.

18. A scanning optical system comprising:

means for providing an optical beam;

means for converging the optical beam;

a deflector for scanning the converging optical beam and positioned relative to the means for converging to deflect an optical beam as a reflected convergent beam; and a scanning lens on which a convergent beam deflected by the deflector at a uniform angular velocity is incident, said scanning lens forming the convergent beam into an image on a scanned surface to scan the scanned surface substantially at a uniform velocity, wherein said scanning lens includes, from a deflector side a first bi-concave lens element of a negative refractive power and a second meniscus lens element of a positive refractive power, at least one of the first and second lens elements is made from a resin material, and wherein one surface of the second lens element is a toric surface where its refractive power in a main scanning direction and its refractive power in a sub scanning direction are different, and wherein said scanning lens fulfills the following condition:

$$|1-\beta|<0.25$$

where $\beta$ is a magnification of the scanning lens in the main scanning direction.

19. A scanning optical system as claimed in claim 18, wherein a radius of curvature of said toric surface in the sub scanning direction varies with an increase in the angle of view in the main scanning direction.

20. A scanning optical system comprising:

a deflector;

a scanning lens on which a convergent beam deflected by the deflector at a uniform angular velocity is incident, said scanning lens forming the convergent beam into an image on a scanned surface to scan the scanned surface substantially at a uniform velocity, wherein said scanning lens includes from a deflector side a first lens element of a negative refractive power and a second lens element of a positive refractive power, and wherein said scanning lens fulfills the following conditions:

$$|1-\beta|<0.25$$

where $\beta$ is a magnification of the scanning lens in a main scanning direction, $$5<\frac{f_{2M}}{f_{2S}}<15$$

where $f_{2M}$ is a focal length of the second lens element in the main scanning direction and $f_{2S}$ is a focal length of the second lens element in a sub scanning direction.

* * * * *